US008328610B2

(12) United States Patent
Shimura et al.

(10) Patent No.: US 8,328,610 B2
(45) Date of Patent: Dec. 11, 2012

(54) INTELLIGENT GAME EDITING SYSTEM AND METHOD WITH AUTOCOMPLETE AND OTHER FUNCTIONS THAT FACILITATE GAME AUTHORING BY NON-EXPERT END USERS

(75) Inventors: Yukimi Shimura, Redmond, WA (US); Shigeki Yamashiro, Redmond, WA (US); Robert Champagne, Redmond, WA (US); Nathan Hunley, Bellelvue, WA (US); Stephen Mortimer, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 1175 days.

(21) Appl. No.: 11/464,905

(22) Filed: Aug. 16, 2006

(65) Prior Publication Data

US 2008/0078758 A1 Apr. 3, 2008

(51) Int. Cl.
*A63F 9/24* (2006.01)
(52) U.S. Cl. .............................. 463/9; 463/42; 705/14.2
(58) Field of Classification Search .......... 463/1, 30–31, 463/40–42, 9; 705/14.2
See application file for complete search history.

(56) References Cited

U.S. PATENT DOCUMENTS

| | | | | | |
|---|---|---|---|---|---|
| 5,577,185 | A | * | 11/1996 | Tunnell et al. ................ | 345/473 |
| 5,592,609 | A | * | 1/1997 | Suzuki et al. ................ | 345/473 |
| 6,961,055 | B2 | * | 11/2005 | Doak et al. .................... | 345/419 |
| 7,670,225 | B2 | * | 3/2010 | Nishimura ..................... | 463/30 |
| 2002/0116266 | A1 | * | 8/2002 | Marshall ....................... | 705/14 |
| 2003/0014311 | A1 | * | 1/2003 | Chua ............................. | 705/14 |
| 2003/0058238 | A1 | * | 3/2003 | Doak et al. .................... | 345/419 |
| 2004/0192440 | A1 | * | 9/2004 | Evans et al. .................... | 463/30 |
| 2005/0045025 | A1 | * | 3/2005 | Wells et al. ..................... | 84/615 |
| 2005/0202862 | A1 | * | 9/2005 | Shuman et al. .................. | 463/9 |
| 2006/0080613 | A1 | * | 4/2006 | Savant .......................... | 715/745 |
| 2007/0092859 | A1 | * | 4/2007 | Watts et al. .................... | 434/322 |
| 2007/0129123 | A1 | * | 6/2007 | Eryou et al. ..................... | 463/1 |

OTHER PUBLICATIONS

Unknown, "The Sims 2", retrieved on Sep. 13, 2009 from Internet URL:<http://en.wikipedia.org/wiki/The_Sims_2>.*
Park, "The Sims 2 Review", Sep. 14, 2004 retrieved on Sep. 13, 2009 from Internet URL:<http://www.gamespot.com/pc/strategy/thesims2/review.htmlom_act=convert&om_clk=summary&tag=gssummary;read-review>.*

(Continued)

*Primary Examiner* — Dmitry Suhol
*Assistant Examiner* — Carl V Larsen
(74) *Attorney, Agent, or Firm* — Nixon & Vanderhye P.C.

(57) ABSTRACT

A new user-friendly game editor allows game players with little or no experience to create new games or game levels. Game element structures can be "drawn" using an "auto completion" feature that automatically functionally connects and/or arranges chosen game elements to provide a visually pleasing environment that is easily navigated by game characters. Such technology can allow an end user game player with little or no technical background to easily develop game levels that are fun to play and do not suffer from any significant defects or other problems that would decrease ease of navigation, functionality or amount of fun. The user may share the authored game with other users via a network so other users can retrieve the game and play it on their own game playing devices. Users can provide feedback concerning the fun and functionality of the game. Good feedback can entitle the game author to recognition including for example bonus points. Bonus points can be redeemed for items listed in an online catalog, which in turn can be used to author ever more interesting game play levels.

7 Claims, 68 Drawing Sheets

OTHER PUBLICATIONS

EA Games and Maxis, "The Sims 2 Exchange", retrieved from www.thesims2.com on Sep. 13, 2009 from Internet URL:<http://thesims2.ea.com/exchange/index_tutorial.php>.*

EA Games and Maxis, "The Sims 2 Exchange", retrieved from www.thesims2.com on Sep. 13, 2009 from Internet URL:<http://thesims2.ea.com/exchange/index.php?pid=Exchange>.*

Trackmania. Neoseeker Article [online]. [retrieved on Feb. 7, 2011]. Retrieved from the Internet. <URL: http://www.neoseeker.com/Games/Products/PC/trackmania/>.*

Cadrail Product Information. Web Page [online]. Sandia Software, Mar. 8, 2005 [retrieved on Aug. 31, 2011]. Retrieved from the Internet: <URL: http://web.archive.org/web/20050308090934/http://www.sandiasoftware.com/cadrail/info/info.htm>.*

"Create Your Own Race Track in Trackmania". iDTech365. Online. Retrieved from the Internet. Retrieved Feb. 9, 2012. <URL: http://idtech365.internaldrive.com/tutorials/create-your-own-race-track/>.*

"Trackmania Nations track editing tutorials". KatsBits. Online. Retrieved from the Internet. Retrieved Feb. 9, 2012. <URL: http://www.katsbits.com/tutorials/track-mania/basic-nations-track-editing.php>.*

"TrackMania Nations: Electronic Sports World Cup Edition" IGN.com. Online. Retrieved from the Internet. Retrieved Feb. 10, 2012. <URL: http://pc.ign.com/objects/794/794774.html>.*

Wingfield, Nick, "Microsoft to Offer Software to Make Game Creation Easier," The Wall Street Journal Online, http://online.wsj.com, 2 pages (Aug. 14, 2006).

Carless, Simon, "Interview: From Redmond With Love? Microsoft's Chris Satchell on Xna Studio," GDC 2005 Feature, www.gamasutra.com/gdc2005, 5 pages (Mar. 7, 2005).

Levine, Robert, "Microsoft Has a Starter Kit for Aspiring Game Designers," The New York Times, nytimes.com, http://select.nytimes/com, 1 page (Aug. 14, 2006).

PSP Game, "MegaMan Powered Up," CAPCOM, game disc with manual (2006).

* cited by examiner

Exemplary Illustrative
Game Play Platform

Exemplary Illustrative Game Play Platform Block Diagram

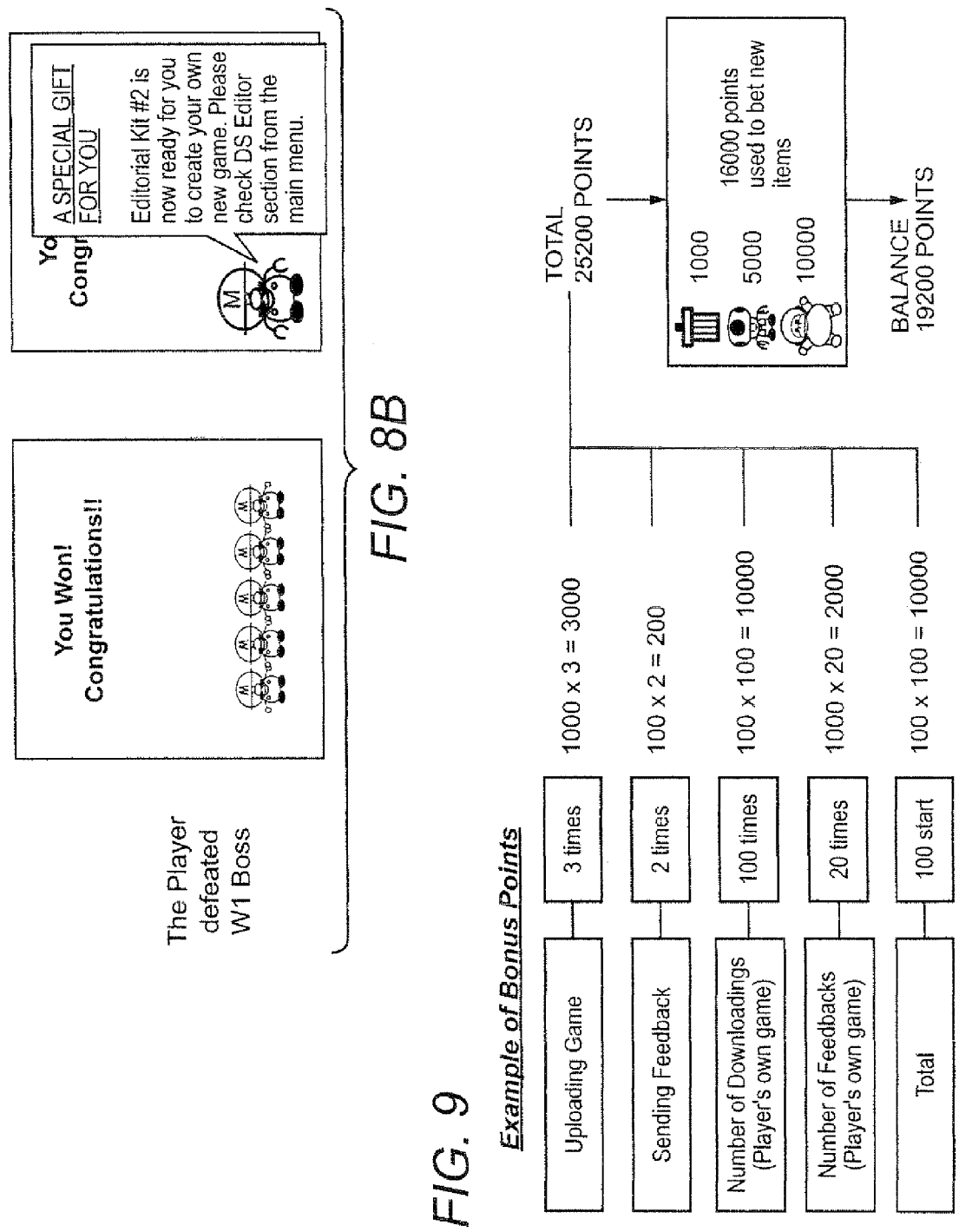

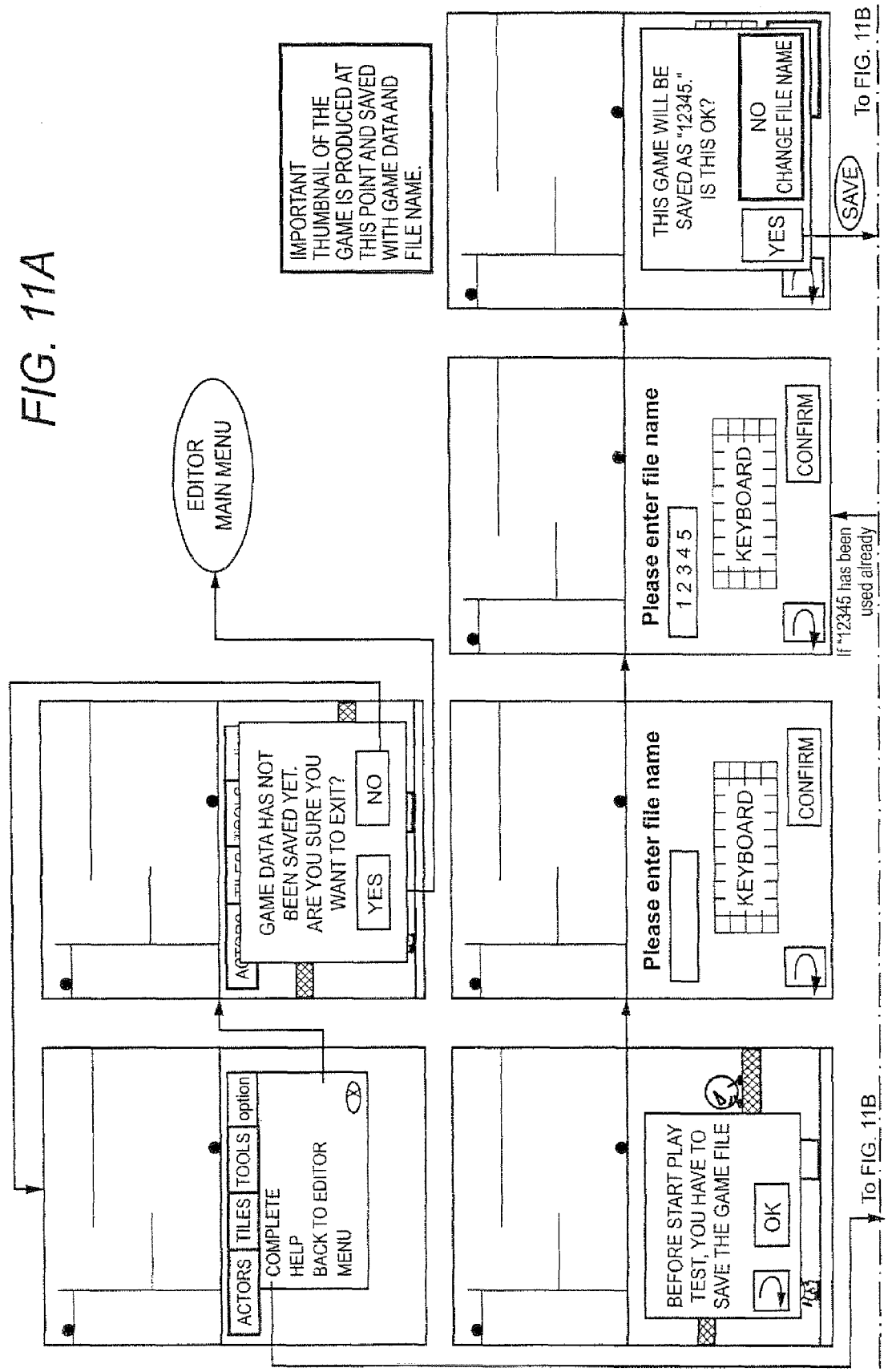

INTELLIGENT GAME EDITING SYSTEM AND METHOD WITH AUTOCOMPLETE AND OTHER FUNCTIONS THAT FACILITATE GAME AUTHORING BY NON-EXPERT END USERS

CROSS-REFERENCES TO RELATED APPLICATIONS

Not applicable.

STATEMENT REGARDING FEDERALLY SPONSORED RESEARCH OR DEVELOPMENT

Not applicable.

FIELD

The technology herein relates to computer games, and more particularly to user interfaces for video game authoring. Still more particularly, the technology herein relates to methods, apparatus, technique and storage devices for facilitating the creation of fun and interesting video game play by relatively non-technical users.

BACKGROUND AND SUMMARY

Computer graphics technology has advanced to a point where highly photo-realistic, near-motion picture quality interactive computer graphics has become available on systems costing only a few hundred dollars or less. It was not so long ago that an average programmer could develop state of the art video and computer games in a relatively short time. Many of us can remember pumping quarters into arcade games that, although often fun to play, displayed screens that were relatively simple and uncomplicated. Now, a variety of modern computing devices such as personal computers, home video game systems, cellular telephones, personal digital assistants and other devices have highly sophisticated 3D computer graphics engines and fast processors that provide impressive photorealistic graphics at low cost.

As the power and sophistication of commonly available video game playing computer platforms has increased, so have the technical challenges involved in developing new game software to play on those platforms. It is now relatively common for video game developers to spend many months and tens or hundreds of thousands of dollars developing each major new video game title. It often takes an entire team of developers including graphic artists, software programmers, music composers and performers, and artificial intelligence experts to produce a new hit game. A development team can spend many months developing story boards, producing graphics, composing music, writing code and completing other tasks involved in putting together exciting, fun to play and interesting video games.

While many gamers are satisfied with playing video games others have developed, some portion of the gaming community is intrigued by the idea of developing their own games. We now live in a world where users can create their own text, audio, pictures, videos and other content and upload them onto the Internet or other network so it can be accessed by others around the world. Many dream of developing a hit game that brings fun and enjoyment to thousands of game enthusiasts worldwide.

There are a number of success stories in the gaming industry where an independent programmer working in his or her bedroom or basement has succeeded in developing a hit game. However, most such success stories involve highly talented, highly technical computer programmers who became technical experts in both software development and video game technology. Many more people who have acquired the tools needed for writing video games soon realized how technically challenging and time consuming it is to develop even relatively simple games. Combining technical expertise, available time and creativity in the quantities required to develop even rudimentary gaming applications for modern computing platforms is well beyond the capability of most gaming enthusiasts.

Some in the gaming industry believe it may be possible to inspire amateurs to develop and share or sell relatively simple games over gaming networks. See, e.g., Levine, "Microsoft has a starter kit for aspiring game designers" *New York Times* (14 Aug. 2006); Wingfield, "Microsoft to Offer Software To Make Game Creation Easier", *Wall Street Journal* (14 Aug. 2006) describing a strategy for encouraging students and hobbiests to develop video games using a game authoring tool. Such a strategy could possibly be successful if, for example, collaborative game development over the Internet could be practiced. However, many believe that authoring tool ease-of-use is a critical aspect to the success of such efforts. It is likely that even moderately powerful game authoring tools will be technically beyond the ken of a great majority of gaming enthusiasts.

Some in the past have tried a different approach to allowing gamers to develop new and original gaming interfaces. Some years back, Nintendo released a game called "Mario Paint" for the Super Nintendo Entertainment System that allowed the game player to graphically compose music and simple animations. Mario Paint was designed so the game player needed no special technical expertise, and easy to use authoring tools were built into the game itself. Using the Mario Paint game, the game player could place graphical characters on a musical staff to cause different notes and sounds to be played. The Mario Paint game also allowed the game player to author other interesting graphical effects using a mouse as a pointing device. The end user could also make simple looping animations which could then be set to music created in the music generator, although such animations could not be exported. While this prior technology was highly successful, it had some limitations.

More recently, some have attempted to develop games that allow the game player to build, explore and exchange game play levels. One example is the MegaMan® Powered Up game developed by Capcom Entertainment for the Sony PSP. This MegaMan® Powered Up game provides a "construction mode" that allows the game player to create "his or her own custom MegaMan stages just like building with blocks." A game player can play his or her own custom stage, and may also download other custom stages over a network to play someone else's custom stage. Game players can rate downloaded custom stages after they have played them. Level authoring is intended to be relatively easy to use by, for example, using the directional buttons on the Sony PSP to select building blocks and place them on a grid to progressively build a game play world. See, for example, MegaMan® Powered Up Manual No. ULUS10091 (Capcom 1987, 2006).

While such in-game graphical user interface approaches can allow entirely non-technical game players to creatively develop gaming landscapes for other players to negotiate, there are some significant technical challenges in developing such a system that is truly fun to use. Much of the fun of a game playing experience relates to how game characters interact with their virtual environment. Gaming enthusiasts have come to expect highly realistic, complex game play worlds that are fully functional from the standpoint of a game character moving within the world. They will be dissatisfied if the only landscapes they can produce with an authoring tool are so simple as to be uninteresting. This factor argues in favor of giving end users a great deal of flexibility to define whatever virtual environment structures they wish. Such an approach is perhaps worthwhile if the user can assumed to be relatively sophisticated and can be counted upon to design virtual environments with great care and skill. On the other hand, expecting younger or less sophisticated game players to make use of such versatile and flexible game design features can sometimes lead to frustrating end results. Users can easily become frustrated if the virtual game structures they create do not "work" or are not useful from a game playing perspective. For example, most game players will be dissatisfied if a game character ends up on a structure that is so high up in the air that the character cannot move off the structure at all or will lose its virtual life by stepping off. Most game players will not like scenarios where a game character can accidentally fall into a hole or other trap that the character can never get out of. Unfortunately, many professional game developers will tell you that "the devil is in the details" and that successful video game development depends on a combination of creativity and vision, experience, technical expertise and uncompromising attention to detail. Again, the average video game end user may be lacking in some of these areas.

Accordingly, although much work has been done in the past, further improvements are possible and desirable.

Exemplary illustrative non-limiting technology herein allows game players to create new game play by using an easy to use game editor function that is itself like an animated game. This editor function provides new features including the ability to choose game elements (e.g., ground, walls, ceiling, pipe, elevator, conveyor belt, swing bar and other elements) by using an "auto completion" feature. The auto completion function automatically connects and/or arranges chosen game elements (i.e., a pipe connected to a pipe) to provide virtual structures that are easily navigated by game characters while observing necessary distances between functional objects to avoid undesired interference between structures. Such technology can allow an end user (game player) with little or no technical background to easily develop game levels that are fun to play and do not suffer from any significant defects or other problems that would decrease ease of navigation, functionality or amount of fun.

Ease of use is obtained for example, by designing editing features around specific objects so that, for example, a pipe opening cannot be placed so close to a surface that a game character cannot enter it, a platform cannot be placed so close to an elevator such that the game character cannot get from the elevator to the platform, and the like. The end user can in effect "draw" walls and other structures that are filled in automatically at appropriate spacing to provide a high degree of functionality. Even users who have little or no knowledge of what it takes to build a level can create game levels that are fun to play. The editor can automatically augment, with animation, the structure the end user has designed to provide real time animated interactivity in response to user inputs.

Once the user has finished designing a game environment and associated game play in one exemplary illustrative non-limiting implementation, the user may upload the game via a network onto a server. Other users can retrieve the game from the server and play it on their own game playing devices. Users can provide feedback concerning the fun and functionality of the game. Good feedback can entitle the developer of the game to recognition including for example bonus points. Bonus points can be redeemed for items listed in an online catalog. One example catalog may contain items (characters, backgrounds, structures, etc.) used for creating additional games. Users can redeem their bonus points for such game material and create ever more interesting and varied games they can upload to achieve further feedback, recognition and awards.

Server software can scan uploaded material for undesired features (e.g., profanity) if desired, and may also track and score the number of downloads, popularity of various games available for download, etc. Fees can be charged for each download, a subscription service could be used, or downloads can be free, depending on the business model. Games can be infinitely expandable (limited for example by the amount of local storage) on an ongoing basis as desired by downloading additional levels created by other users. New levels can be downloaded to replace previous levels. Once downloaded, the new levels can be stored locally so that they can be played even when a network connection is not available. Collaboration is possible where a user can download a game created by another user, edit that game, and upload the edited version for yet another player to download, play, and possibly edit. Sharing can be conditioned on passwords, codes, "friend" status or the like. In other implementations, some downloaded games can be locked from further editing to ensure that the creator receives proper credit and recognition.

BRIEF DESCRIPTION OF THE DRAWINGS

These and other features and advantages will be better and more completely understood by referring to the following detailed description of exemplary illustrative non-limiting implementations in conjunction with the drawings of which:

FIGS. 8A and 8B show exemplary illustrative non-limiting implementations of menu selection screens for editing control;

FIG. 9 schematically illustrates an exemplary illustrative non-limiting bonus point functionality;

FIGS. 11A and 11B together show exemplary illustrative non-limiting menu display flows for a game editor complete-save and play test functionality;

DETAILED DESCRIPTION

The following describes an example game playing device that may be used to execute game editing software stored on a storage device to provide advantageous game editing functionality. The described illustrative non-limiting game playing device includes dual screens (one of which has is touch sensitive) and 3D graphics. Other devices including but not limited to personal computers, cellular telephones, personal digital assistants, home video game machines, server-based computers and other architectures could be used instead.

Figure 1A:
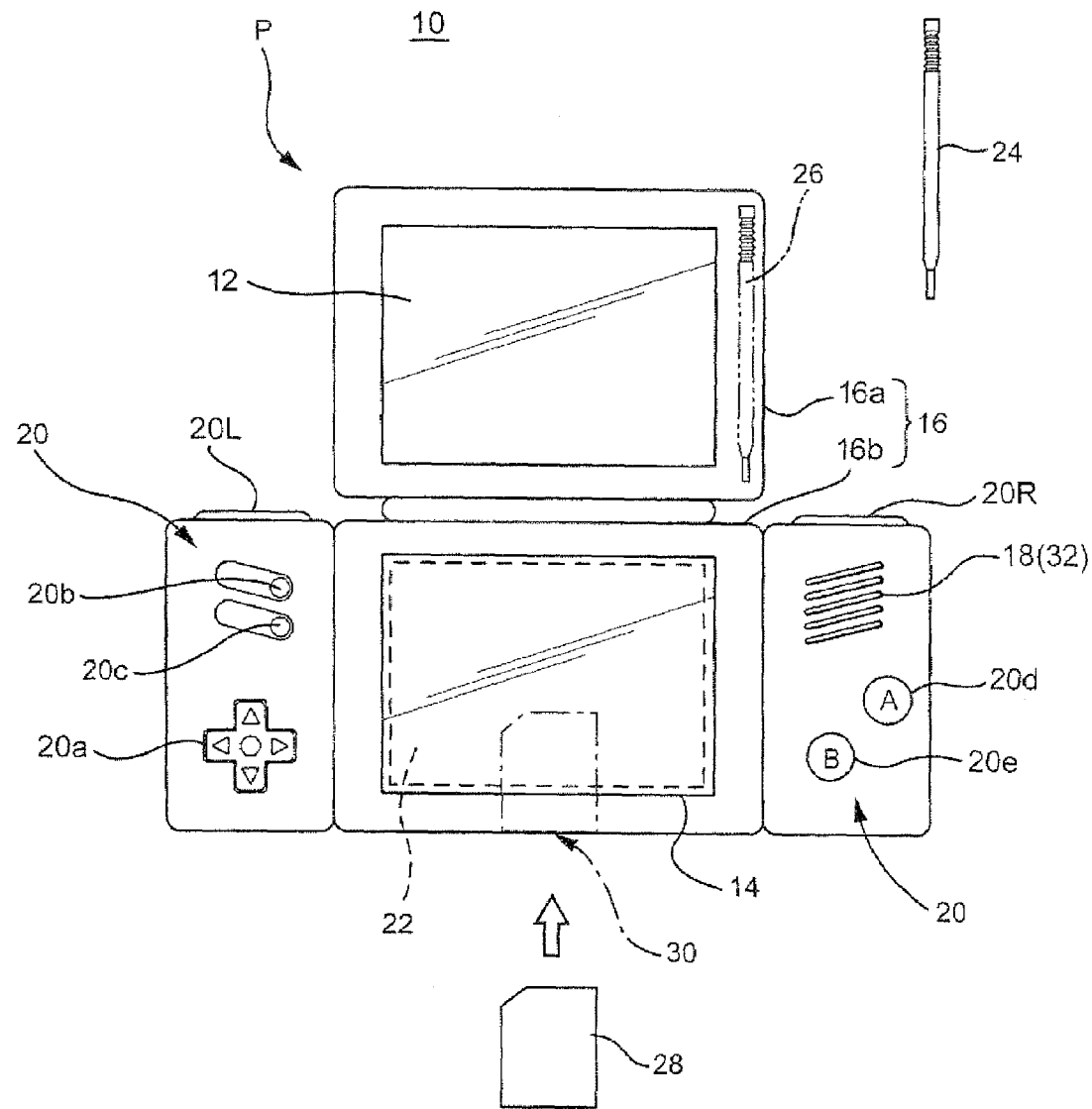
FIG. 1A shows an exemplary illustrative non-limiting game playing system.

In the particular illustrative non-limiting implementation shown in FIG. 1A, an exemplary illustrative non-limiting game apparatus 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 1A. The operation switch section 14 also includes a direction indication switch (cross key) 14c, a start switch 14d, and a select switch 14e which are attached to one main surface of the side section of the lower housing 18a to the left of the second LCD 12 as seen in FIG. 1A. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 1A) of the second LCD 12, a touch panel 13 (surrounded by the dashed line in FIG. 1A) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole (an area represented by the two-dot chain line in FIG. 1A) is formed when necessary for accommodating the stylus 16 for operating the touch panel 13. In a part of one surface of the lower housing 18a, a cartridge insertion section (an area represented by the one-dot chain line in FIG. 1A) is formed, for detachably accepting a game cartridge 17 (hereinafter, referred to simply as the "cartridge 17") having a built-in memory (e.g., a ROM) which stores a game program. The cartridge 17 is a memory medium storing a game program (in this case such game program includes instructions for providing a game editing display and associated functionality), and is, for example, a nonvolatile semiconductor memory such as a ROM or a flash memory. The program instructions and data stored on cartridge 17 can be written at manufacturing time or later (e.g., based on downloading over a network or the like).

A part of the lower housing 18b inner to the cartridge insertion section has a built-in connecter (see FIG. 1B) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 1B:
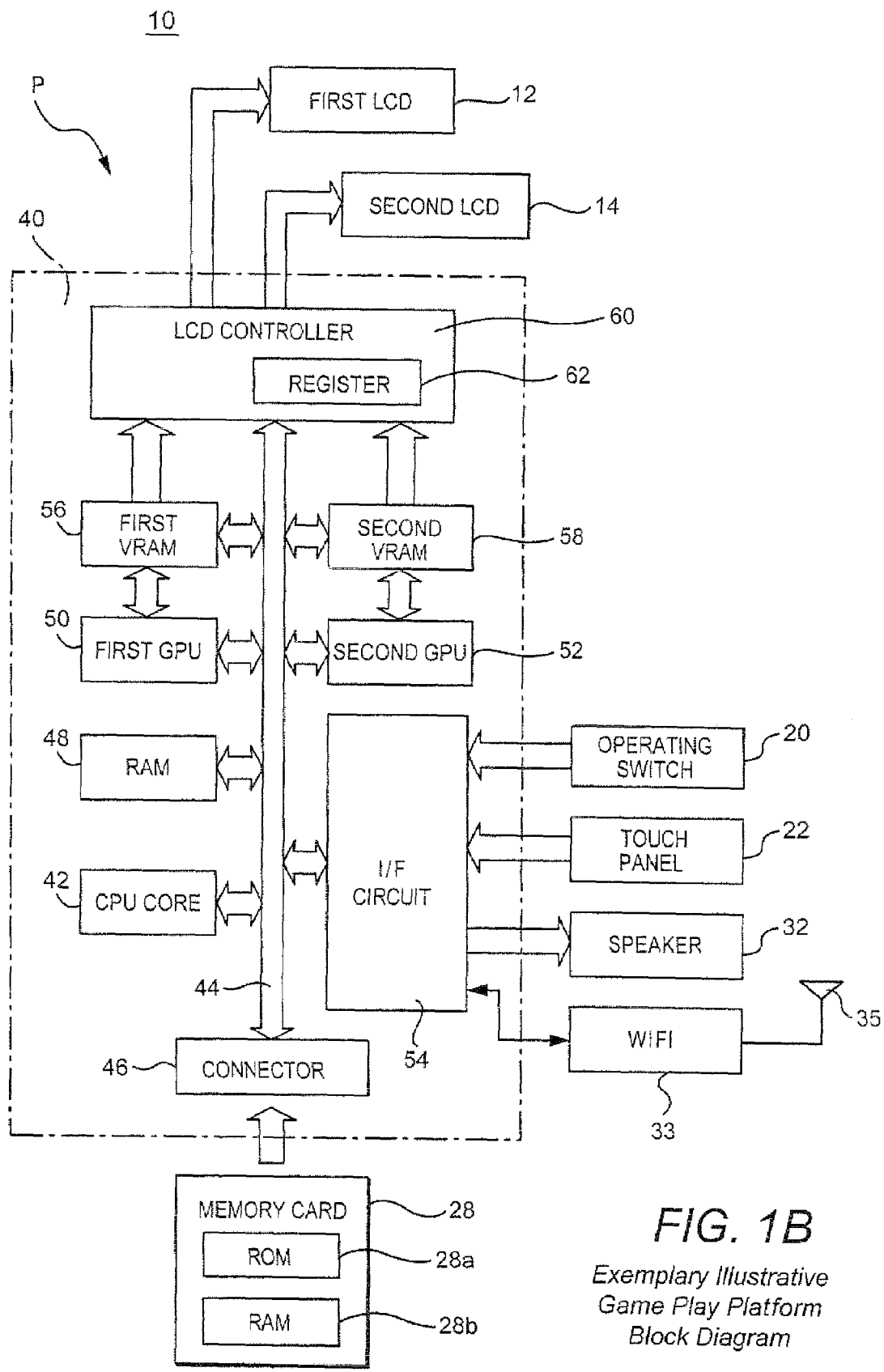
FIG. 1B shows an exemplary illustrative non-limiting game play system block diagram.

Next, with reference to FIG. 1B, an internal structure of the game apparatus 1 will be described. FIG. 1B is a block diagram showing the internal structure of the game apparatus 1.

In FIG. 1B, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Example Illustrative Non-Limiting Intelligent Game Editing

Figure 2A:
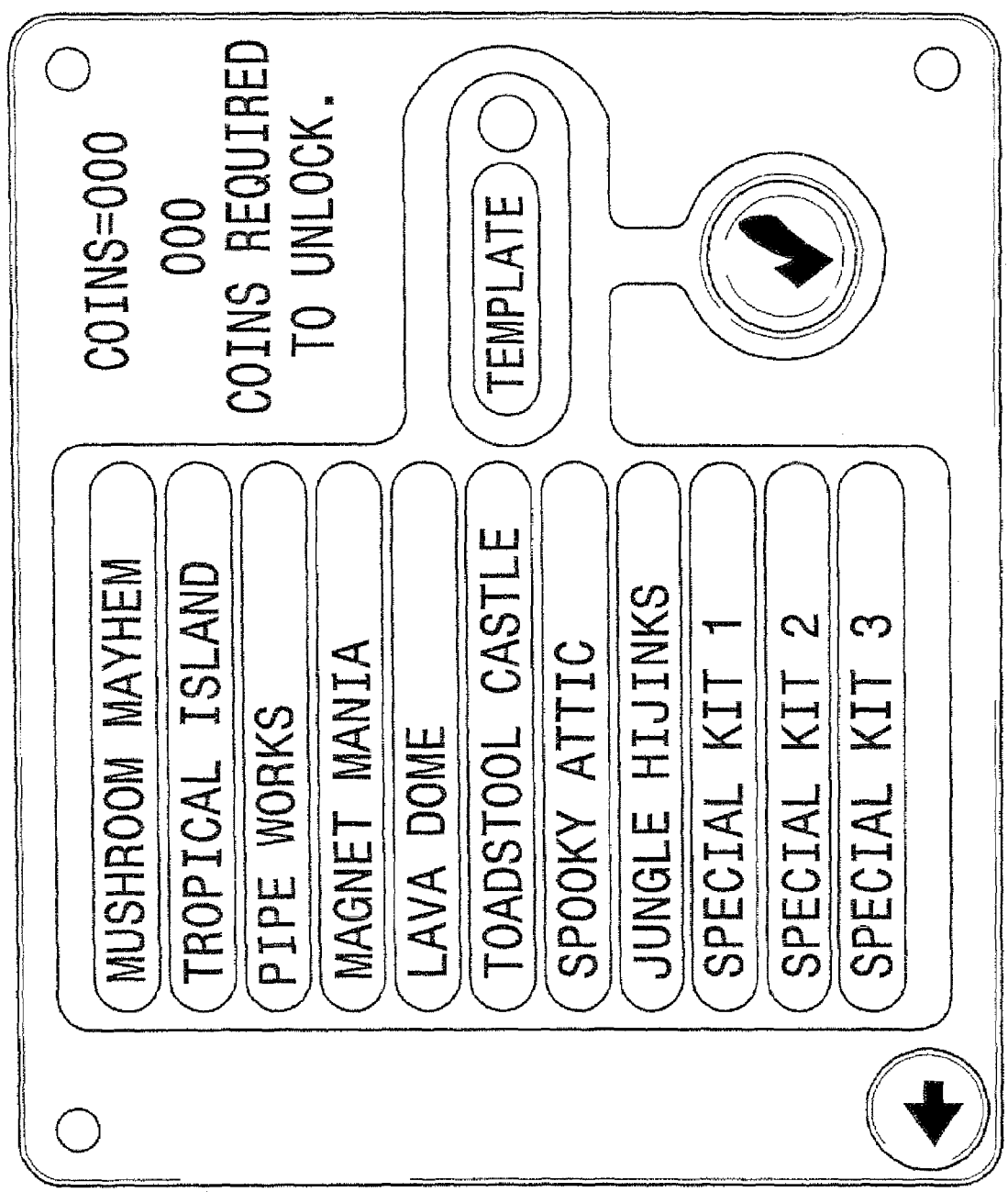
FIG. 2A shows an exemplary illustrative non-limiting game editing template selection menu.
Figure 2B:
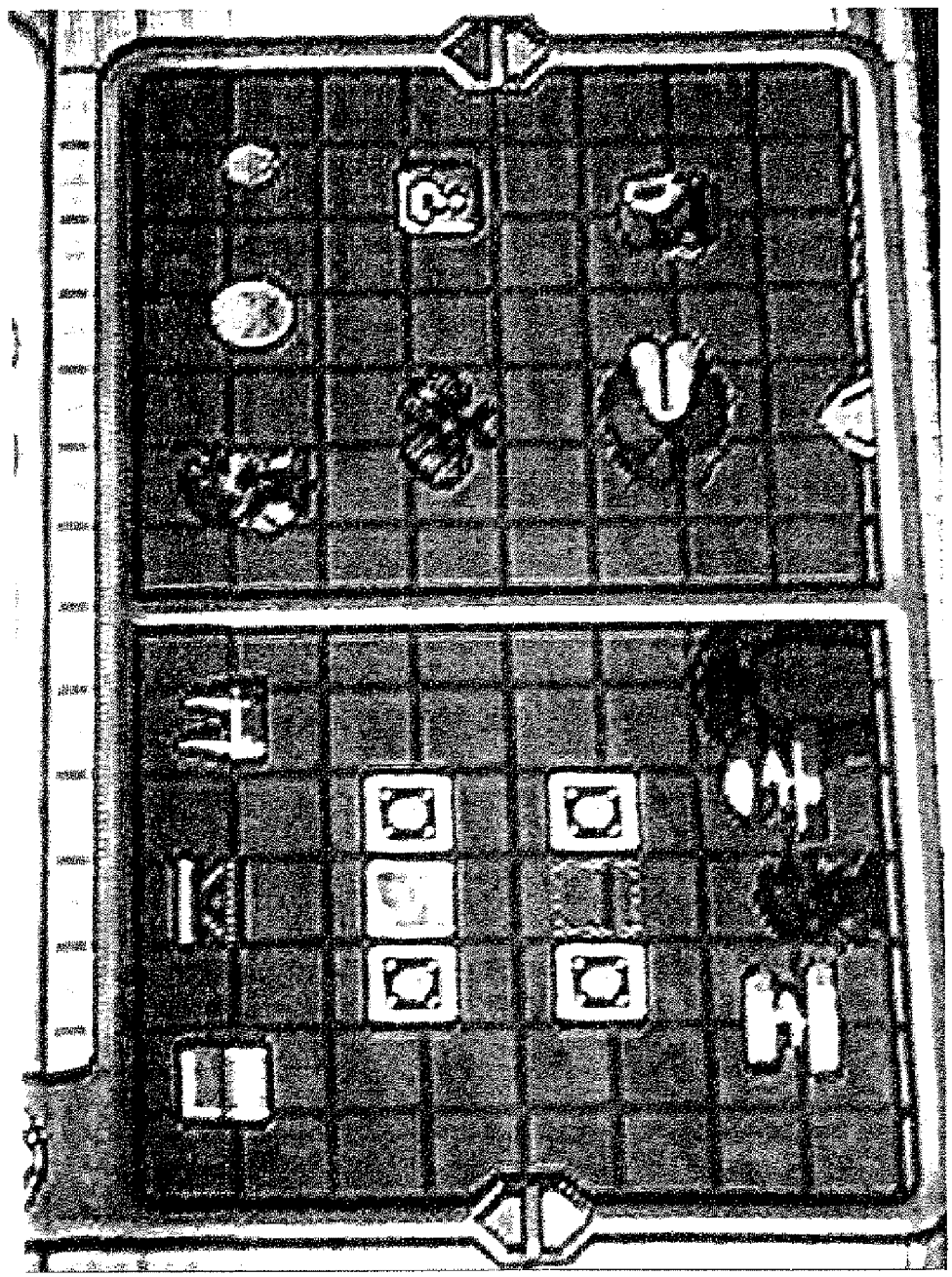
FIG. 2B shows an exemplary illustrative non-limiting game authoring object selection menu.
Figure 2C:
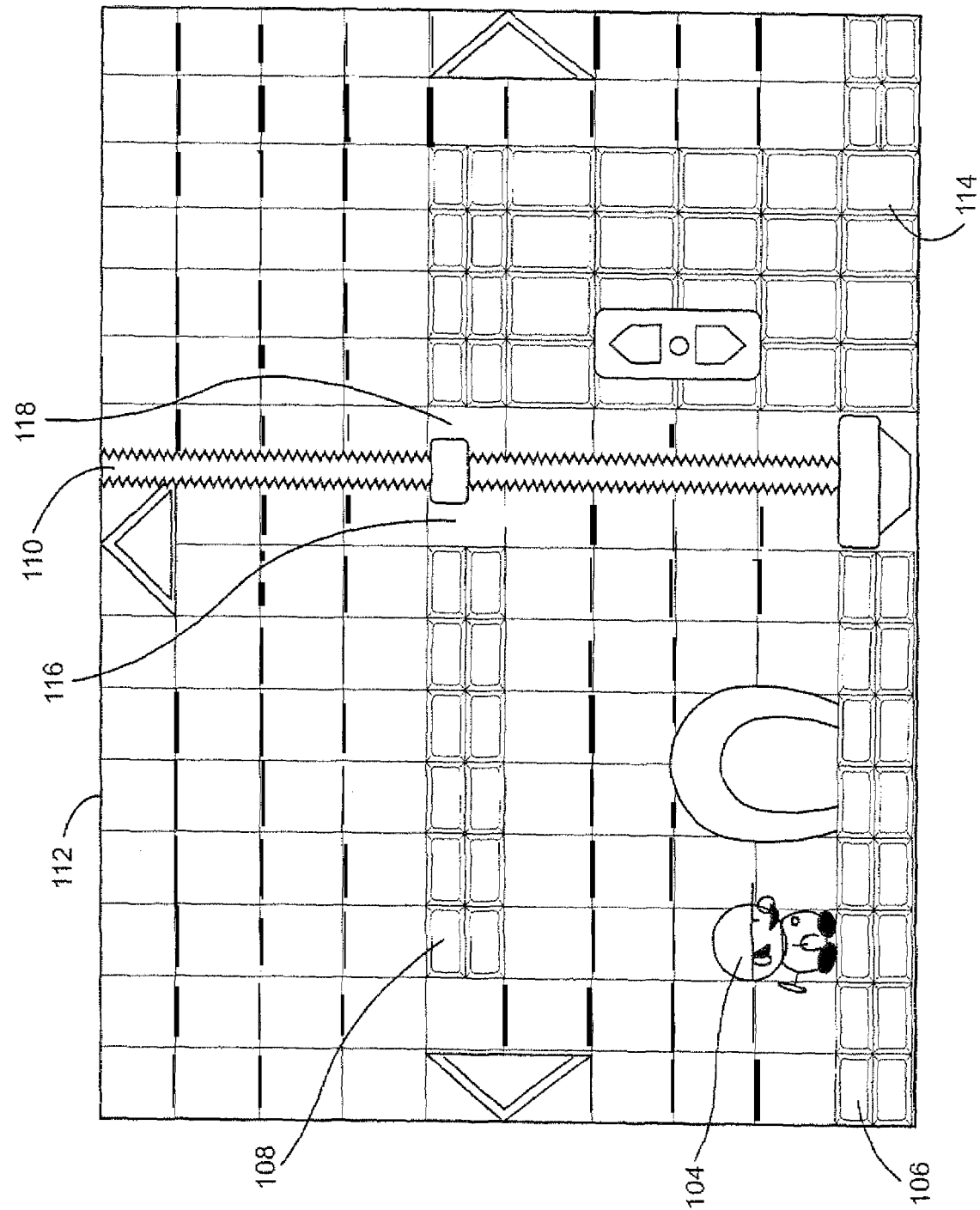
FIG. 2C shows an exemplary illustrative non-limiting level created by a non-technical game player.

FIGS. 2A, 2B and 2C show exemplary illustrative non-limiting game play editor selection screens that a player playing an exemplary illustrative non-limiting game may access to create, edit and play his or her own game level.

FIG. 2A shows, for example, an exemplary list 102 of game level templates a game player may select to help him or her create a new level. In one exemplary illustrative non-limiting implementation, these templates provide theme-based game play levels that set color schemes, repertoires of available objects and other factors to provide a degree of schematic cohesion in creating a new level. For example, a "tropical island" template may include objects such as palm trees, surf boards, cool drinks, boats and other objects such as one may find on a tropical island, and may provide an overall background including sand and water. Similarly, a "pipe works" template may be provided to allow the end user to create elaborate mazes of different styles, sizes, colors and other configurations of pipes that a game player can be navigated through. "Spooky Attic" could provide a set of objects one might find in a haunted attic of an old house including ghosts, cobwebs and the like. "Jungle Hi Jinx", on the other hand, could provide a background, color scheme and set of objects that a game player might find in a tropical jungle (e.g., toucans, monkeys, tree canopies with swinging vines, etc.). "Special Kits" can provide additional functionality that could be downloaded later, or in some exemplary illustrative non-limiting implementations the user may need to access higher levels within "regular" (e.g., non-user-edited) game play in order to access such "special kit" functionality. In one exemplary illustrative non-limiting implementation, as indicated on the upper right hand corner or the FIG. 2A display, the game player may be required to achieve a certain level of performance (e.g., gathering coins) within a "regular" portion of the game in order to gain admission to certain functions provided the game editor and/or to have access to the templates useful for creating new game levels.

FIG. 2B shows exemplary illustrative non-limiting set of displayed icons of objects that a user could use to create a new, schematically cohesive game level. Different templates can have entirely different sets of objects, or some objects can overlap between templates. Any objects found in the real world or any objects that can be imagined could be used. Such objects can be modeled in two dimensions or three dimensions and used to create 2D or 3D interactive game play.

FIG. 2C shows an exemplary illustrative non-limiting implementation of a user-defined game play level. In this exemplary illustrative non-limiting implementation, a game character 104 stands on a platform 106 a game player created using the editing function. The game player may also have defined an upper platform 108 that the game character 104 can ascend to via an elevator 110. In the exemplary illustrative non-limiting implementation, the game player can create platforms 206, 108 by selecting a building block such as shown in the upper left-hand corner of FIG. 2B and "drawing" a line across the grid 112—thereby "dragging and dropping" building blocks along the way.

In one exemplary illustrative non-limiting implementation, the game level editor is sufficiently "intelligent" so that it does not allow a player to create a platform such as 108 that has dangerous holes or other pitfalls. Rather, the exemplary illustrative non-limiting game editor provides a smart "auto complete" function that will fill in such holes automatically to prevent the resulting game play level from being exceptionally dangerous for the game character 104 to navigate. For example, as the game player moves a touch pen, cursor or the like across the screen after having selected the "building block" icon, the game software can deposit such blocks within a grid. Once the user is finished drawing a line of blocks, the exemplary illustrative non-limiting implementation may create a visual effect such as temporarily magnifying the block size to show the user that the blocks are being deposited permanently at those locations. However, the exemplary illustrative non-limiting implementation does not allow blocks to be deposited so close to certain virtual structures such as elevators that they would interfere with the operation of those virtual structures, and may also autocomplete structures to prevent undesired unrealistic effects such as a wall that appears to be handing in midair.

For example, the right-hand portion of FIG. 2C shows a virtual wall 114 that the game player has created by depositing some of the building blocks shown in FIG. 2B. In the exemplary illustrative non-limiting implementation, the game level editor provides an auto complete function to ensure that the wall extends all the way down to the bottom (floor) of the environment so that the wall does not appear to be unnaturally hanging in midair and thus more realistically resembles an actual wall in the real world. This auto complete functionality allows even inexperienced game players to create realistic, functional, satisfying and fun-to-play structures with minimal effort and high east of use, while eliminating some of the drudgery and attention to detail that might otherwise be required to develop a fully functional game play level.

Also as shown in FIG. 2C, an elevator 110 has been deposited by the game player to allow character 104 to ascend from the lower platform 106 to the upper platform 108 and to the top of wall 114. In the exemplary illustrative non-limiting implementation, the elevator 110 structure has been dimensioned in advance within the constraints of grid 112, and the auto complete function used to create platform 108 has been constrained in advance so that the platform cannot entirely encompass the elevator 110 and thereby make it non-functional. In more detail, if a game player were to attempt to deposit an additional block into the matrix blocks 116, 118 surrounding the elevator, the game level editor would prevent such blocks from being deposited to thereby guarantee that a sufficient space is left surrounding the elevator so that the game character can successfully use the elevator to ascend from the lower platform 106 to the upper platform 108 or to the top of wall 114 without being obstructed. In other exemplary illustrative non-limiting instances, for example, the game level editor may prevent the bottom of a pipe in "pipe works" from descending all the way to a lower platform 206 but may instead always leave sufficient space between the opening of the pipe and the platform so that the game character 104 can physically fit between the platform and the pipe opening so as enter into the pipe opening. Such "smart" auto complete and non-complete object creation functionality may at times reduce the amount of arbitrariness and flexibility a game player has in developing virtual environments, but the resulting ease of use for beginners and less-technical players is worth the tradeoff.

Figure 24A:
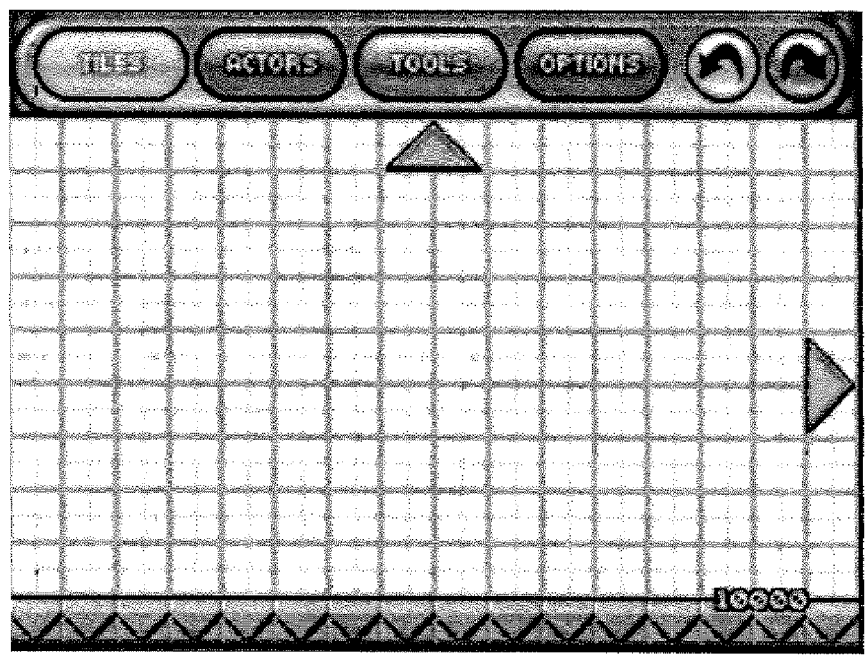
FIGS. 24A-24Z, 25A-25Z and 26A-26H show example game editing results.
Figure 24B:
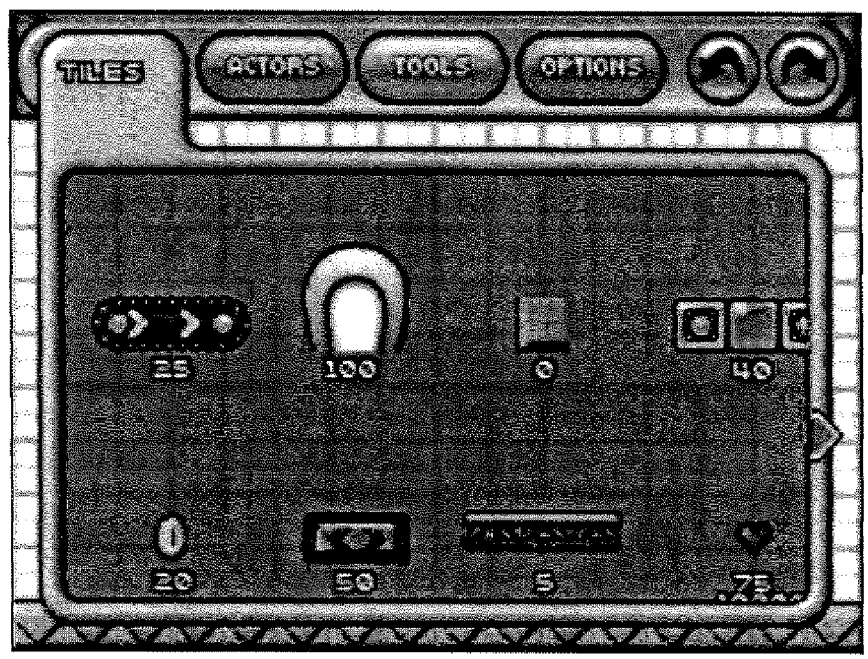
Figure 24C:
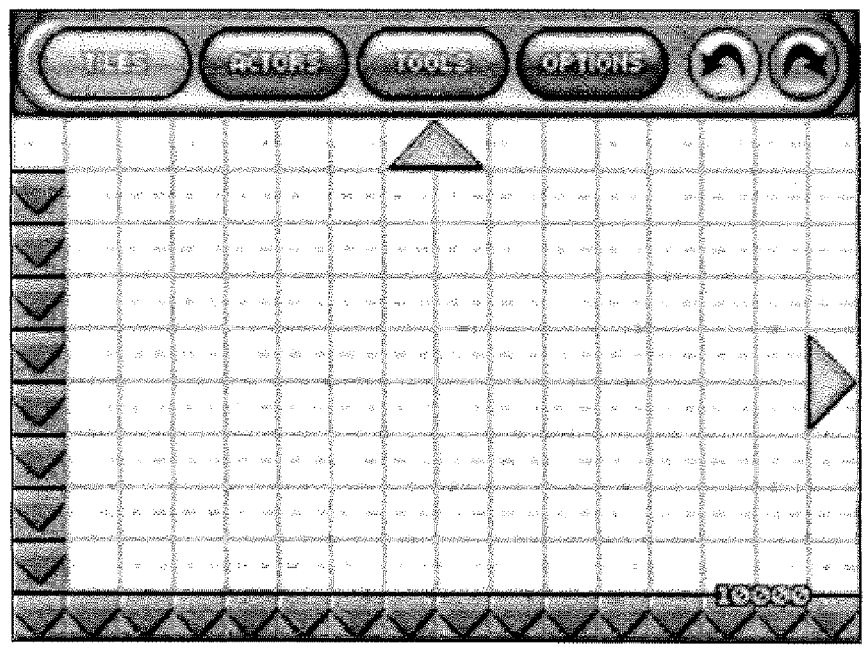
Figure 24D:
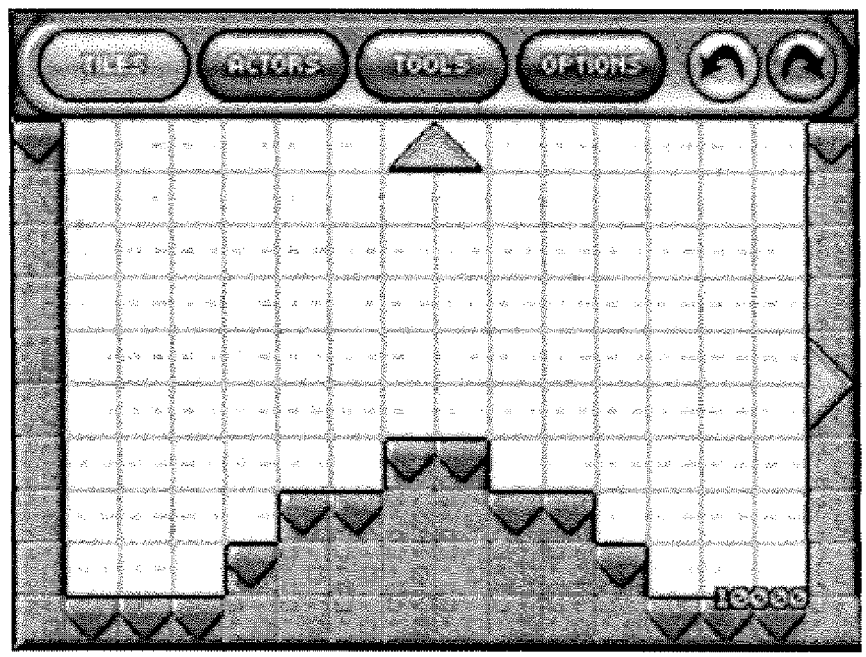
Figure 24E:
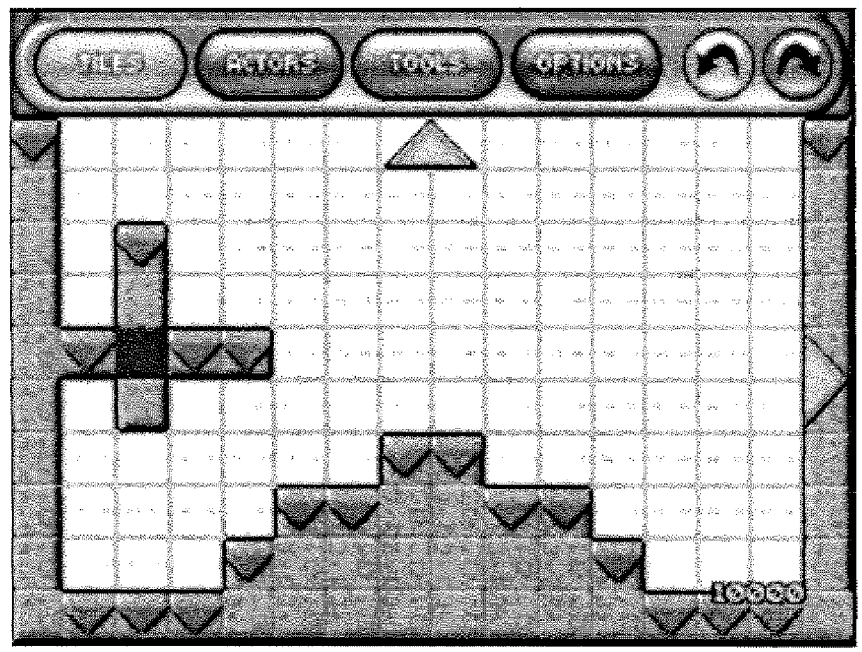
Figure 24F:
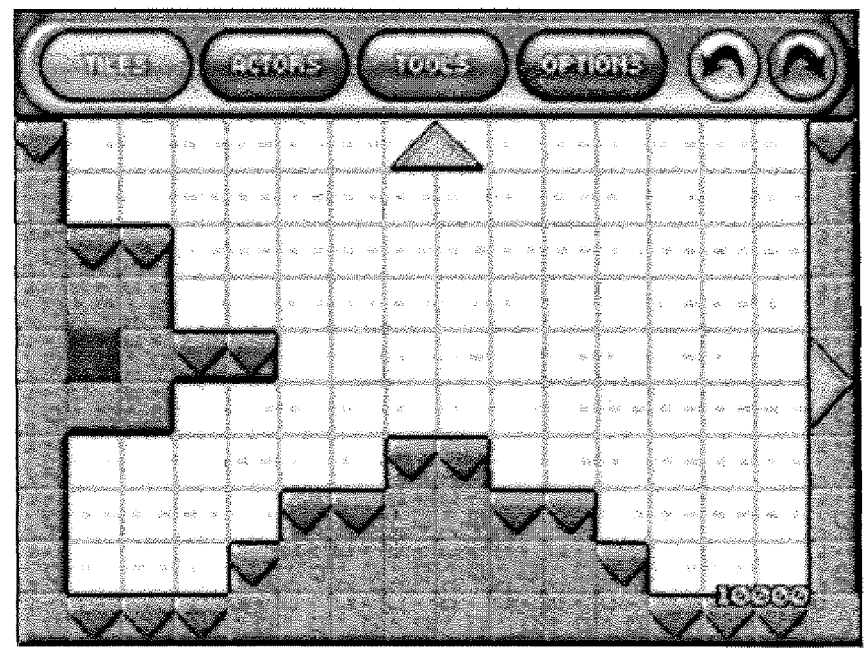
Figure 24G:
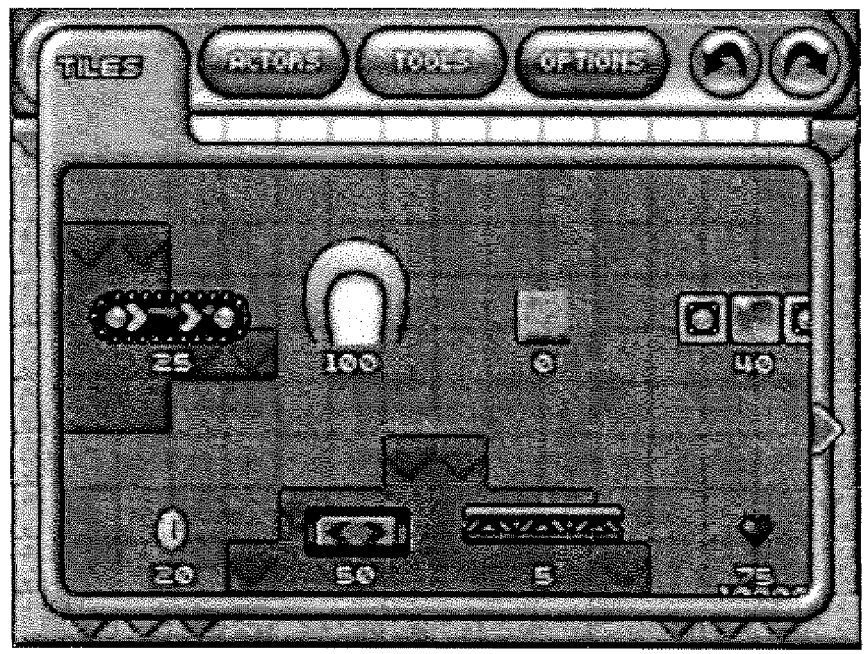
Figure 24H:
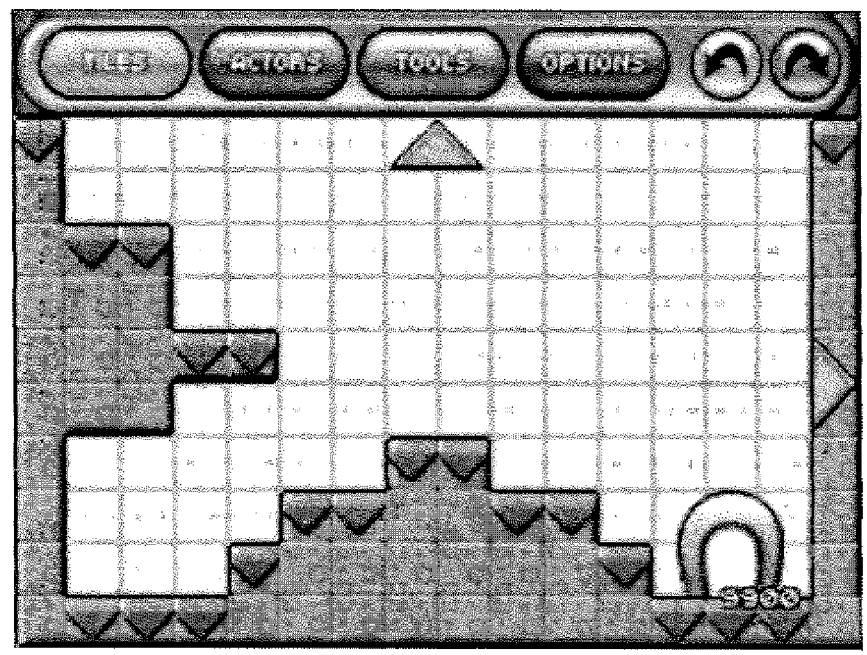
Figure 24I:
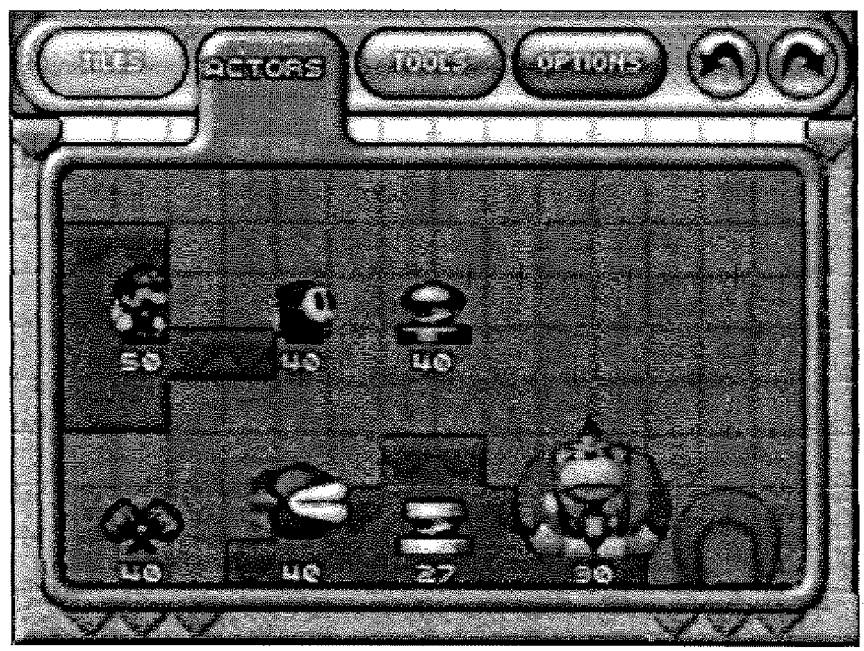
Figure 24J:
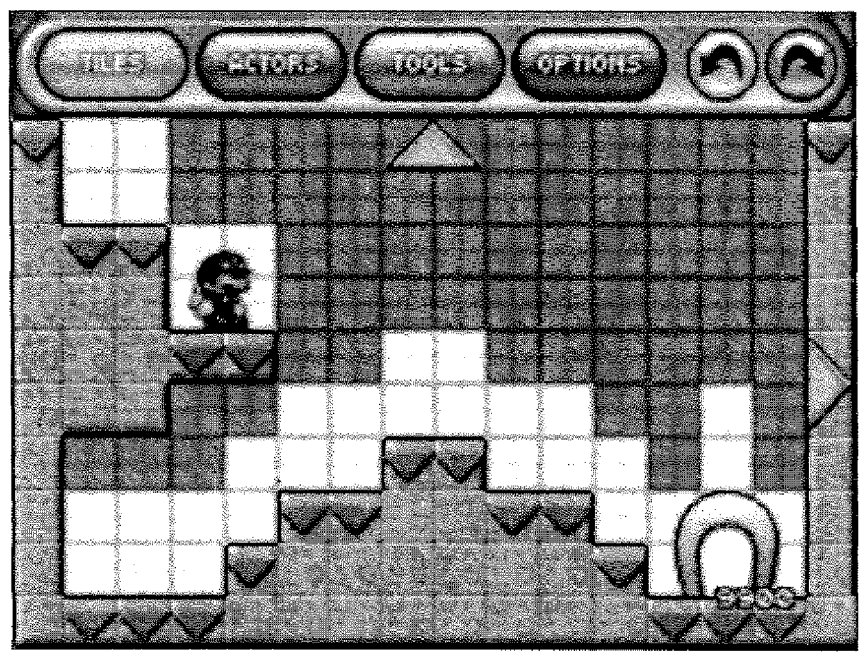
Figure 24K:
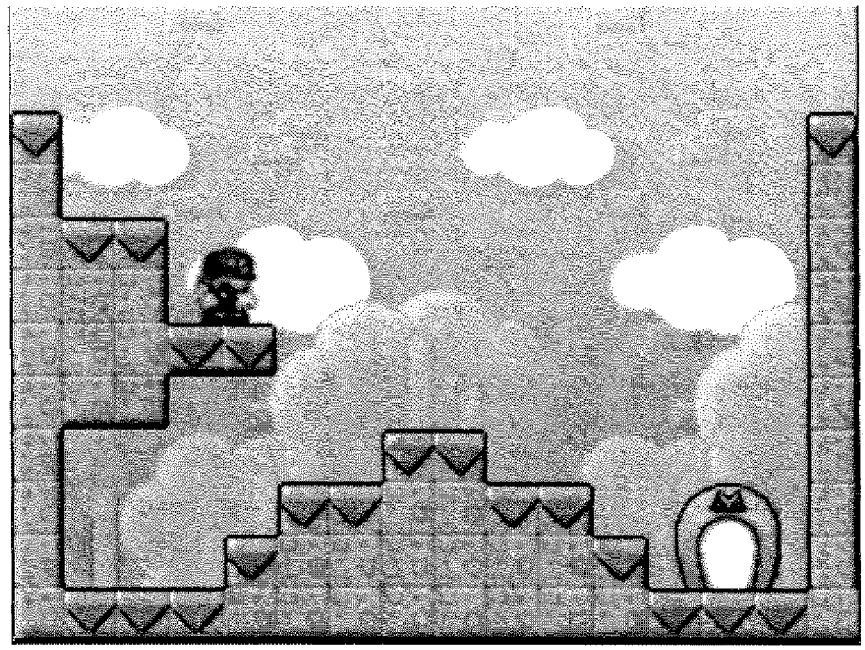
Figure 24L:
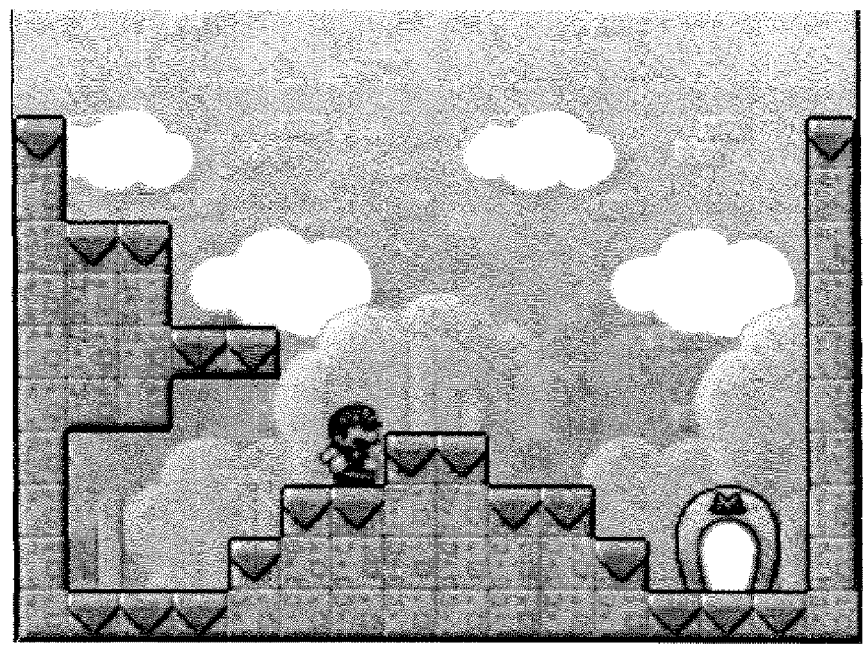
Figure 24M:
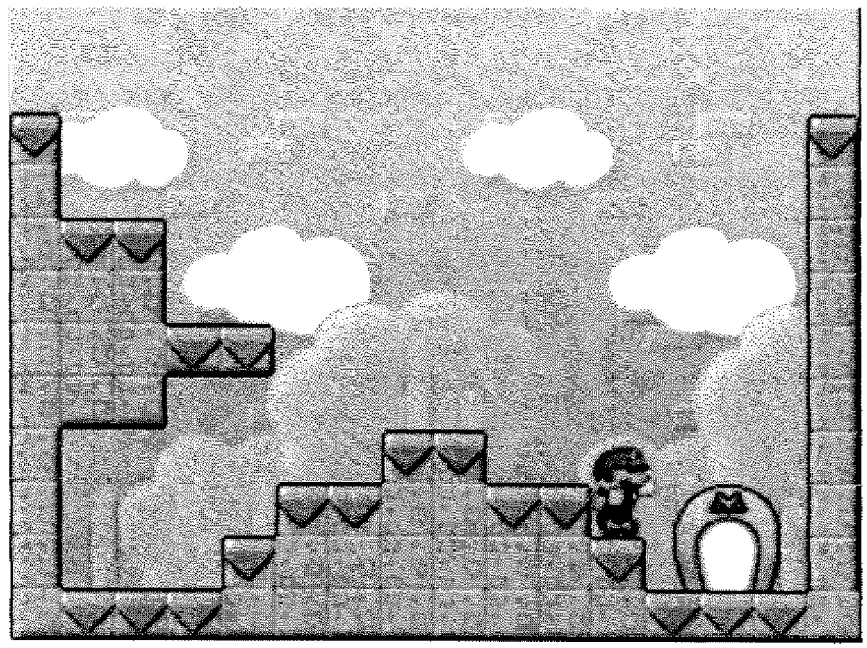
Figure 24N:
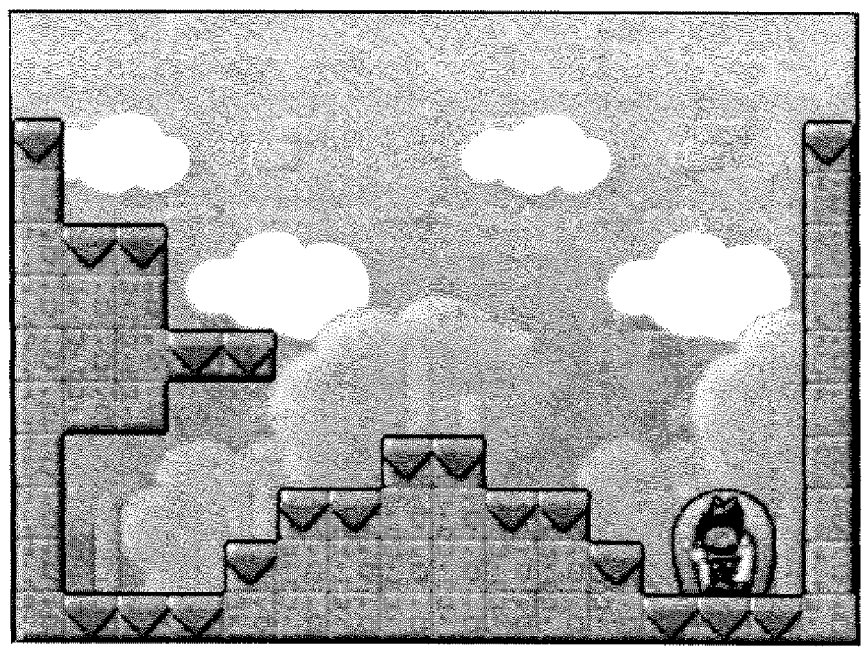
Figure 24O:
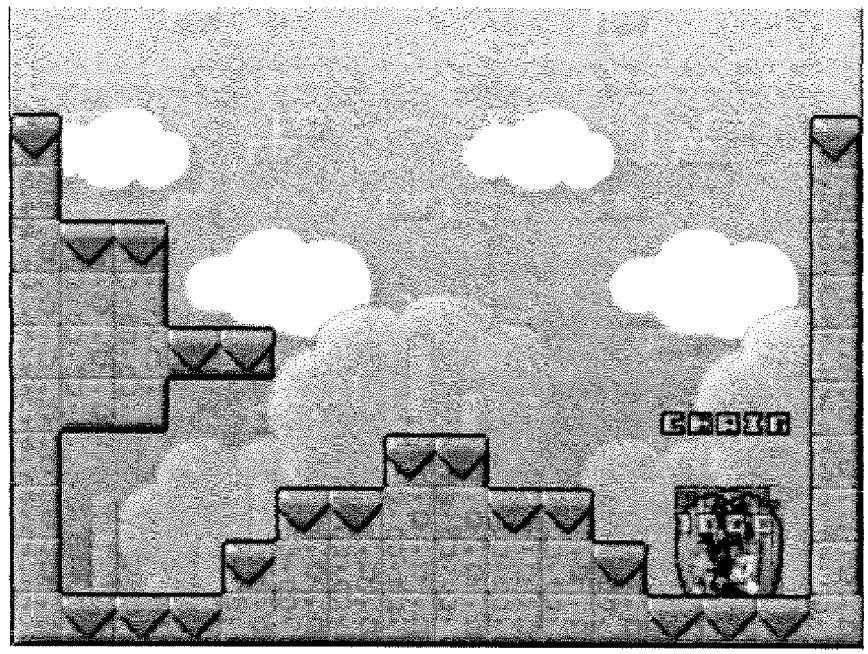
Figure 24P:
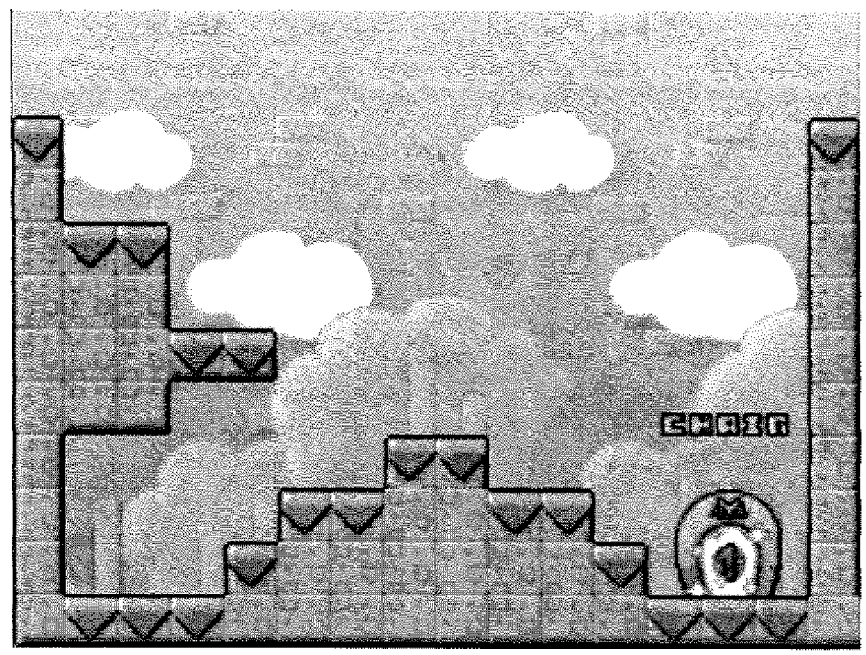
Figure 24Q:
Figure 24R:
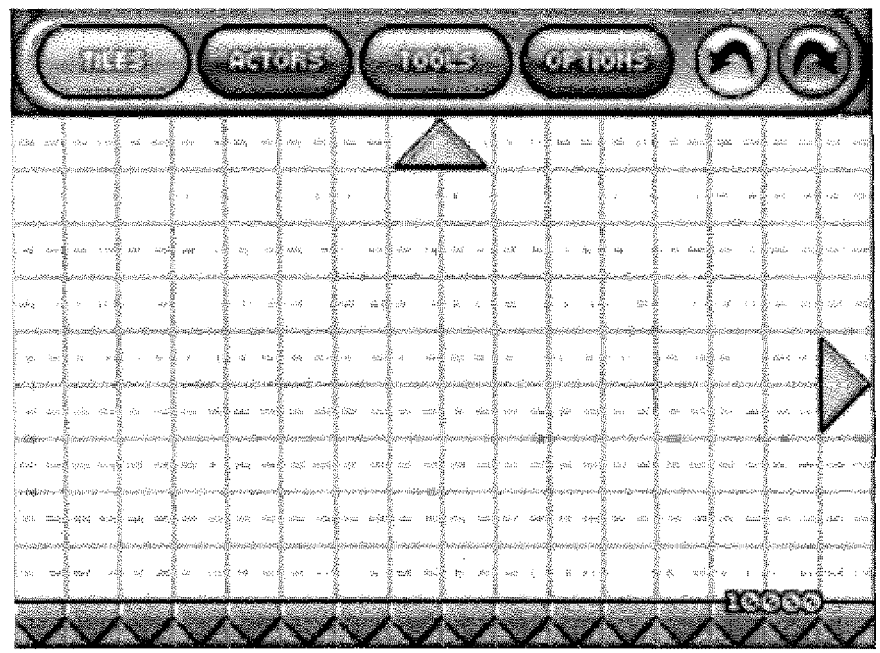
Figure 24S:
Figure 24T:
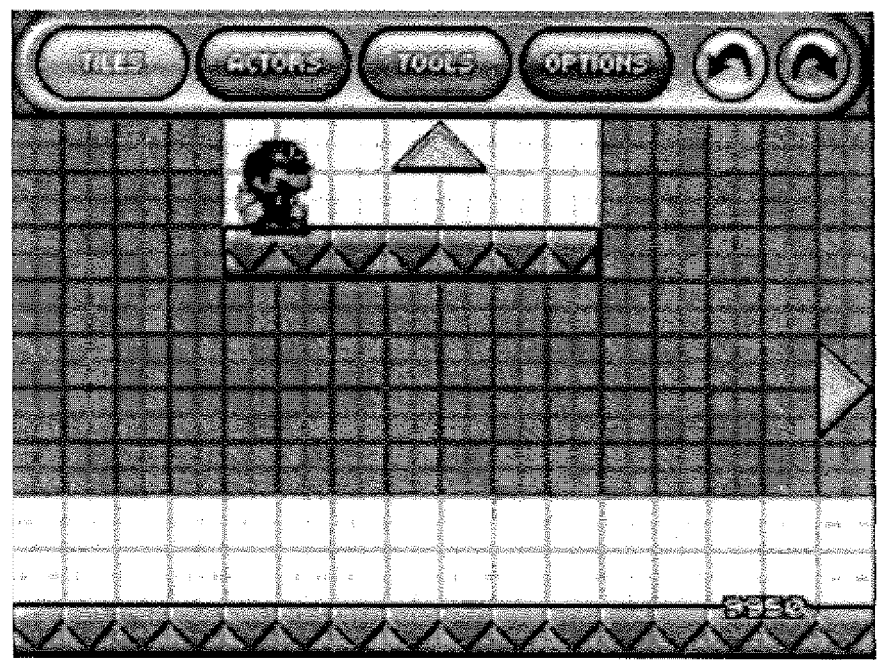
Figure 24U:
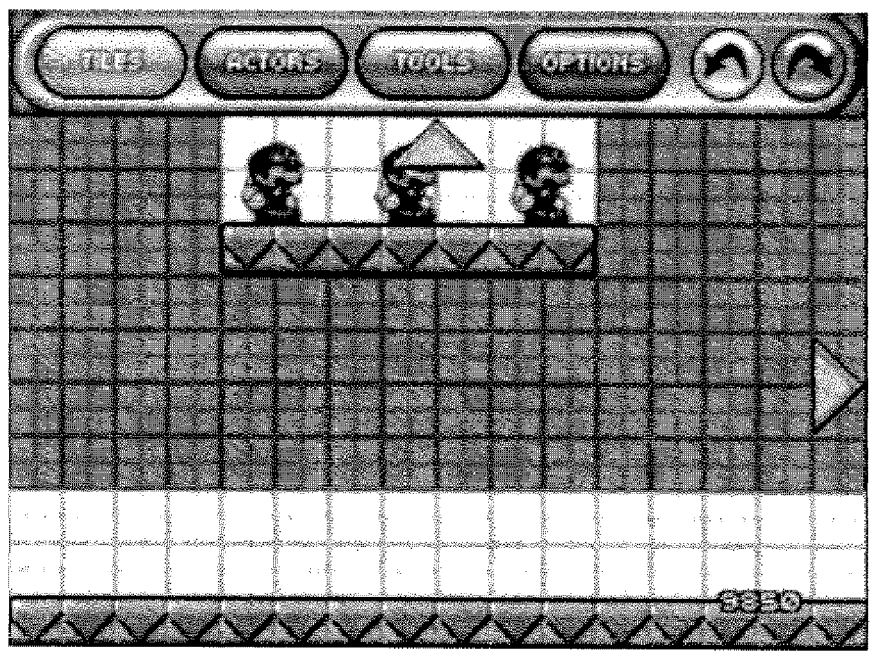
Figure 24V:
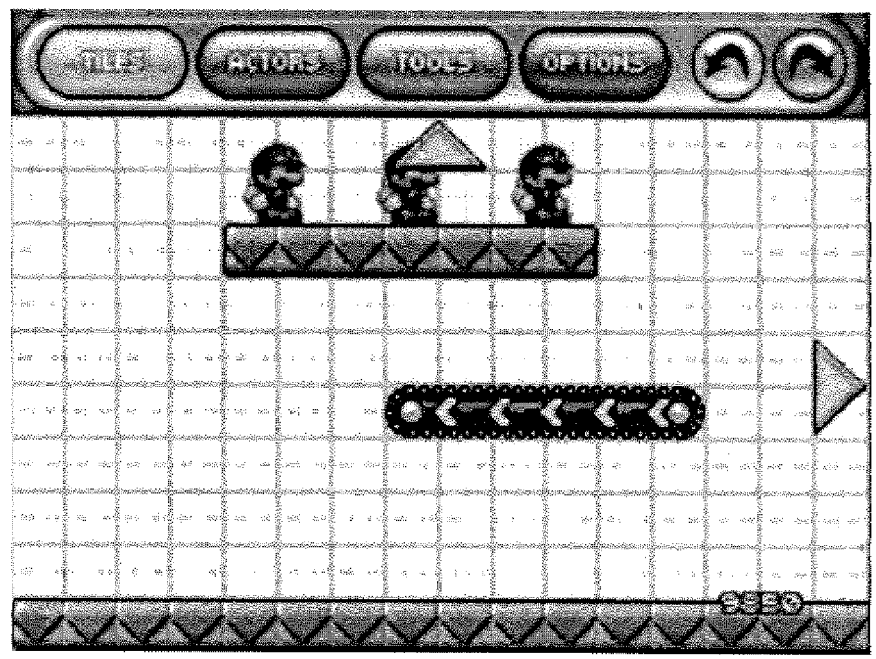
Figure 24W:
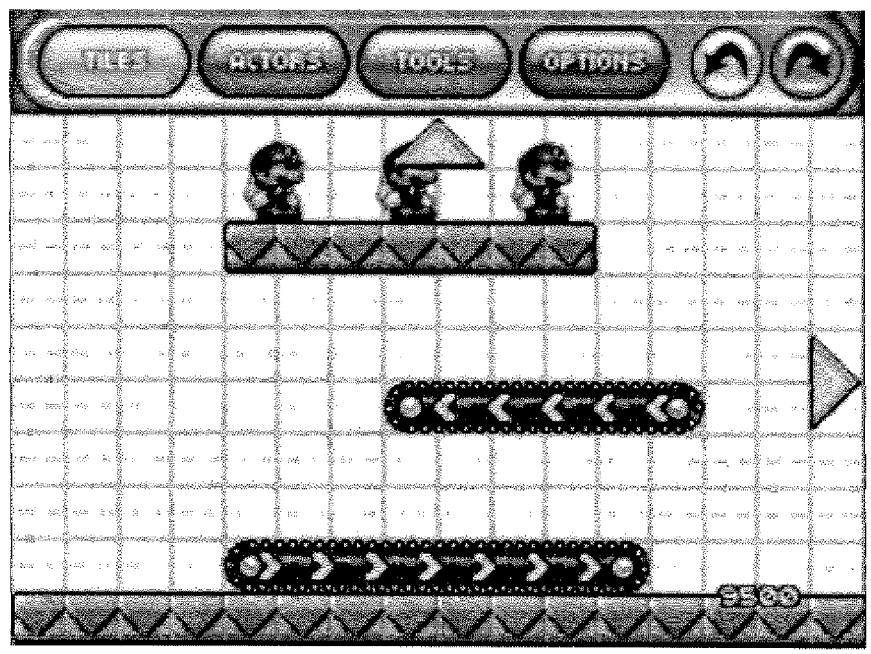
Figure 24X:
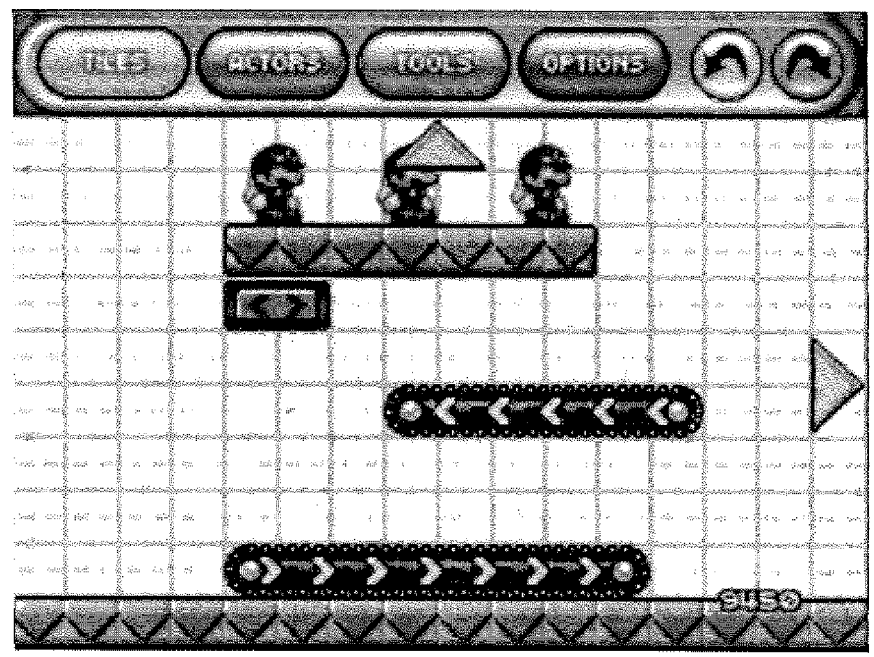
Figure 24Y:
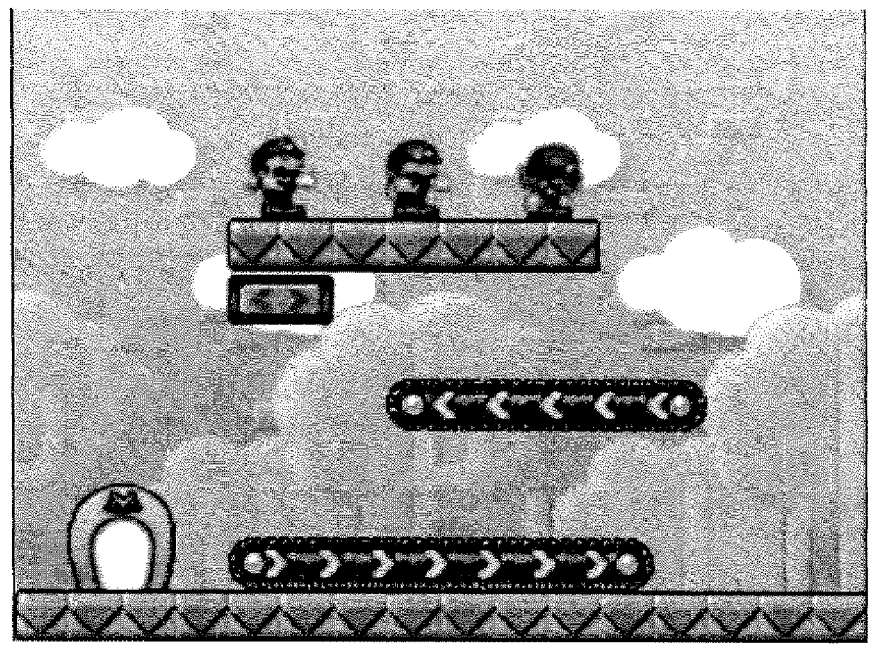
Figure 24Z:
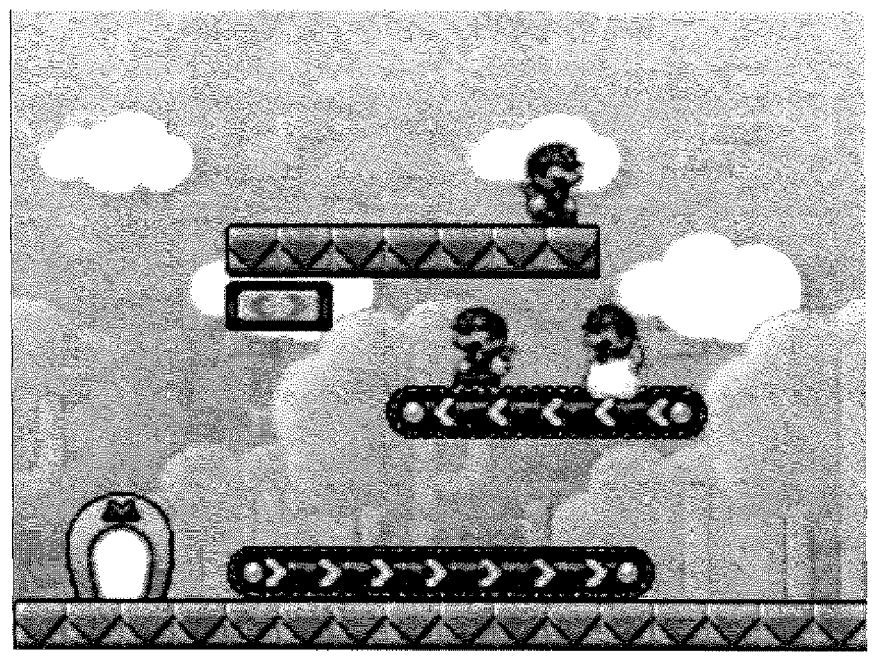
Figure 25A:
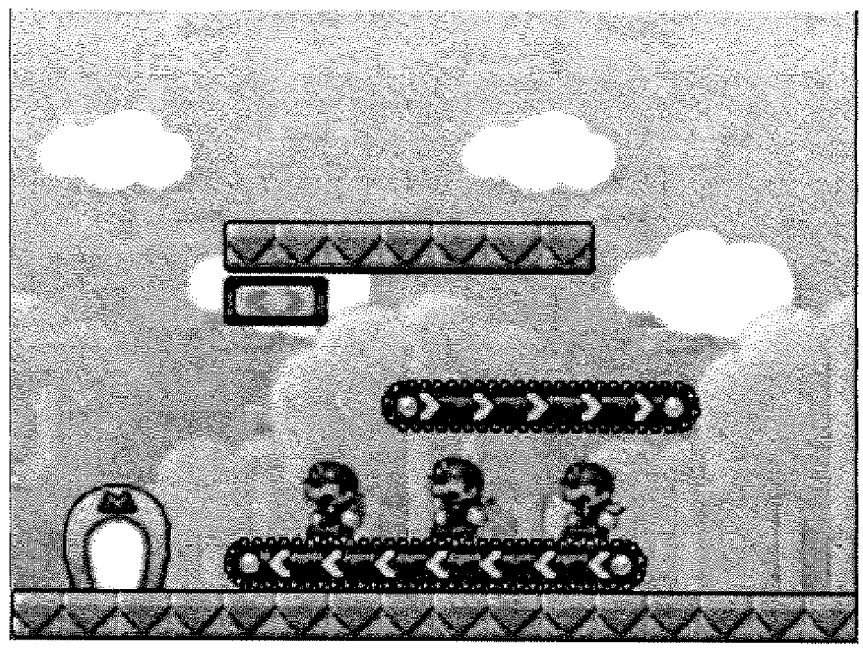
Figure 25B:
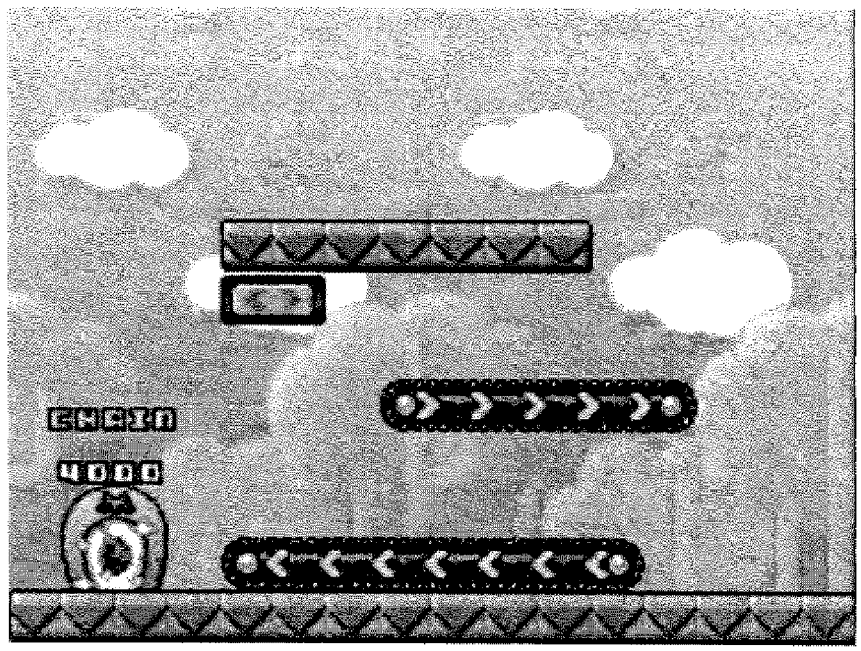
Figure 25C:
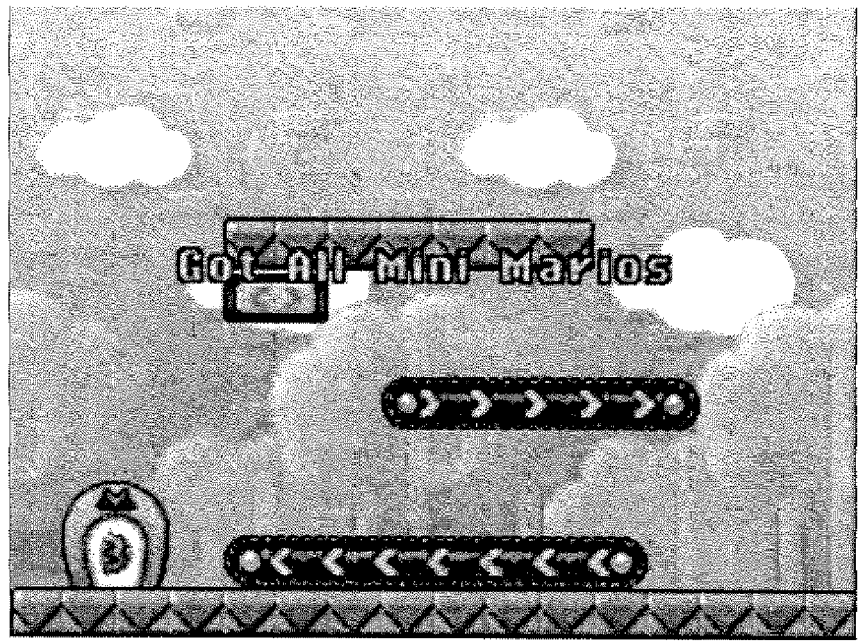
Figure 25D:
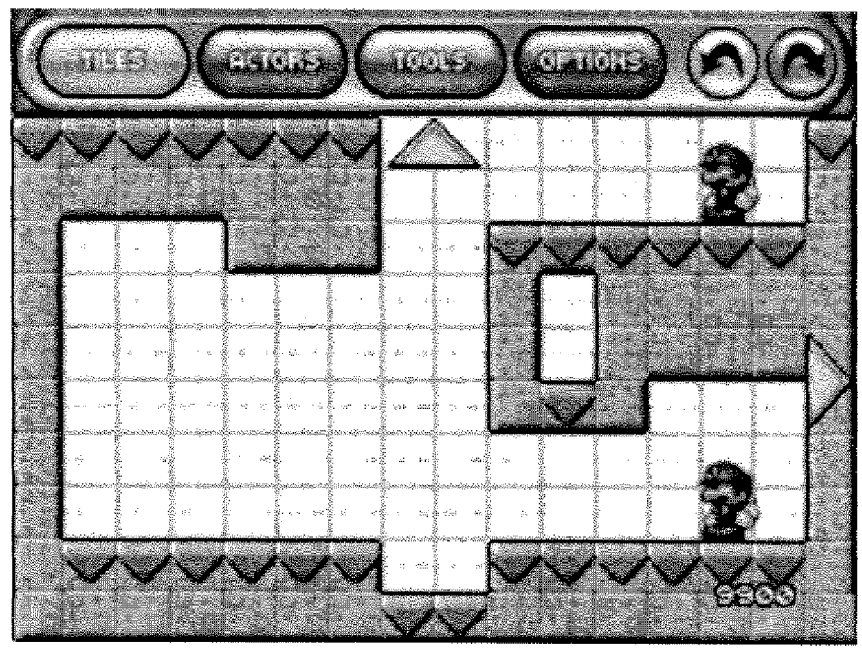
Figure 25E:
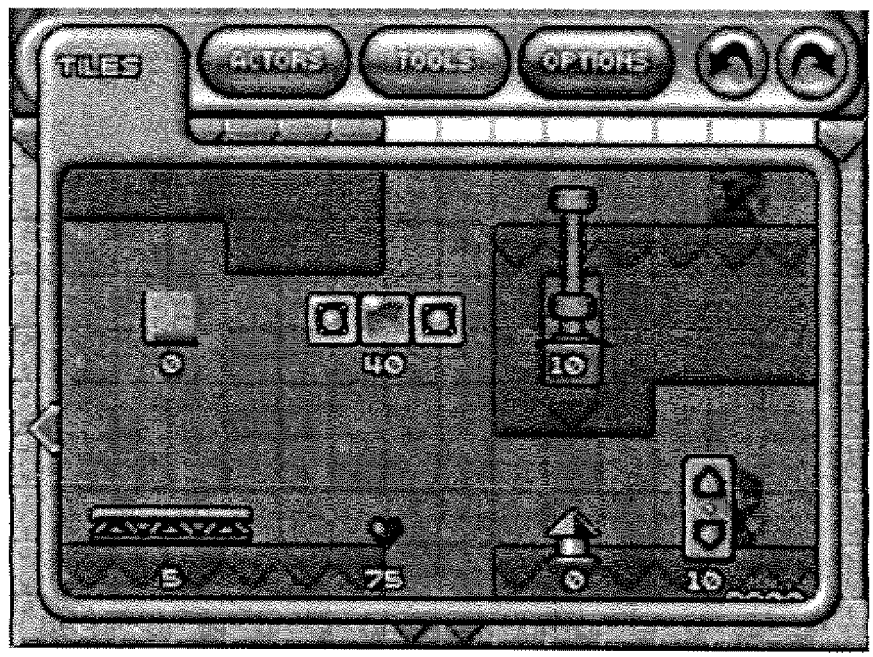
Figure 25F:
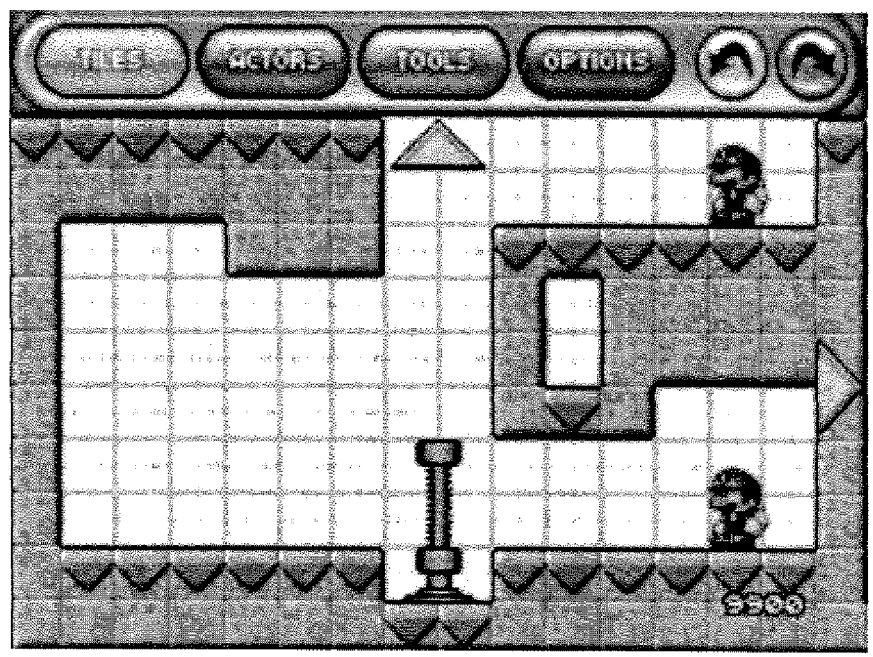
Figure 25G:
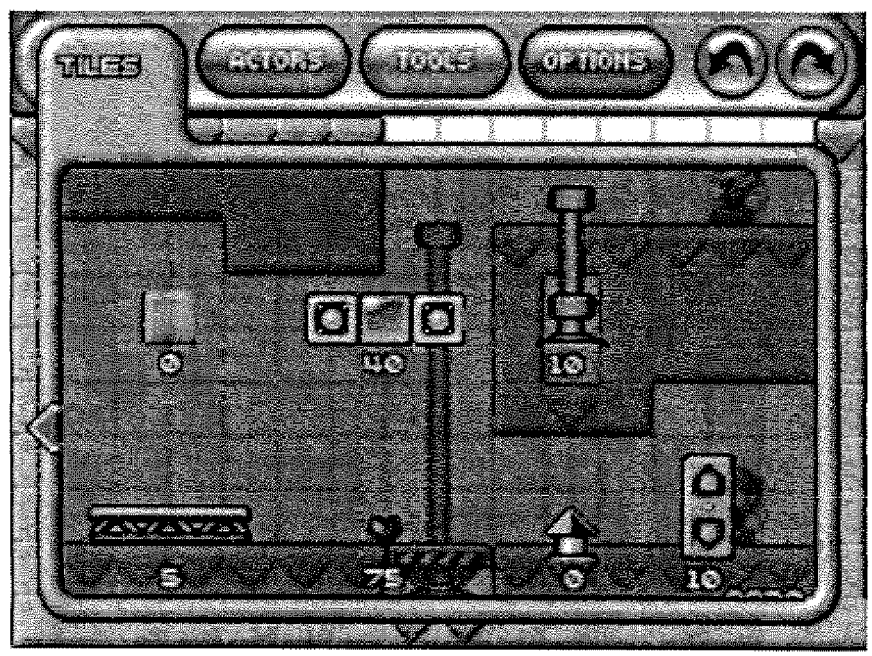
Figure 25H:
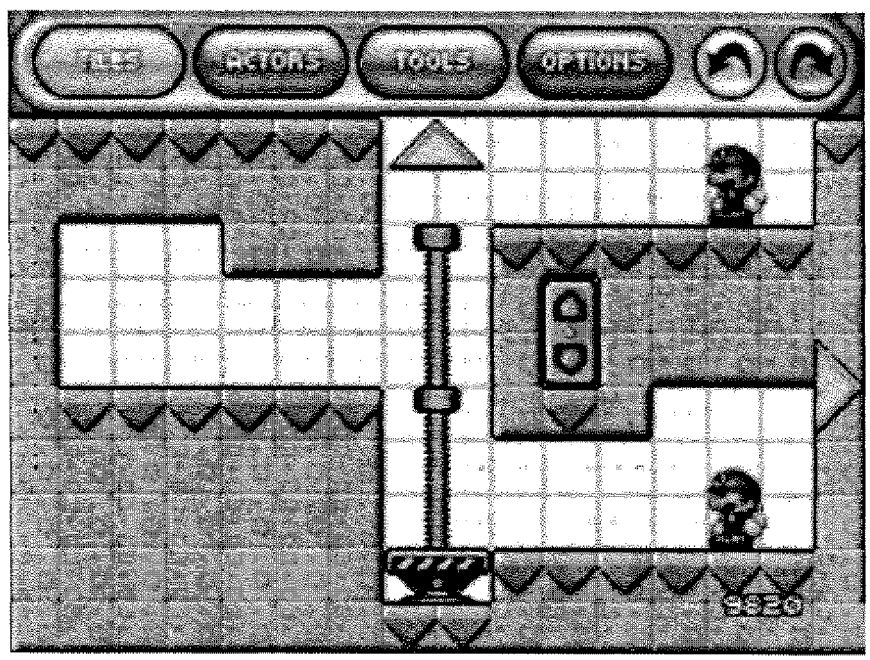
Figure 25I:
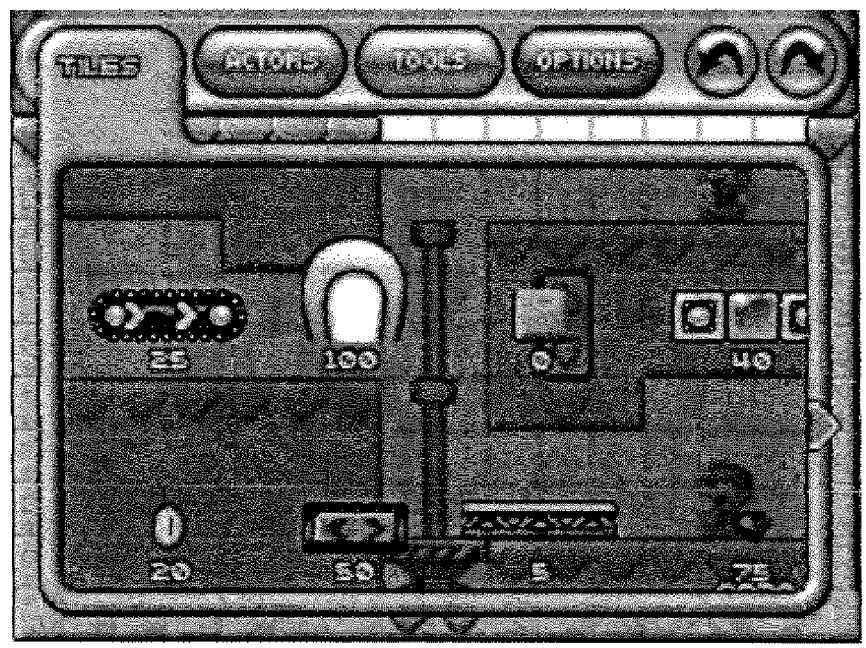
Figure 25J:
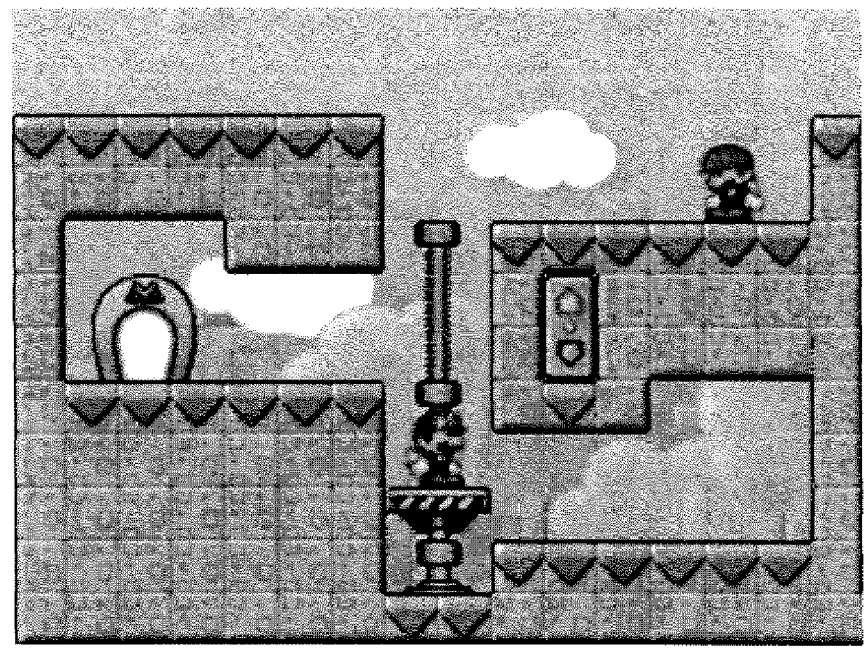
Figure 25K:
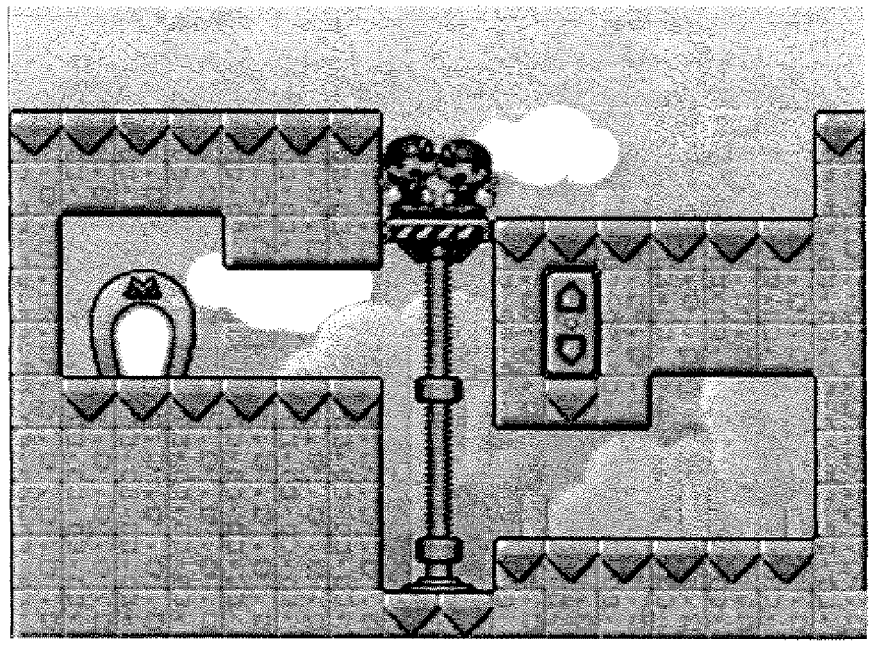
Figure 25L:
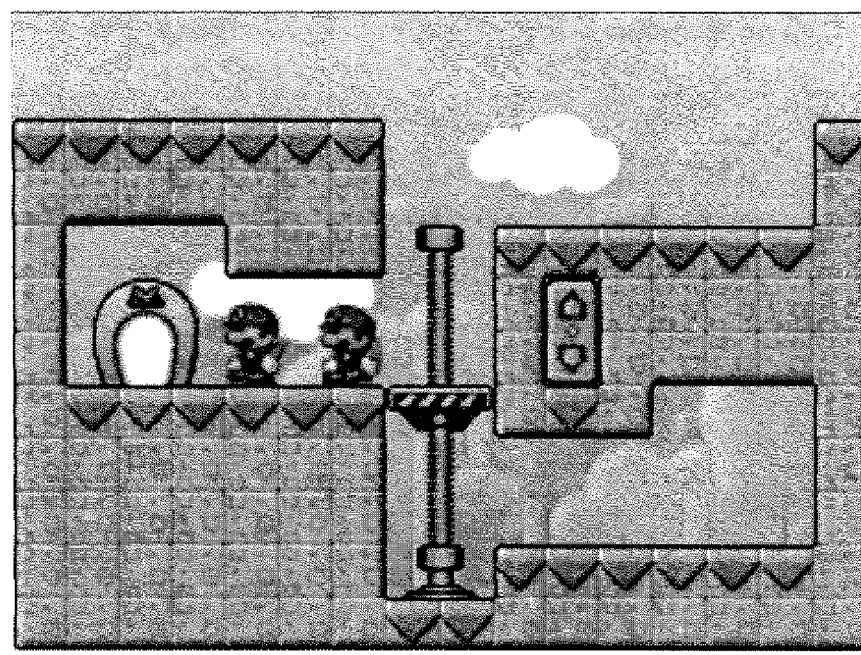
Figure 25M:
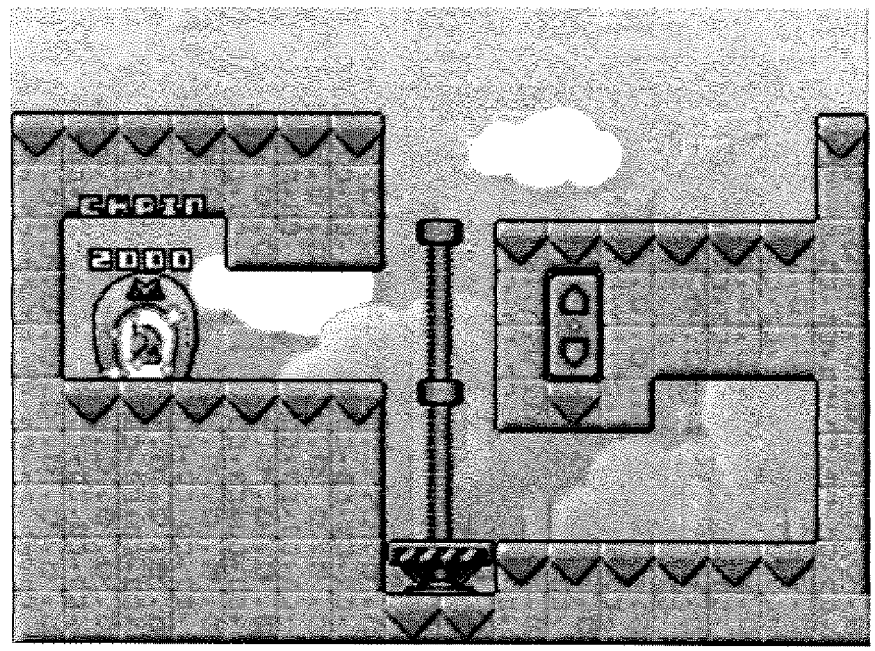
Figure 25N:
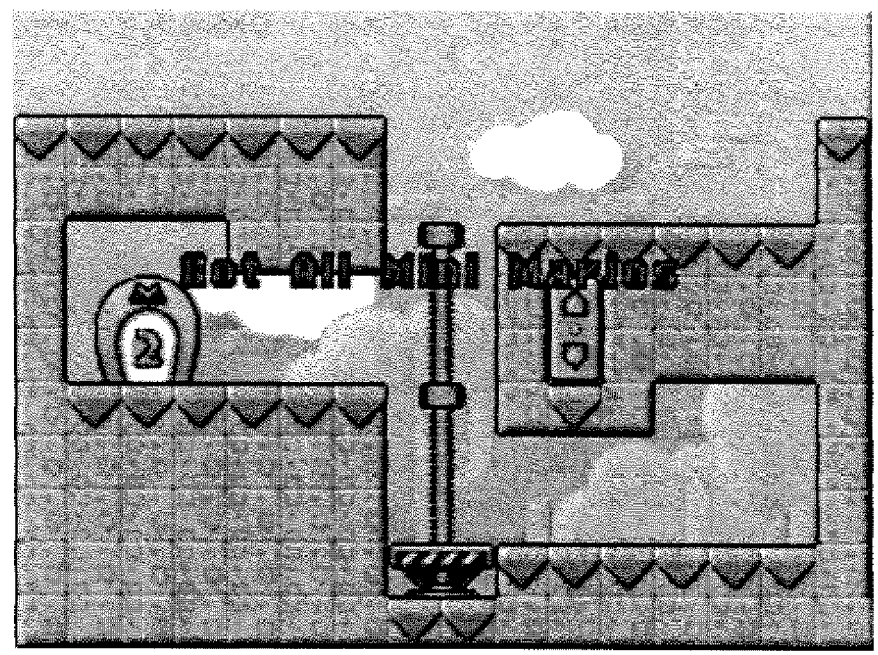
Figure 25O:
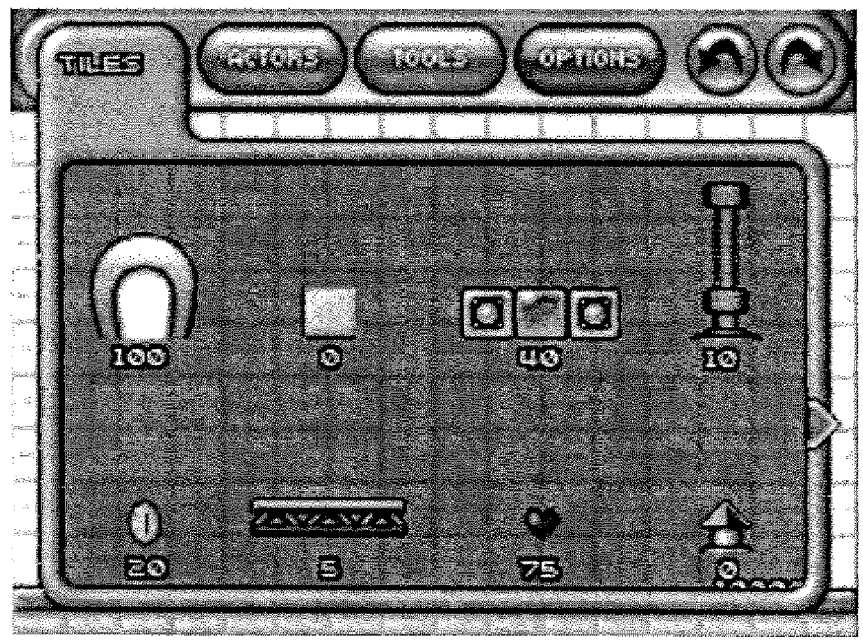
Figure 25P:
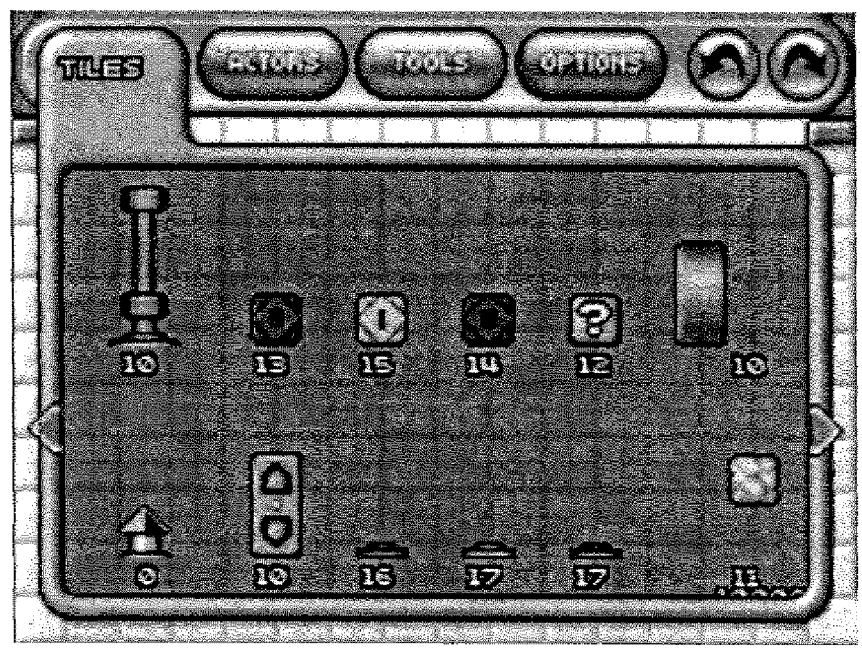
Figure 25Q:
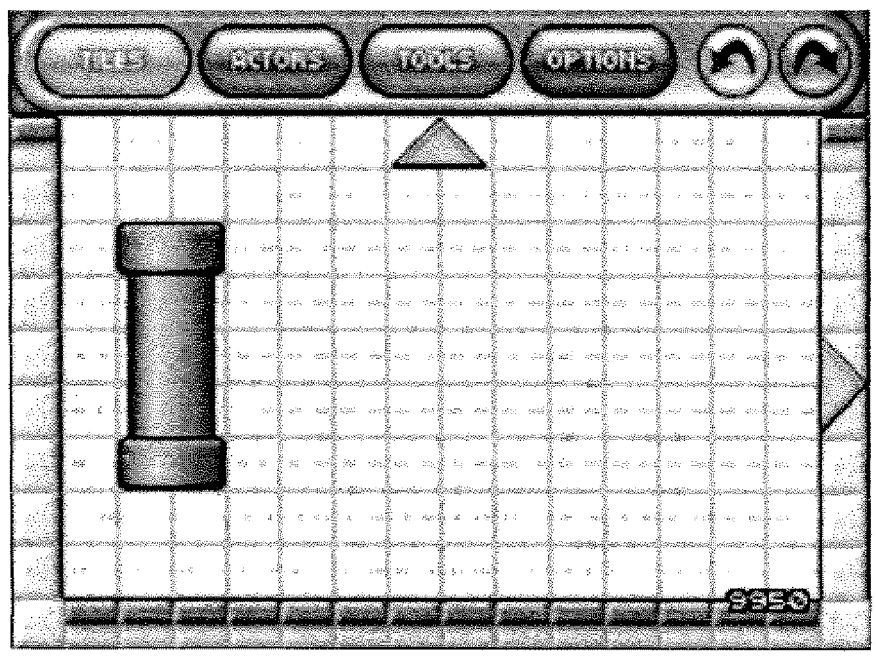
Figure 25R:
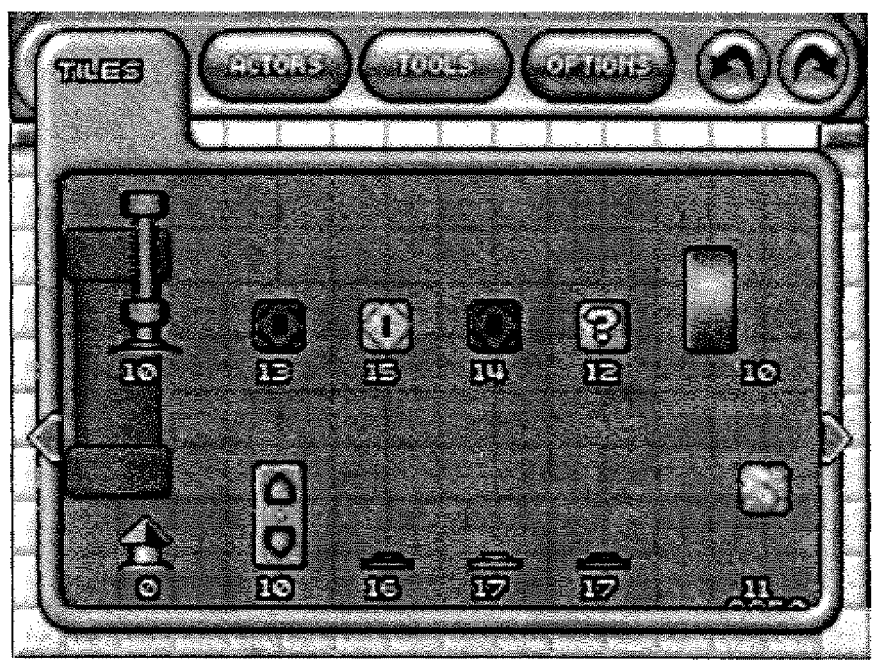
Figure 25S:
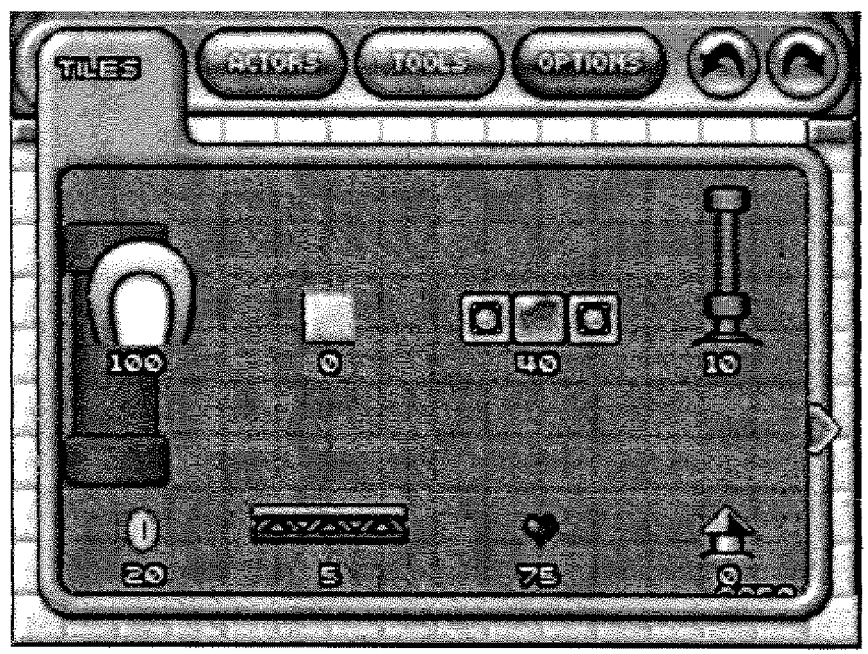
Figure 25T:
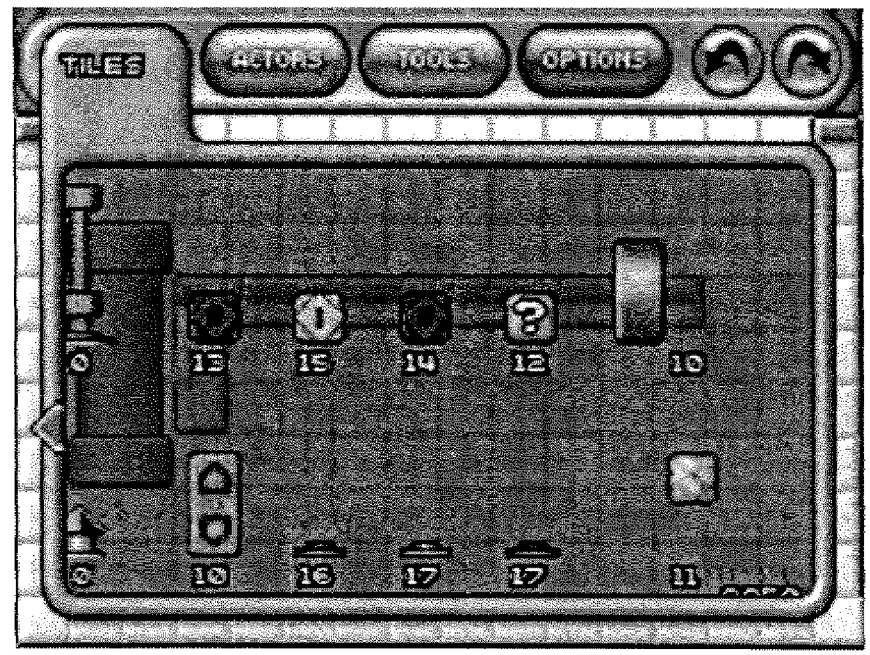
Figure 25U:
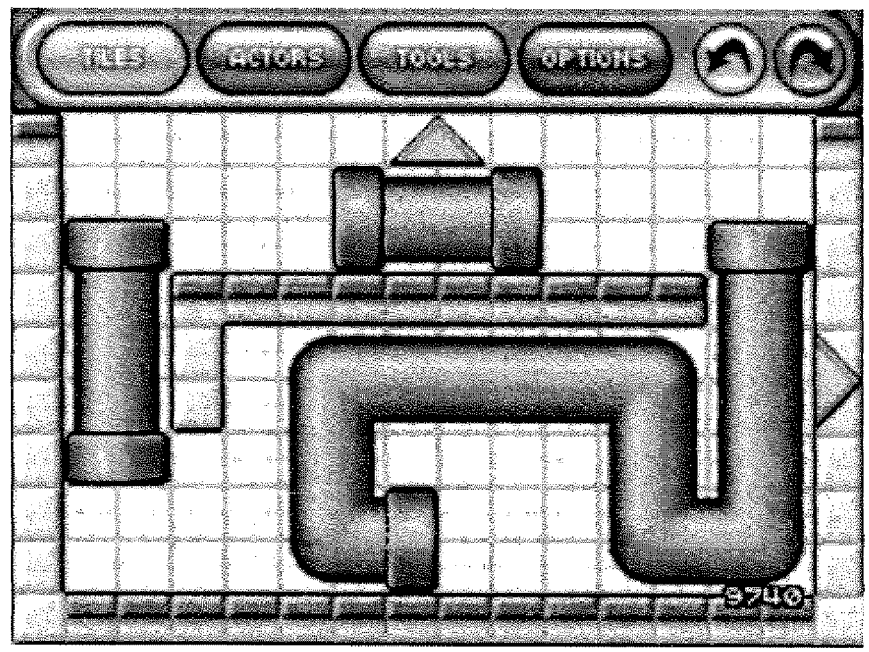
Figure 25V:
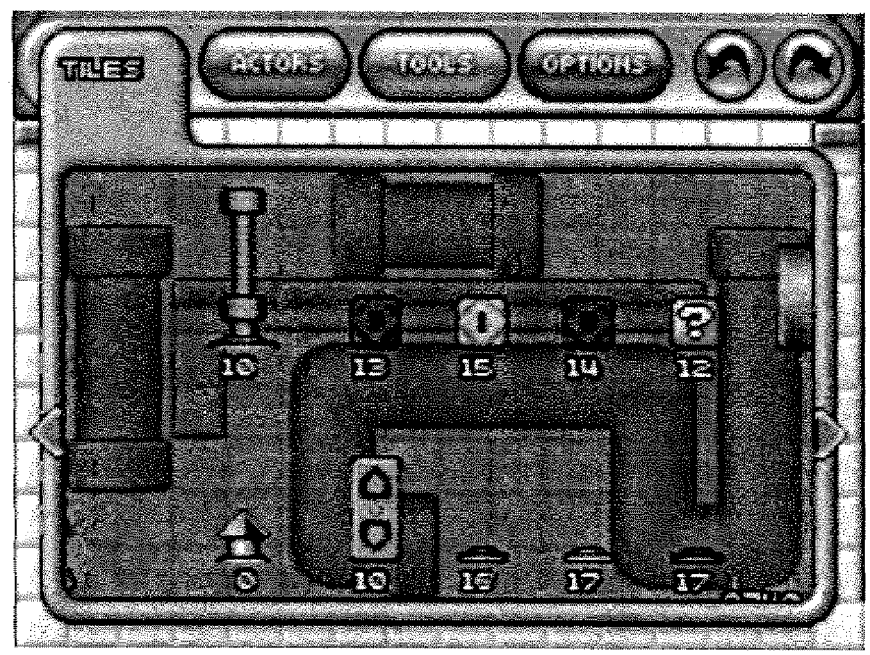
Figure 25W:
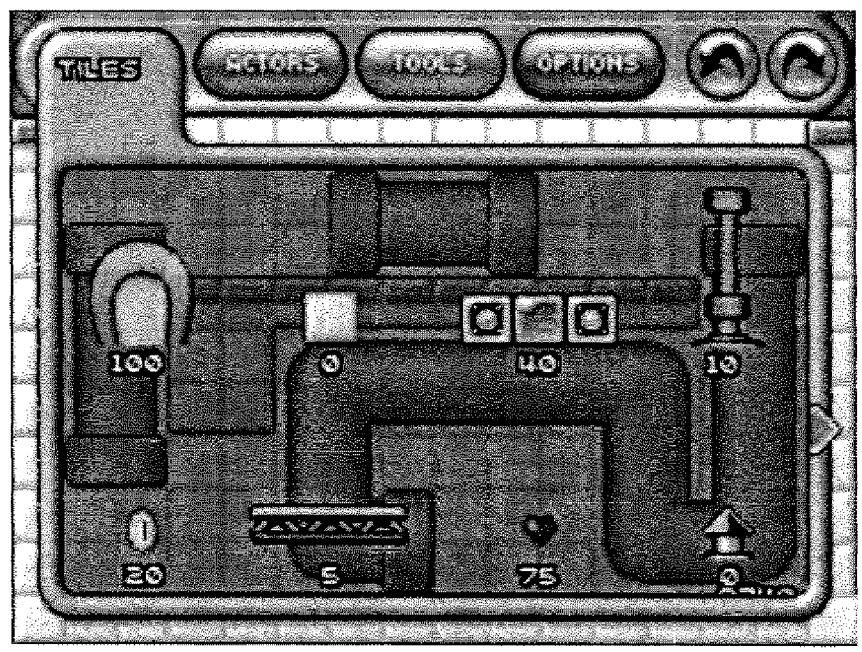
Figure 25X:
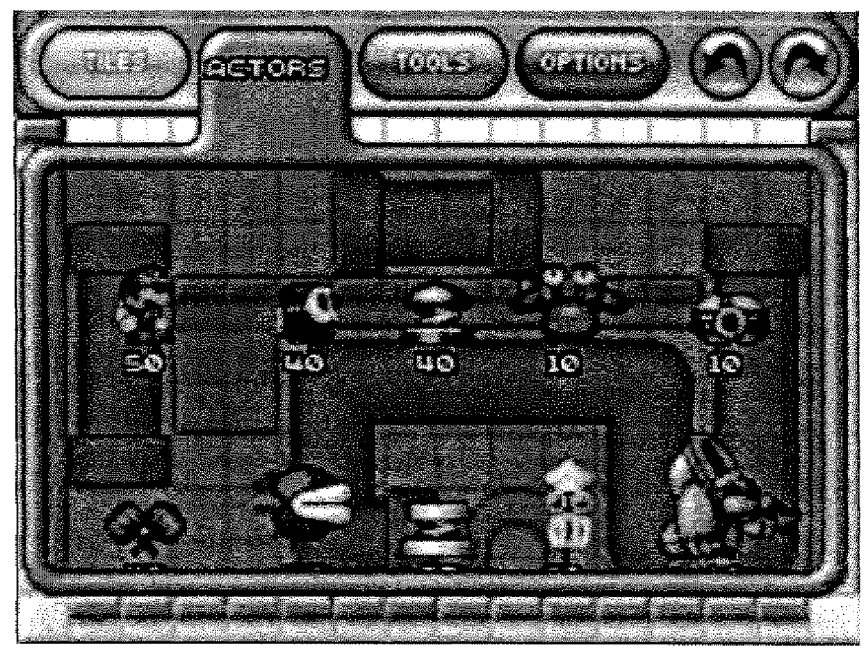
Figure 25Y:
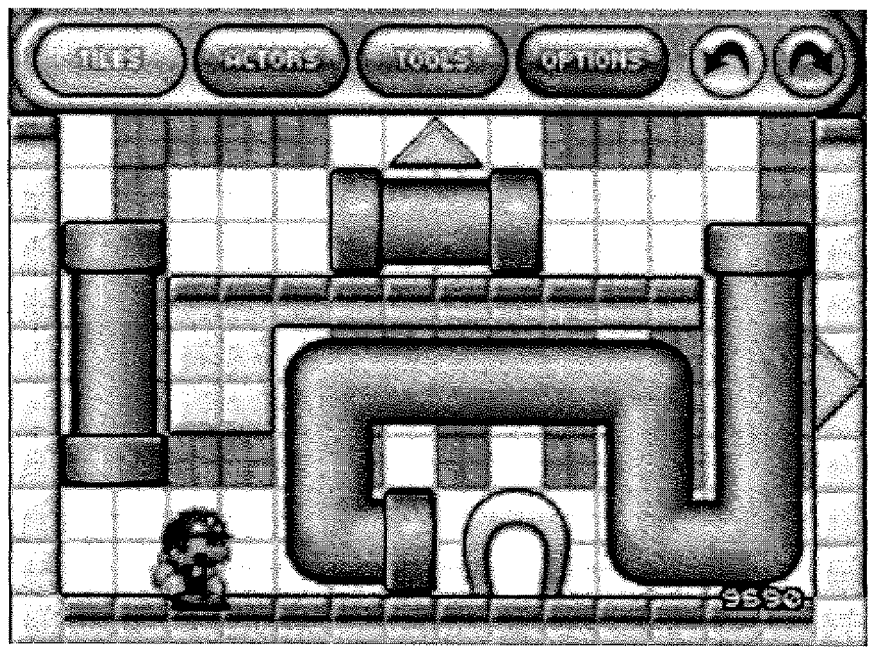
Figure 25Z:
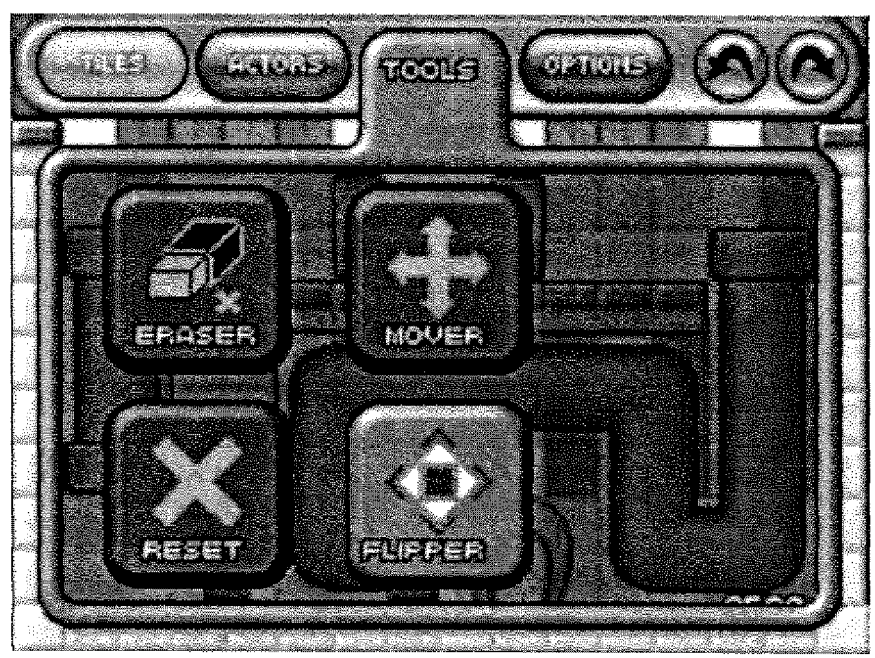
Figure 26A:
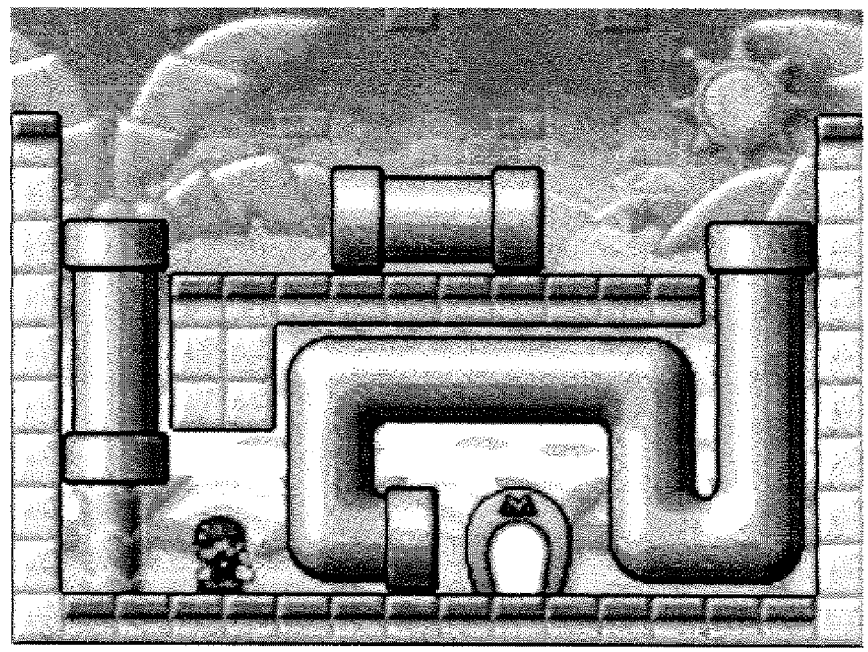
Figure 26B:
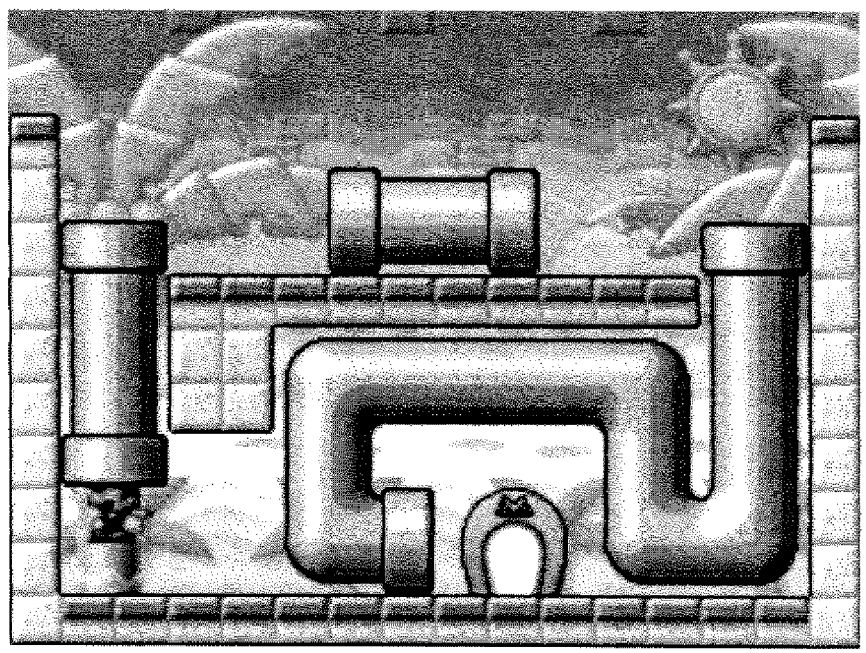
Figure 26C:
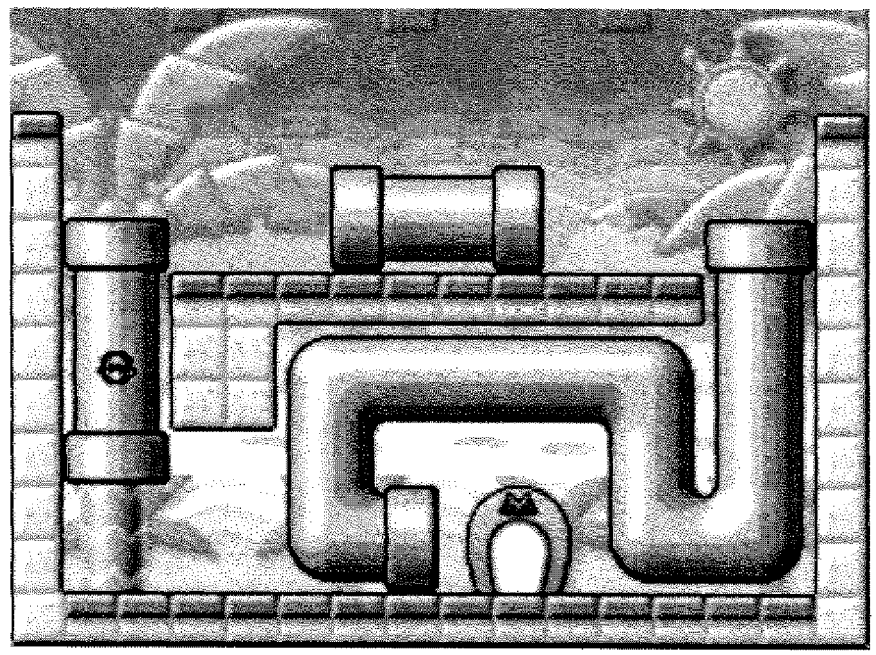
Figure 26D:
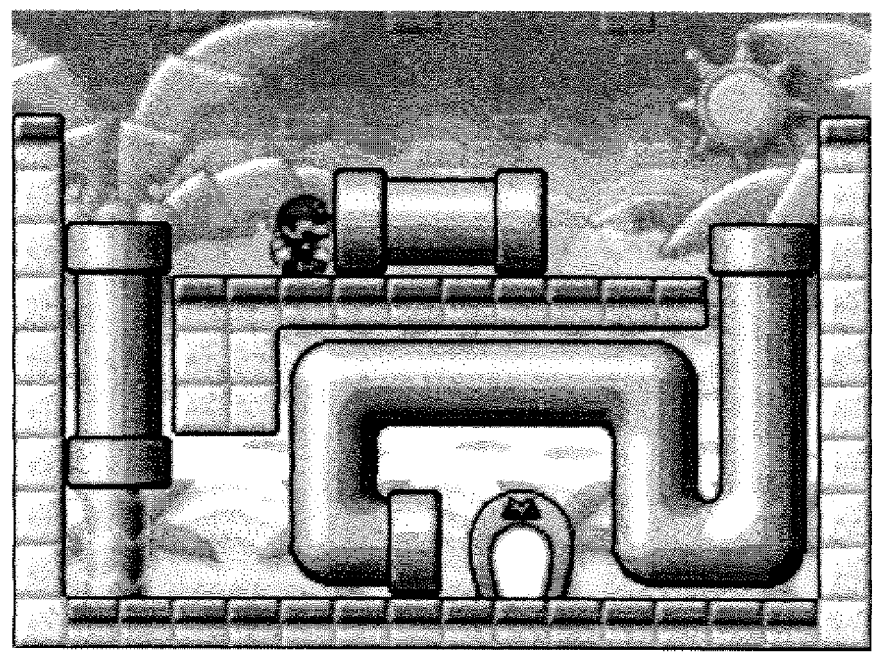
Figure 26E:
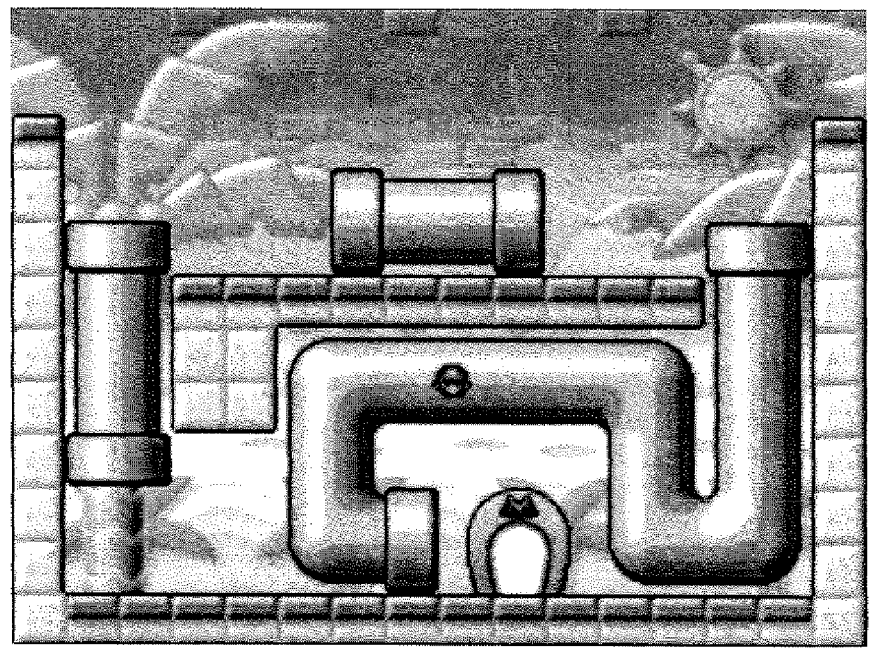
Figure 26F:
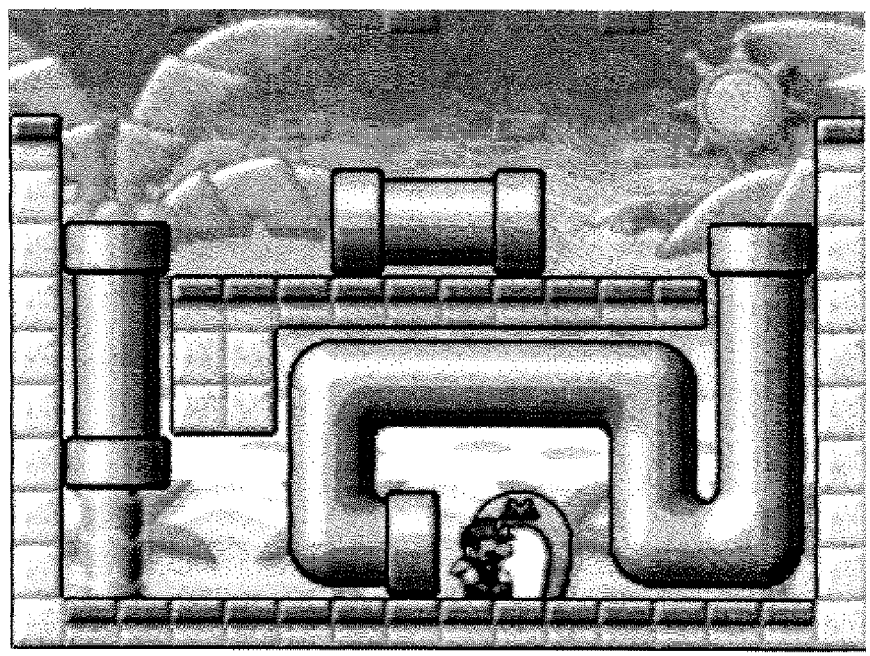
Figure 26G:
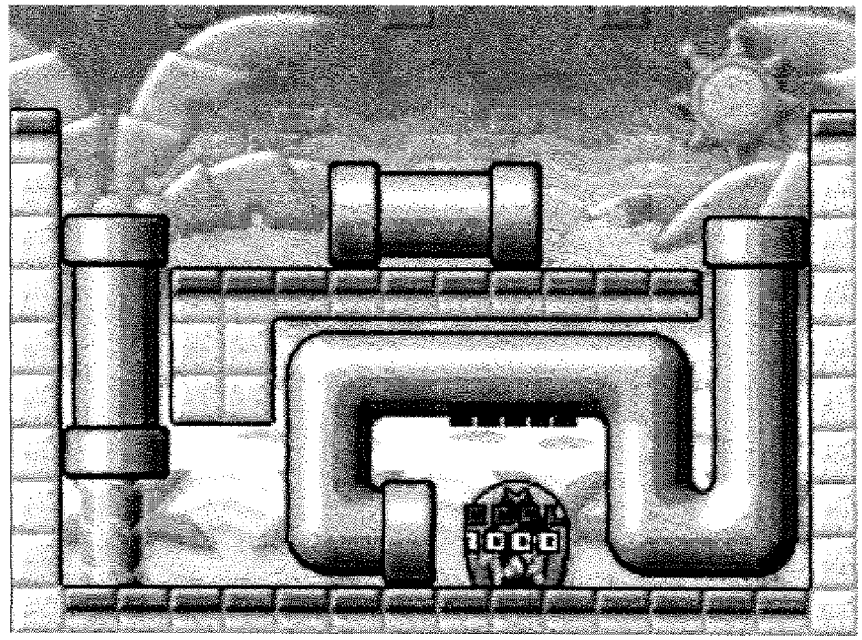
Figure 26H:
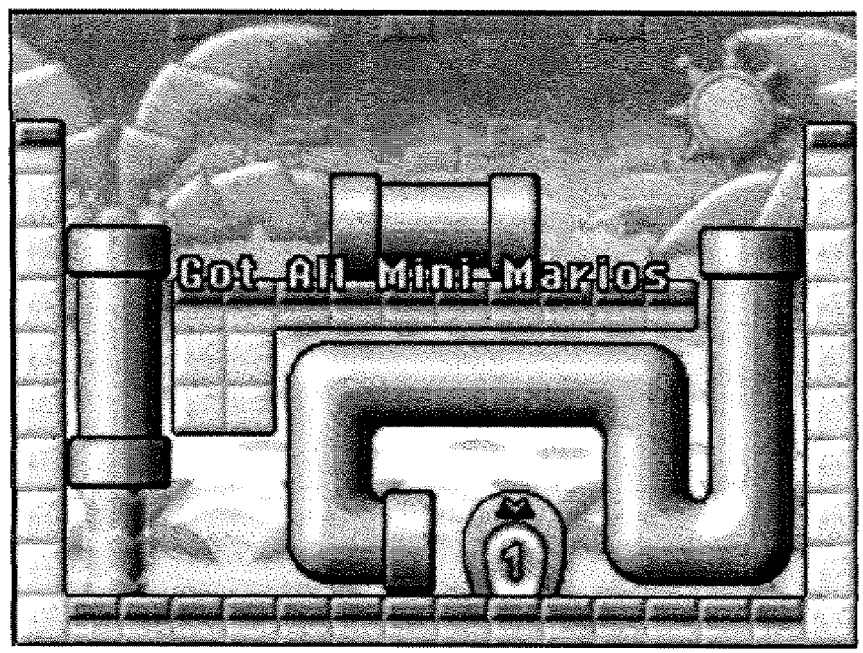

In one exemplary illustrative non-limiting implementation, game editing (see FIG. 24A and following) can provide a set of options including for example:
  Tiles
  Actors
  Tools
  Options.

In one exemplary illustrative non-limiting implementation, selecting "tiles" can display a repertoire of icons representing objects the user can select to be deposited and placed within a 2D or 3D game play landscape. Any time of objects could be provided such as bricks, doorways, conveyor belts, hearts, coins, etc. Such object displays can be scrolled to provide a repertoire or set of any desired number of objects.

After selecting one of the icons (e.g., by placing the stylus above the object and pressing down, moving a cursor onto the object, or other selection process), the user may then display a background that may or may not have a grid displayed thereon. Use of a grid may help align objects relative to one another. By indicating positions on the background, the user may command the editor to deposit instances of the object(s) represented by the icon at the points indicated by the stylus or other position indicating means.

For example, if the user selects a building block, then touching the stylus onto a grid position can cause an instance of that building block to be deposited at that position. In the exemplary illustrative non-limiting implementation, tracing a path across the background with the stylus or other pointing means can deposit row or column of building blocks—the user thus being able to "draw" in bricks, hearts or any other object. Such drawing is performed as an animation so the user can see the game level being created in a dynamic interactive way before his or her eyes in a fun and interactive way. Creating a vertical, horizontal or otherwise oriented structure of repetitively deposited identical or non-identical objects by simply tracing a gesture with a stylus pen or a cursor allows the user to rapidly and efficiently create interesting structures without having to go through the drudgery or depositing copies of the selected object one at a time. Scrolling functionality can be provided to the environments automatically in an automated fashion so the user does not need to worry about what portion of the environment is displayed at any given time.

In one exemplary illustrative non-limiting implementation, while the user continues to "draw" such structure without yet lifting the stylus from the touchscreen, the editor distinctively indicates the structure is still tentative and not yet "permanent" by marking it distinctively (e.g., with a green arrow in one exemplary illustrative non-limiting implementation). The user can "finalize" the structure (making it "permanent") by lifting the stylus from the touchscreen—thereby causing all of the tentative markers to disappear and the structure to become "permanent" (in one exemplary illustrative non-limiting implementation, the structure may be temporarily magnified as the markers are removed to indicate graphically to the user that the structure is now "permanent"). While the structure is still tentative, the user may simply reverse the course of the stylus to remove objects that have only been tentatively deposited. An "undo" function may be provided to remove the last-deposited object or set of objects. The "undo" function can have multiple levels to allow the last several additions to be removed in turn. For example, the "tools" menu can provide an eraser, a flipper (to flip the direction or position of an object horizontally and/or vertically), a mover (to move an already deposited object from one position to another), and a "reset". Different tools can be provided for different objects being deposited.

As the user deposits objects, the game editor may exercise automatic control over some aspects of the where the objects are placed. For example, the exemplary illustrative non-limiting game editor may automatically align the objects being deposited with grid lines or other desired positions using a "closest cell" calculation for example so that the user need not worry about precisely tracing straight lines or others indicating exact positions. The editor may automatically reshape objects being drawn so that for example pipes are always drawn with curved angles. Also, certain objects may be automatically aligned with other features in the game space (for example, the editor may autocomplete walls so they extend down to the ground instead of hanging in midair. The editor may represent what appears to be identical deposited objects with different types of internal representations to provide different functionality at different positions. The editor may permit the user to move an object from one position to another by dragging and dropping.

If the user attempts to locate a certain feature (e.g., an entranceway) in a non-functional place, the editor may simply refuse to draw it there and/or it may deposit in another place instead. For example, the editor can refuse to draw structures at positions that would make these or other structures non-functional. For example, the editor can ensure that doors, platforms, elevators, pipes, and other structures are always automatically deposited in places and automatically dimensioned such that game characters can access and make use of them. The editor can use collision detection to automatically ensure that such structures don't accidentally cover or obstruct other structures to make those or other structures non-functional. For example, a pipe cannot be drawn over a platform but may be placed on top of the platform, and elevator objects, conveyor belts, pipes and other character conveyance means can be automatically dimensioned so they are useful for transporting game characters from one platform to the next without the end user having to specify where to place different parts of the elevator, conveyor belt, pipe or other character conveyance. The end user can watch on the screen as he builds the game play environment by adding object after object and feature after feature.

The editor may add additional interactive and/or other features automatically as the user draws in additional objects. For example, the editor may automatically recognize the point at which user-added features touch, intersect, cross or otherwise interact, and may add a distinctive feature such as a special color or special function where this occurs. The editor may automatically, in an intelligent fashion, decide the direction in which character moving mechanisms such as conveyor belts, vehicles, merry go rounds or other animated objects move, which way entrance and exit passages point, etc. so that characters are effectively transported and/or movable between start and finish positions without the end user needing to worry about making mistakes. Thus, while the end user is exercising a high degree of control over the design of the game environment and associated game play, the game editor automatically guides the user and can add special features to make the resulting environment and associated game play even more interesting and functional.

By selecting "actors", the end user can select animated game characters to interact with the game play environment he or she has designed. Such "actors" can comprise a variety of different animated characters such as humans and animals. In the exemplary illustrative non-limiting implementation, the game editor has presized the game characters relative to the "tiles" or objects the user has deposited in the game play world so the characters can effective interact with the objects without being too big or too small. The editor may automatically animate such characters and associated environment objects so the end user does not need to worry about how the character will move. For example, in one specific exemplary implementation, an elevator block is a hidden block (16×16 pixel invisible block) that supports the last block near an elevator structure. When a game character detects this elevator stop block, the game character stops and waits for the elevator to come. The player doesn't need to design or specify this in the exemplary illustrative non-limiting implementation—the game software editor provides this functionality automatically. Each game character and potentially each object in the environment can come with a set of animation commands and shapes—complexity that is hidden from the end user but which are used in game play to provide an interesting and exciting game play experience.

In one exemplary illustrative non-limiting implementation, when the user activates a "test game" feature, the grid used to edit the game environment disappears and is replaced by a more interesting background such as a cloud-filled sky, an ocean, a jungle or other interesting backdrop. The editor may then automatically animate the game characters and cause them to navigate through the new game environment to test out all of the environment's structures and features. The editor may alert the end user to any problems by displaying text messages, graphically indicating problem areas using flags or other means, or by any other convenient technique.

Once the game environment has successfully passed the play test, the user can store it for later use and may in some exemplary illustrative non-limiting implementations upload it over a network onto a server for other game players to download and play. During such later play, user controls can control the animated game characters to move through the user-created virtual environment, interacting with the objects the user has deposited, collecting prizes, avoiding obstacles, etc. Scoring can be provided automatically by the game editor, or the user can provide some inputs to scoring and prizes that can be attained. For example, once the end user deposits a "goal" object such as a finish line, the game characters can automatically or under user control move toward that goal object. Once the game characters reach the goal, the game editor can automatically provide animated functionality will display indications that the characters have reached the goal, award points to the game player, display congratulation messages, etc.

Once the user has finished designing a game environment and associated game play in one exemplary illustrative non-limiting implementation, the user may upload the game via a network onto a server. Other users can retrieve the game from the server and play it on their own game playing devices. Users can provide feedback concerning the fun and functionality of the game. Good feedback can entitle the developer of the game to recognition including for example bonus points. Bonus points can be redeemed for items listed in an online or locally stored catalog. One example catalog may contain items (characters, backgrounds, structures, etc.) used for creating additional games. Users can redeem their bonus points for such game material and create ever more interesting and varied games they can upload to achieve further feedback, recognition and awards. Server software can scan uploaded material for undesired features (e.g., profanity), and may also track and score the number of downloads, popularity of various games available for download, etc. Fees can be charged for each download, a subscription service could be used, or downloads can be free, depending on the business model.

Exemplary Illustrative Non-Limiting Main Menu Flow

Figure 3:
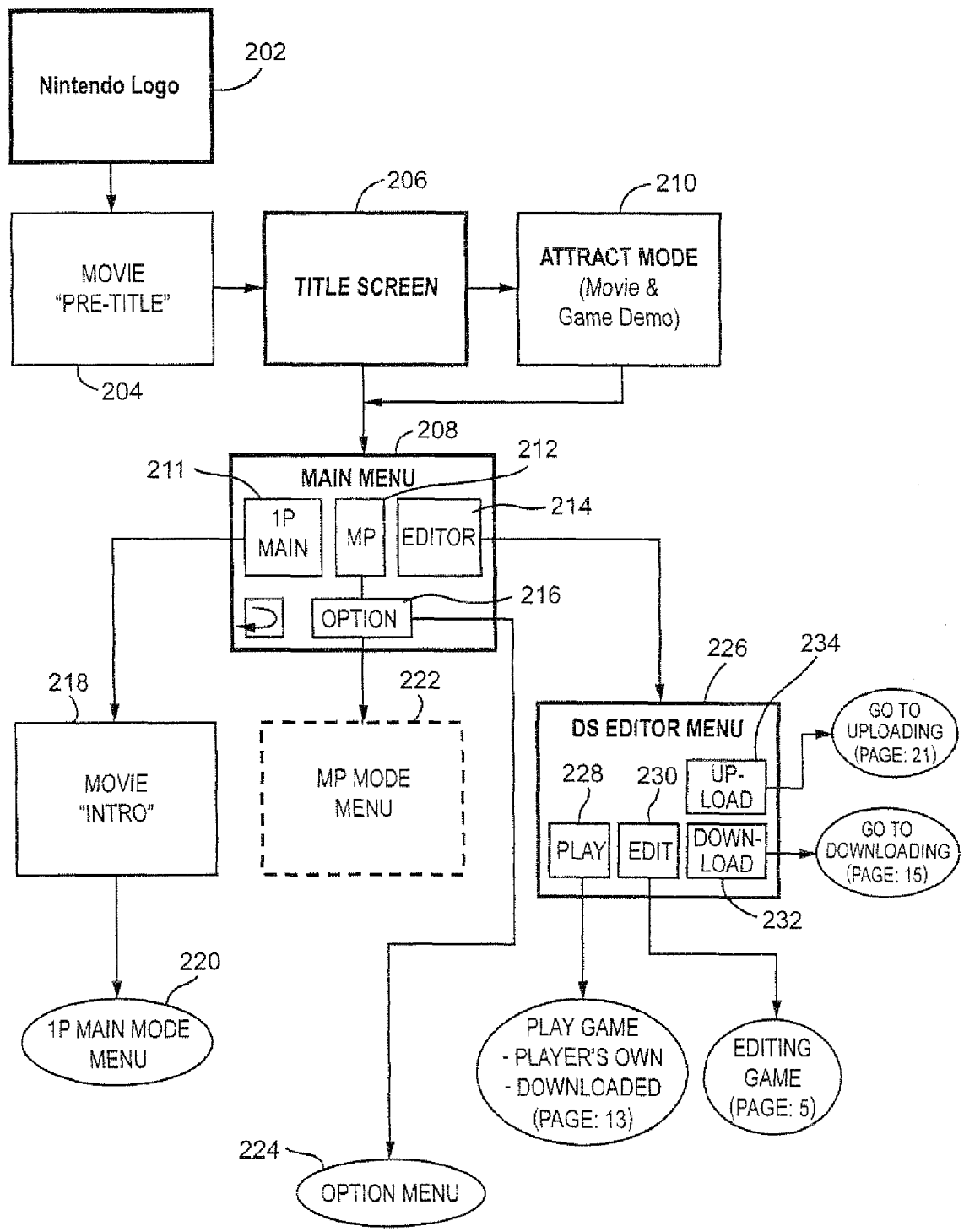
FIG. 3 is a flowchart of an exemplary overall non-limiting game play functionality including game play editor.

FIG. 3 shows an exemplary illustrative non-limiting main menu flow for a software application stored on storage device 28 and/or downloaded over a network via WiFi adapter 33. The FIG. 3 exemplary illustrative non-limiting implementation may, upon power up, display a suitable introductory logo (block 202) along with a "pre-title" movie or other presentation (block 204) and a title screen (block 206) for displaying a main menu (block 208). In one exemplary illustrative non-limiting implementation, a so-called "attract mode" presentation (block 210) may also be provided with an associated demo.

In the exemplary illustrative non-limiting implementation, main menu 208 may include a variety of functions including for example a one player main menu mode 210, a multi player mode 212, an editor mode 214 and an option selection mode 216. The single player main menu selection can, in one exemplary illustrative non-limiting implementation, provide an additional introductory presentation 218 before displaying a single player main mode menu 220. Similarly, the multi player selection 212 may display a multi player mode menu 222, and the option selection 216 may display an option menu 224. Such game play modes may provide an opportunity for a game player to play a game developed by professional game developers having multiple levels and challenges. In other implementations, such "regular" game play can be eliminated and all game play can be based on game backgrounds, levels and virtual environments created by end users.

In one exemplary illustrative non-limiting implementation, selecting the editor 214 may display the editor menu 226 including options including play 228, edit 230, download 232 and upload 234. The play option 228 is used to play a player's own or downloaded level; the edit option 230 is used to select game level editing; downloading option 232 is used to download a game level edited by another player via the WiFi or other network; and the upload option 234 in the exemplary illustrative non-limiting implementation is used to upload a game level a game player has created using the edit function 230 for downloading by another player.

Figure 4A:
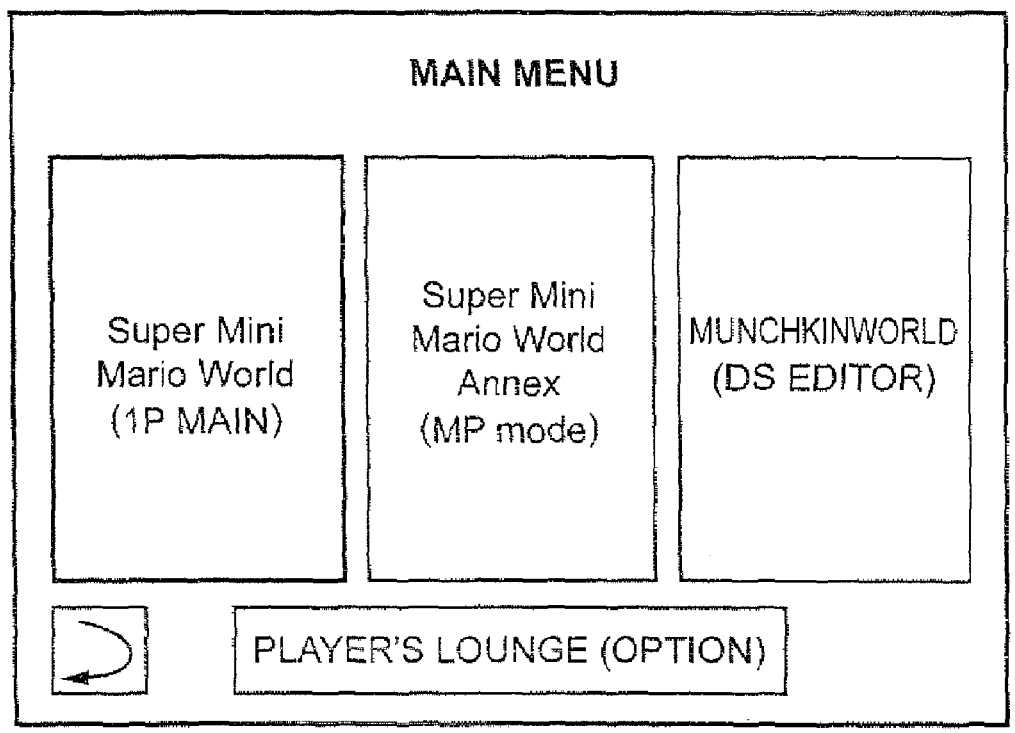
FIGS. 4A and 4B show an exemplary illustrative non-limiting menu screens.
Figure 4B:
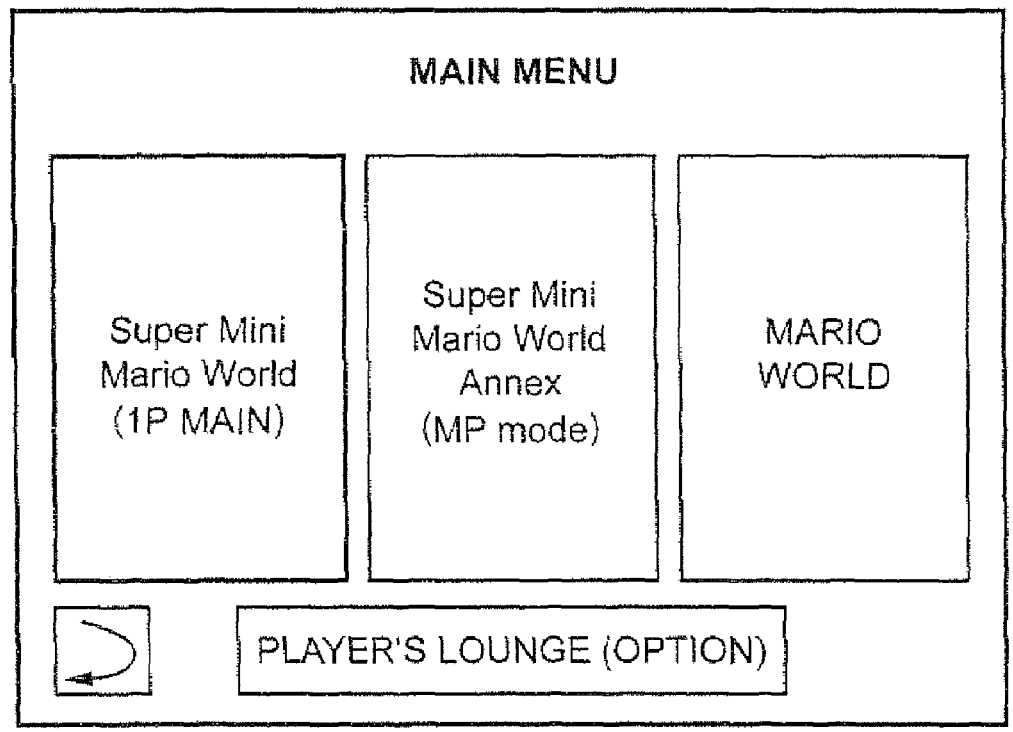

FIGS. 4A and 4B show exemplary illustrative non-limiting examples of main menu 208. In one exemplary illustrative non-limiting implementation, a user may customize the main menu (as shown in FIG. 4B) to enter a name of his or her own choosing (e.g., "Mario World") to name the level or series of levels the user has created and/or downloaded using the game editor.

Figure 5:
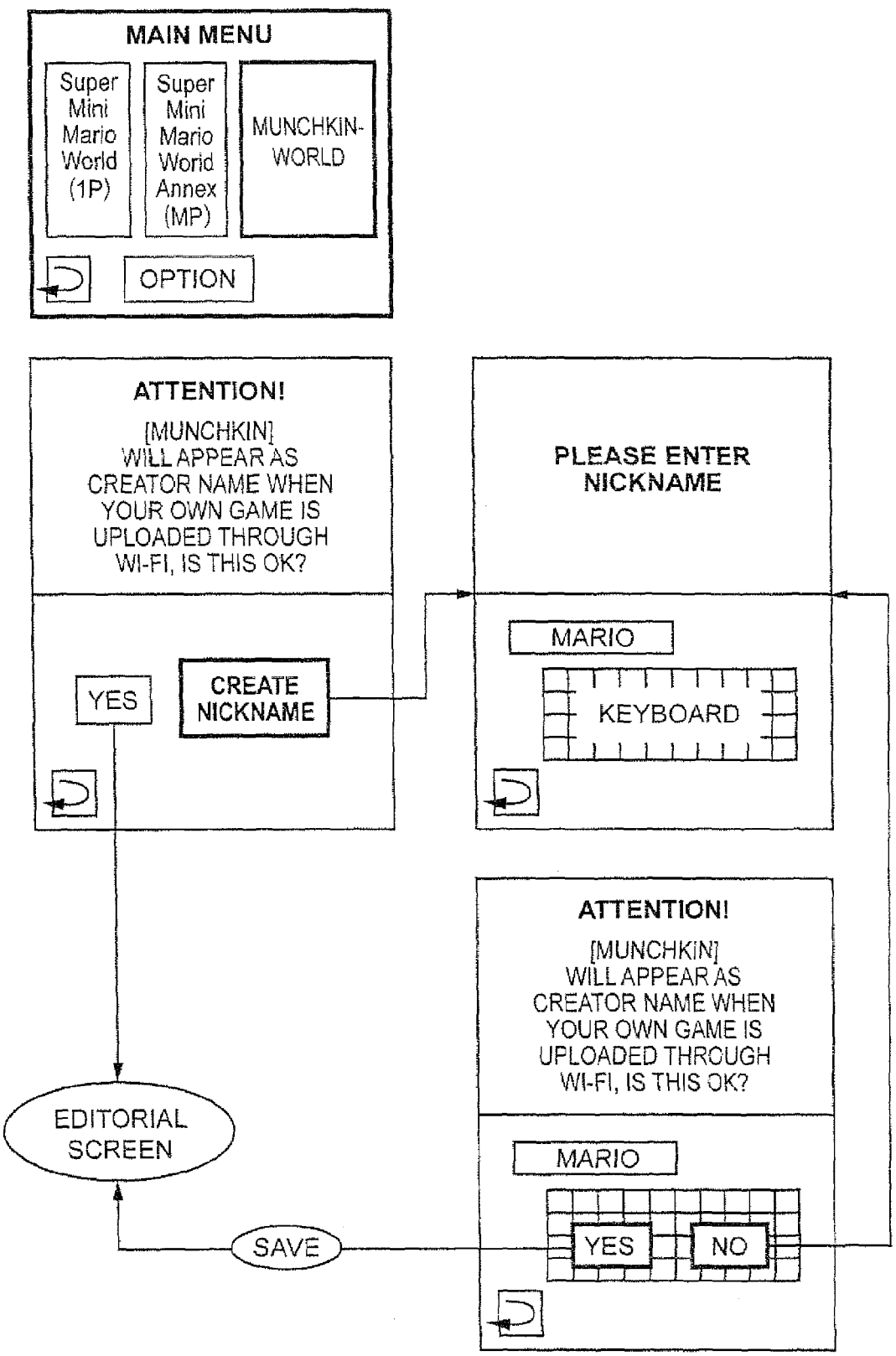
FIG. 5 shows an exemplary illustrative non-limiting menu selection flow.

FIG. 5 shows exemplary illustrative non-limiting implementation of a screen flow presented to a user the first time the user uses the game editor. In the exemplary illustrative non-limiting implementation, the process flow shown in FIG. 5 can be used by a player to input a name of his or her own choosing for the level or series of levels created using the game editor.

Figure 6:
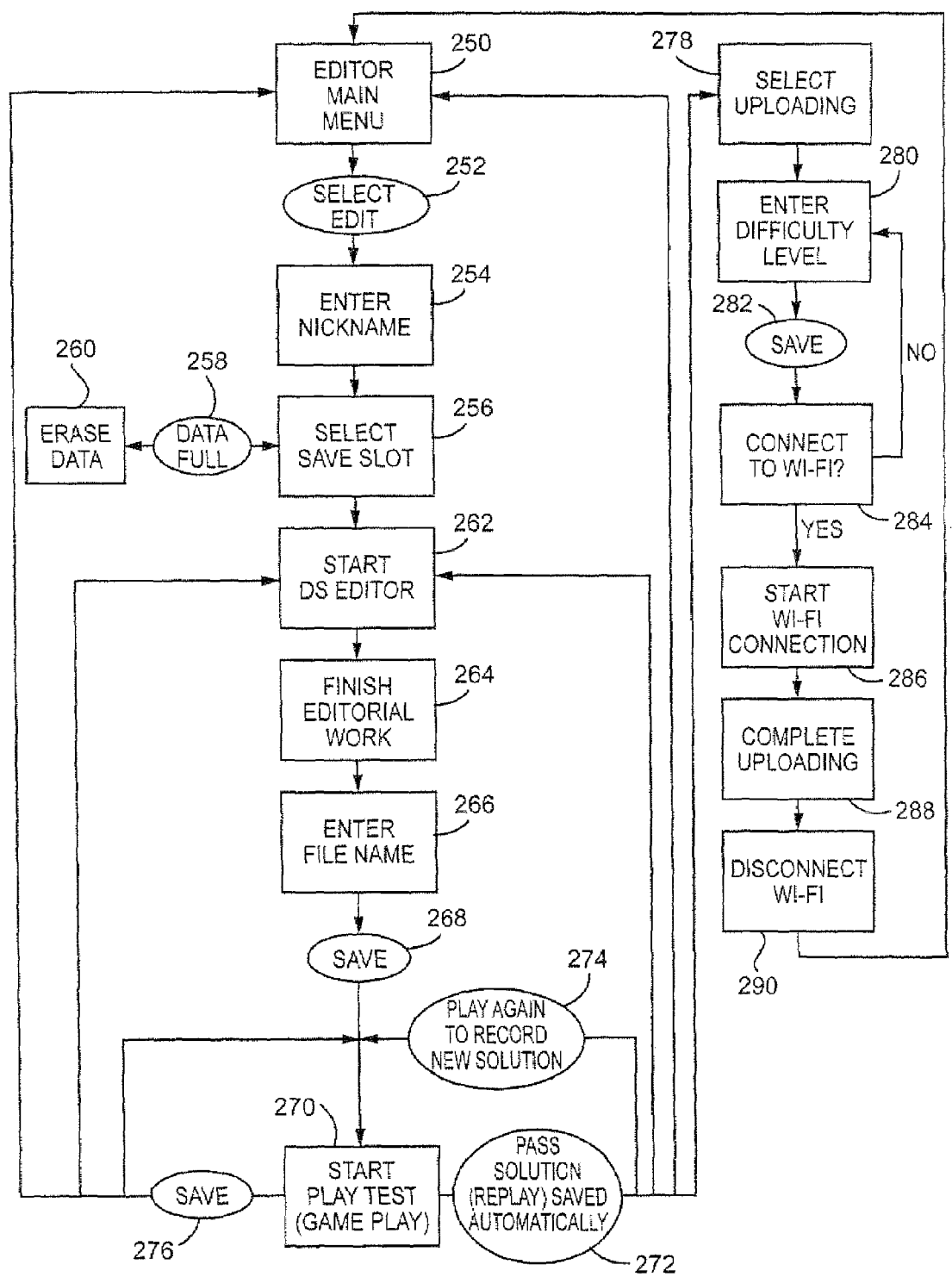
FIG. 6 is a flowchart of an exemplary illustrative non-limiting editor functionality.

FIG. 6 is a flowchart of exemplary illustrative non-limiting program control steps provided by instructions stored on memory device 28 or other memory device and executed by microprocessor 42 to provide a game editing function. In the exemplary illustrative non-limiting implementation shown, the editor main menu (block 250) allows the user to select the "edit" function (block 252) and then enter a nickname as described above for the name level to be created or edited (block 254). The user may then select a "save" slot (block 256) for storing the newly created or edited function on a memory card or other device. If the storage device is full (block 258), then the user may be given an option to erase data to make room for the new level (block 260). The software then starts the editor (block 262) and allows the user to edit the game level. Once the user is finished editing (block 264), the user is prompted to enter a file name (block 266) and the resulting edited file is saved on the selected slot (block 268). The user may then be given an option to start a play test (block 270) to test out the game play on the newly edited game level. If the game play is satisfactory and fully functional (block 272), then the edited game level is automatically saved. The user may also play again to record a new solution (block 274), or the user may save the current level in its current state to work on it later (block 276).

Once the play test has been successfully past, the user may decide to upload the level over the network so that other game players can enjoy the new level (block 278). In this exemplary illustrative non-limiting implementation, the user may be prompted to enter a difficulty level if desired (block 280) which is then saved (block 282). The user may then be asked whether to connect via a wireless network (block 284). If the user responds in the affirmative, the editor software may start the WiFi connection (block 286) and upload the completed level to a server for downloading by the same or different game player using the same or different gaming platform (block 288) before disconnecting from the wireless network (block 290).

Figure 7A:
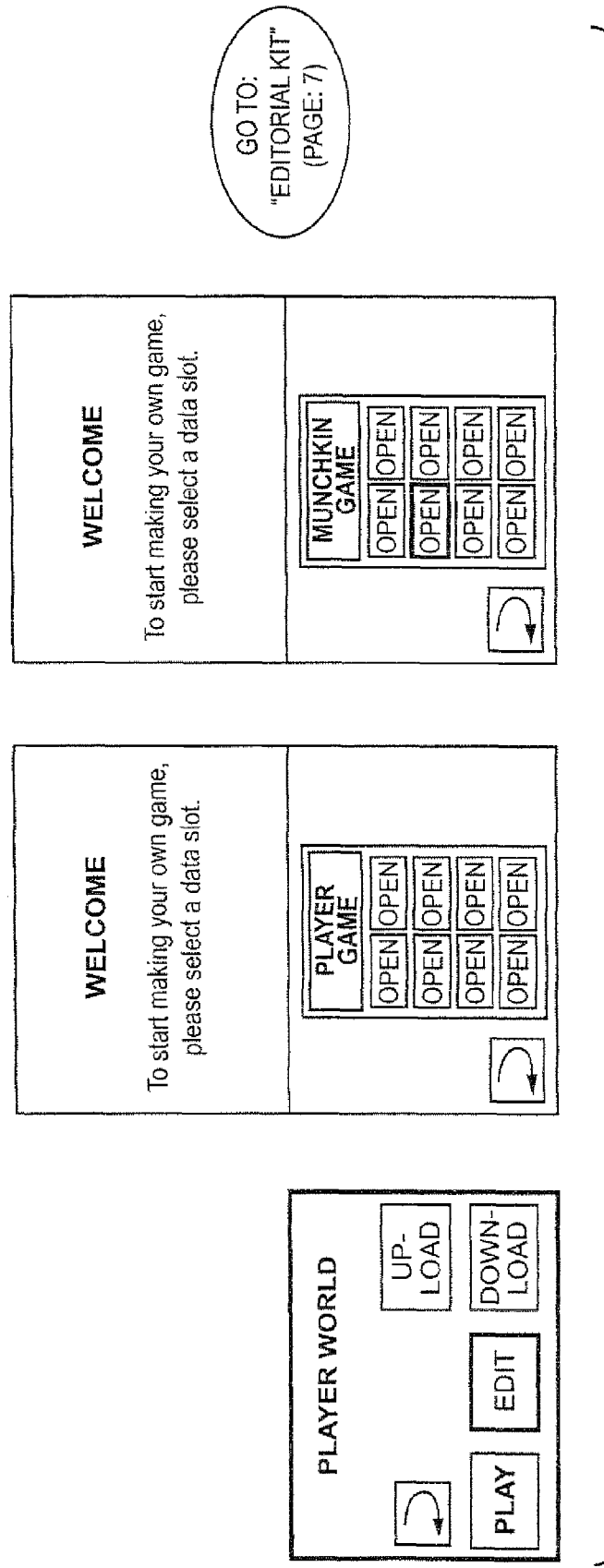
FIGS. 7A and 7B show exemplary illustrative non-limiting selection screens.
Figure 7B:
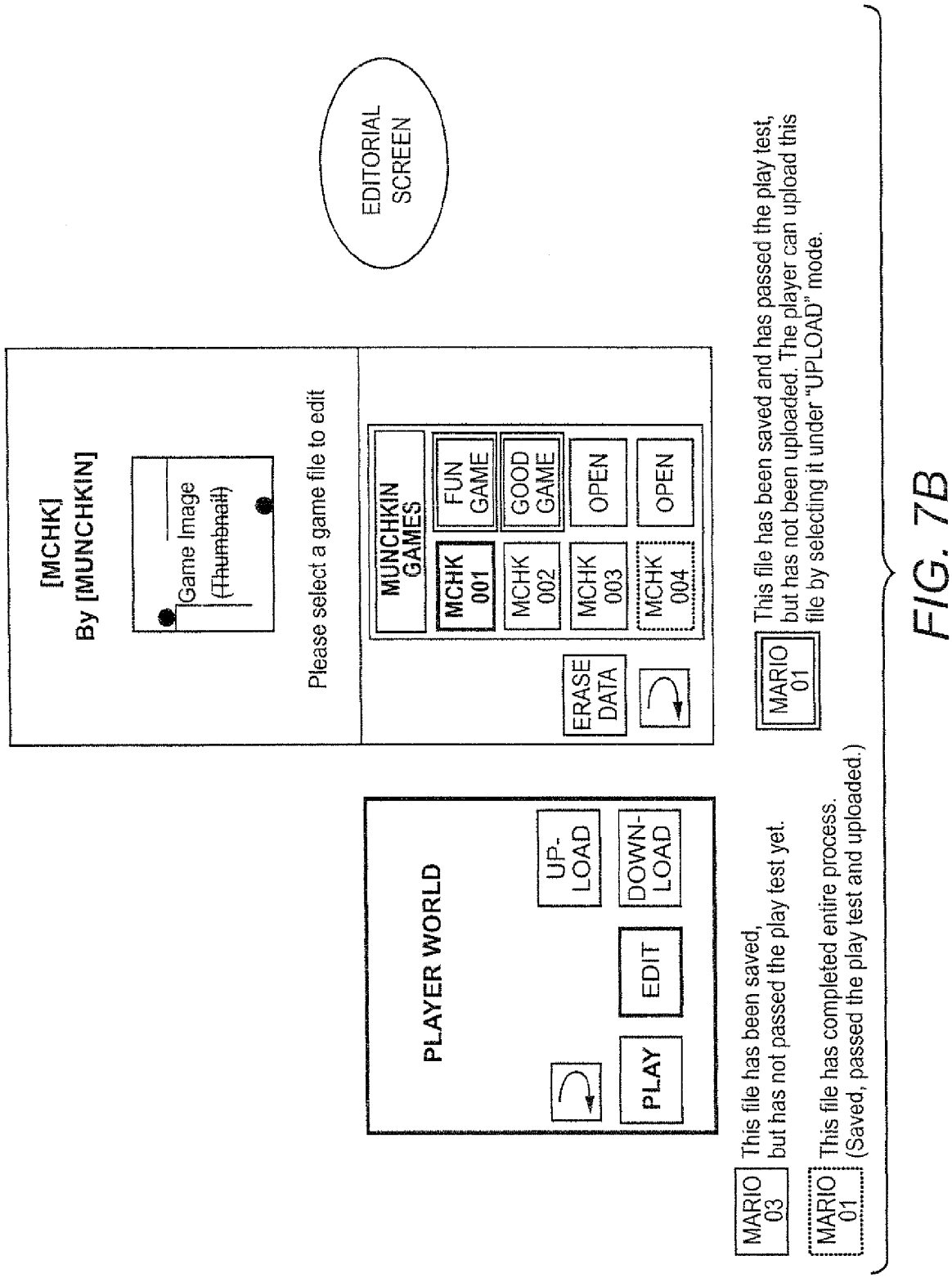

FIGS. 7B and 7B show an exemplary illustrative non-limiting series of screen displays that may be presented depending upon whether there is no data in the saving slots (FIG. 7A) or whether there is some editable data in the saving slots (FIG. 7B). In one exemplary illustrative non-limiting implementation, the game levels shown in FIG. 7B can be color coded to indicate which ones are playable and which ones are not yet playable ("not playable" means the game hasn't past the play test yet. Other exemplary illustrative non-limiting variations such as using an icon or checkmark as an indication of the file status such as playable/non-playable are also possible.

Figure 8A:
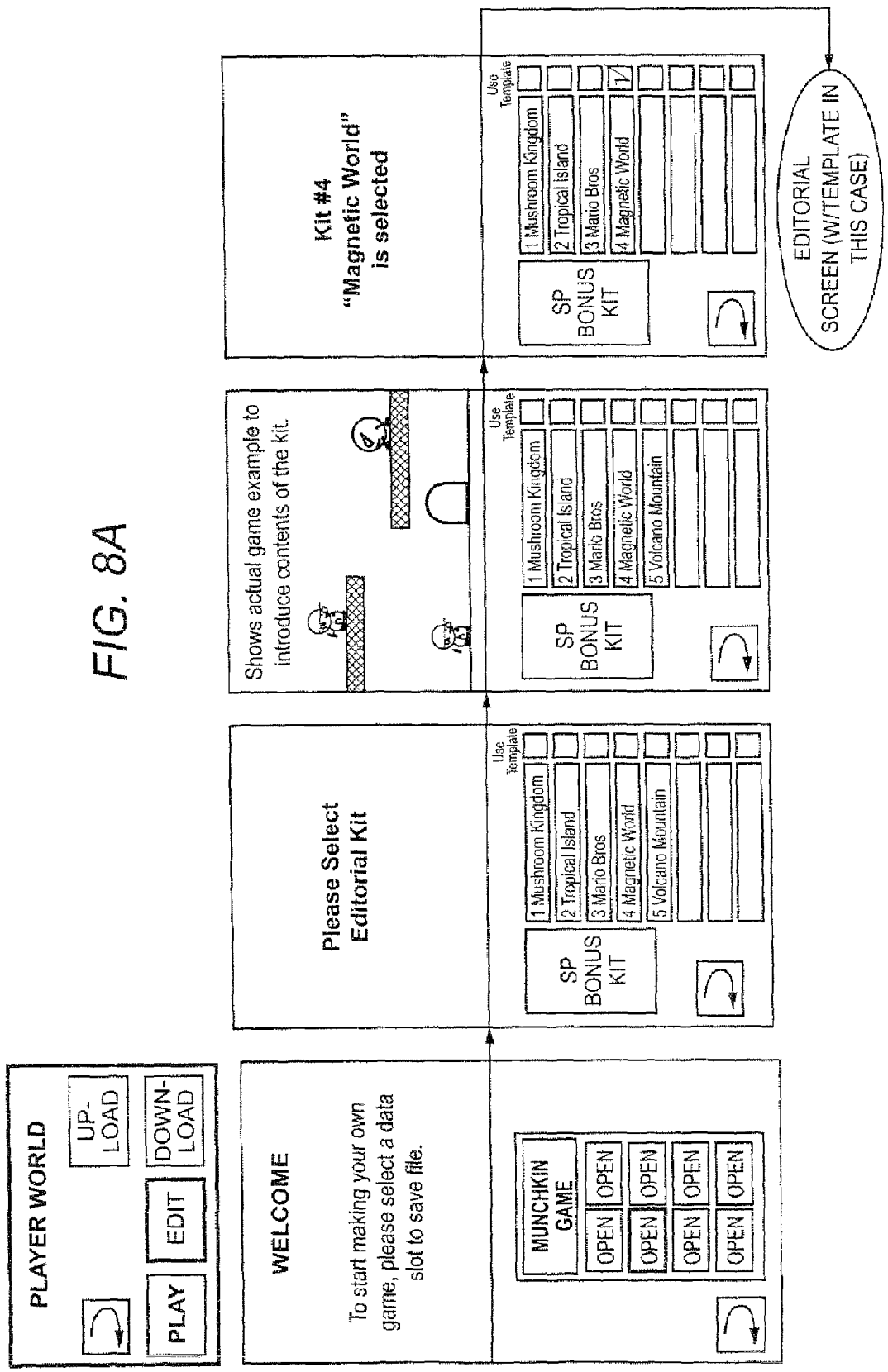

FIG. 8A shows an exemplary illustrative non-limiting sequence of screens that begin an editing function. In one exemplary illustrative non-limiting implementation, the game player can access these screens only after the player has successfully past one or more challenges with the "regular" game (e.g., defeating a certain enemy). Different and/or more or less advanced game editing functions can be presented, for example, depending upon how advanced the game player has demonstrated himself or herself to be via the "regular" game play. In one exemplary illustrative non-limiting implementation, the options that are depicted in FIG. 8A may be selected by using a touch screen to touch an item with a pen or by any other conventional means.

FIG. 8B shows an exemplary illustrative non-limiting implementation of a message that may be displayed after defeating a certain enemy to give the player a "gift" or prize of editing a game level.

In one exemplary illustrative non-limiting implementation, the various items available in the FIG. 8A editor are divided into different worlds the same as the main game. As the player completes the main game, each editor kit becomes available one by one. At the beginning of the game (even before beginning to play the main game), the player can still create a new game level but only editorial game kit number one—"Mushroom Kingdom" may be available in one exemplary illustrative non-limiting implementation. In this initial kit, most of the character/items used in the initial "regular" game world may be available and the background graphics image are ready for the player to use. Once the player defeats a certain enemy, the FIG. 8B message may be displayed with a victory screen which notifies the player that a new editing kit has become available such as "Tropical Island." Thus, in the exemplary illustrative non-limiting implementation, the player is encouraged to continue game play and to meet additional challenges in the main game play, with success allowing the user to provide additional and/or more advanced editing functions.

In one exemplary illustrative non-limiting implementation as shown in FIG. 9, a bonus editing kit may be made available to the player once the player has uploaded a game level he or she has created. The player may obtain a bonus by using the networking features such as uploading games, downloading games, sending feedback, getting good feedback ratings and the like. The player can use his/her points any time to add new items to the bonus kit. Such bonus points can be used for example as a catalog shopping arrangement where a user can purchase additional icons, objects and other items of interest to include in his or her edited game level. In one exemplary illustrative non-limiting implementation, the player doesn't necessarily see the breakdown shown in FIG. 9 (e.g., only total game and balance might be shown). The point total may be updated every time the player logs in to the server. As long as the player uses the same ID, he or she may keep gaining points. Even if the game file is replaced with a new one, the points do not necessarily reset. The player can get even more items by using points or saving points to get more expensive items.

Figure 10:
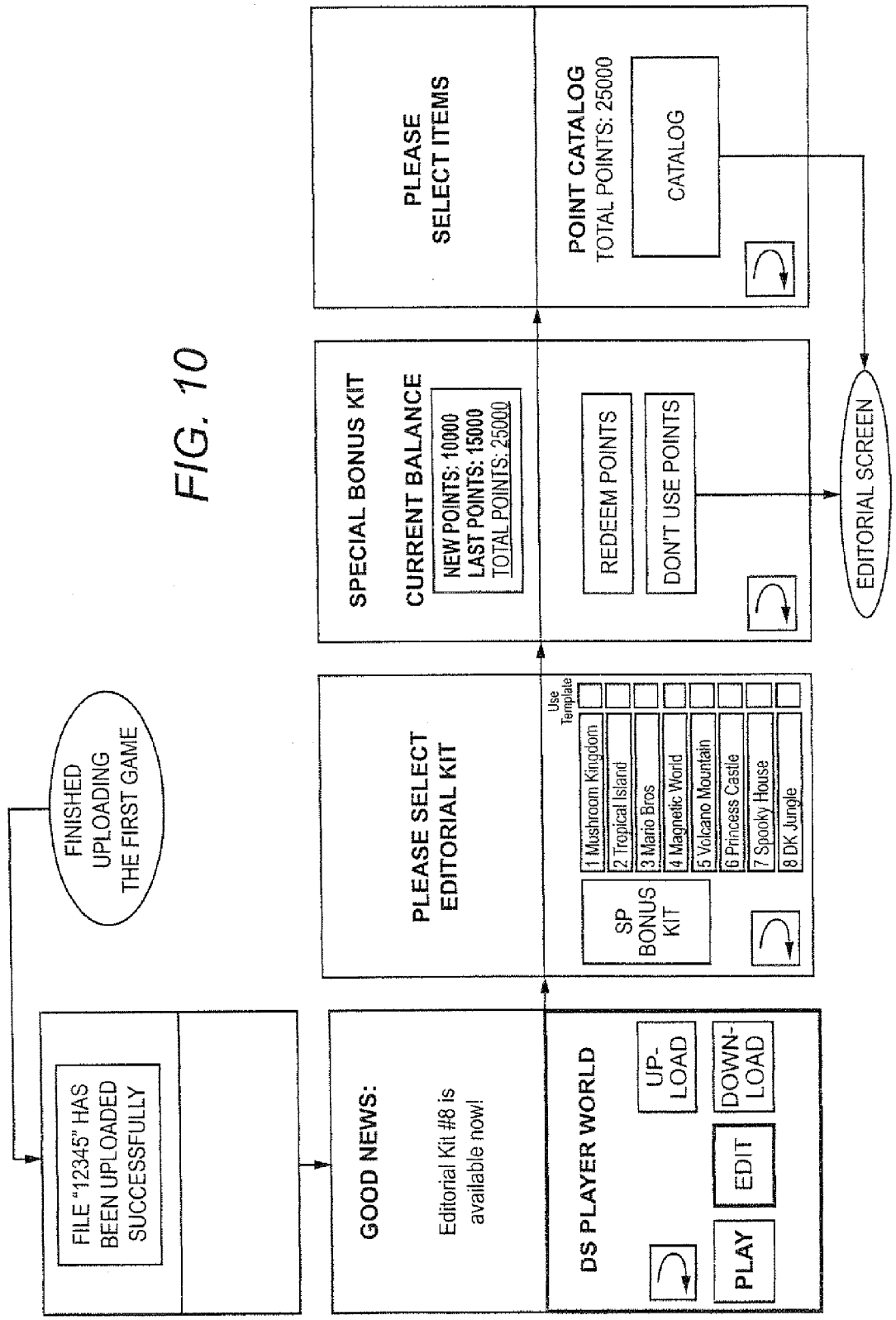
FIG. 10 schematically illustrates an exemplary illustrative non-limiting menu display flow for an illustrative bonus point feature.

FIG. 10 shows an exemplary illustrative non-limiting implementation of screen displays that may be provided after uploading a new game file. In this exemplary illustrative non-limiting implementation, the editor main menu may open to display additional options including bonus redemption and catalog points.

Figure 11B:
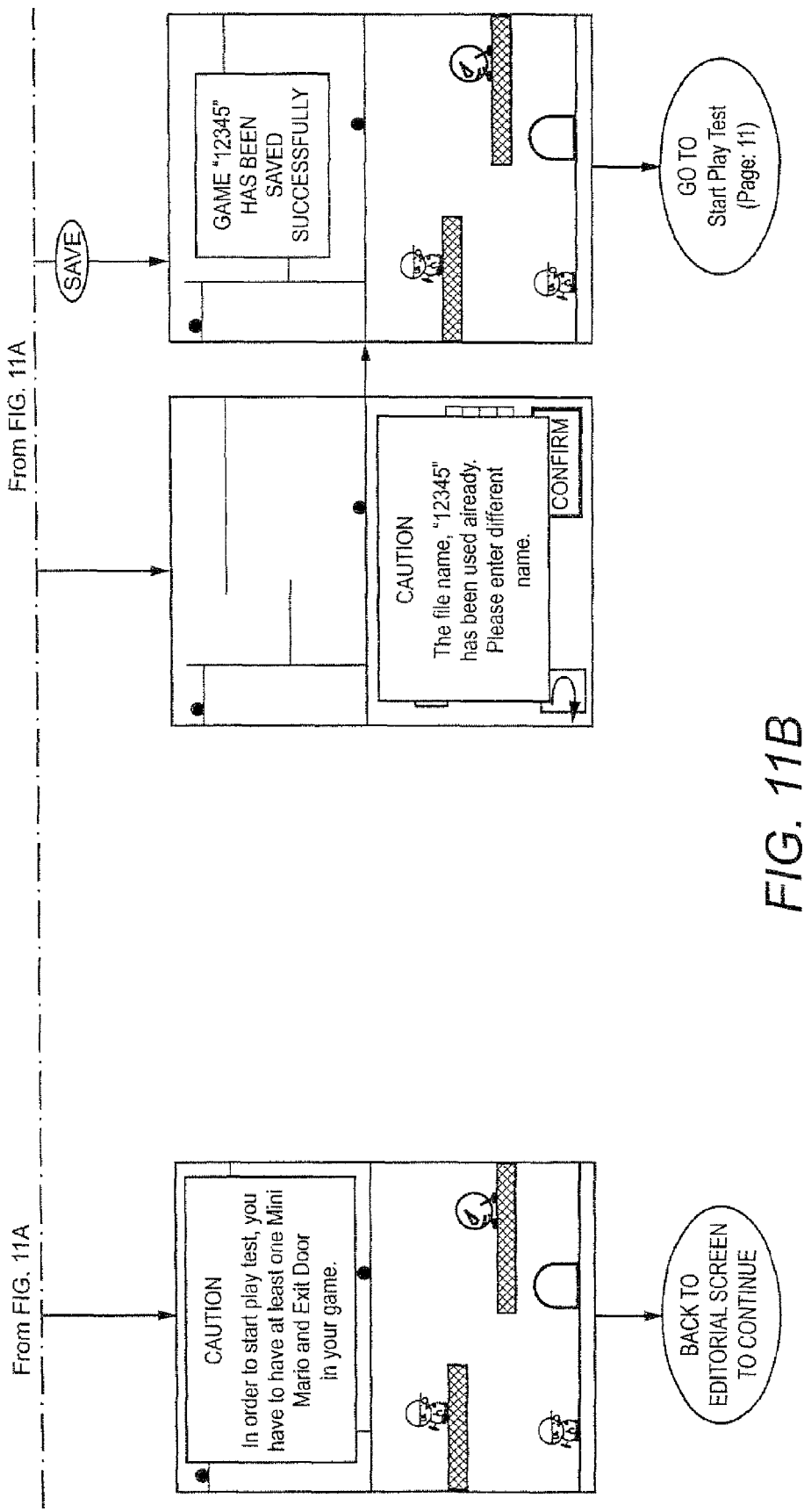
Figure 12A:
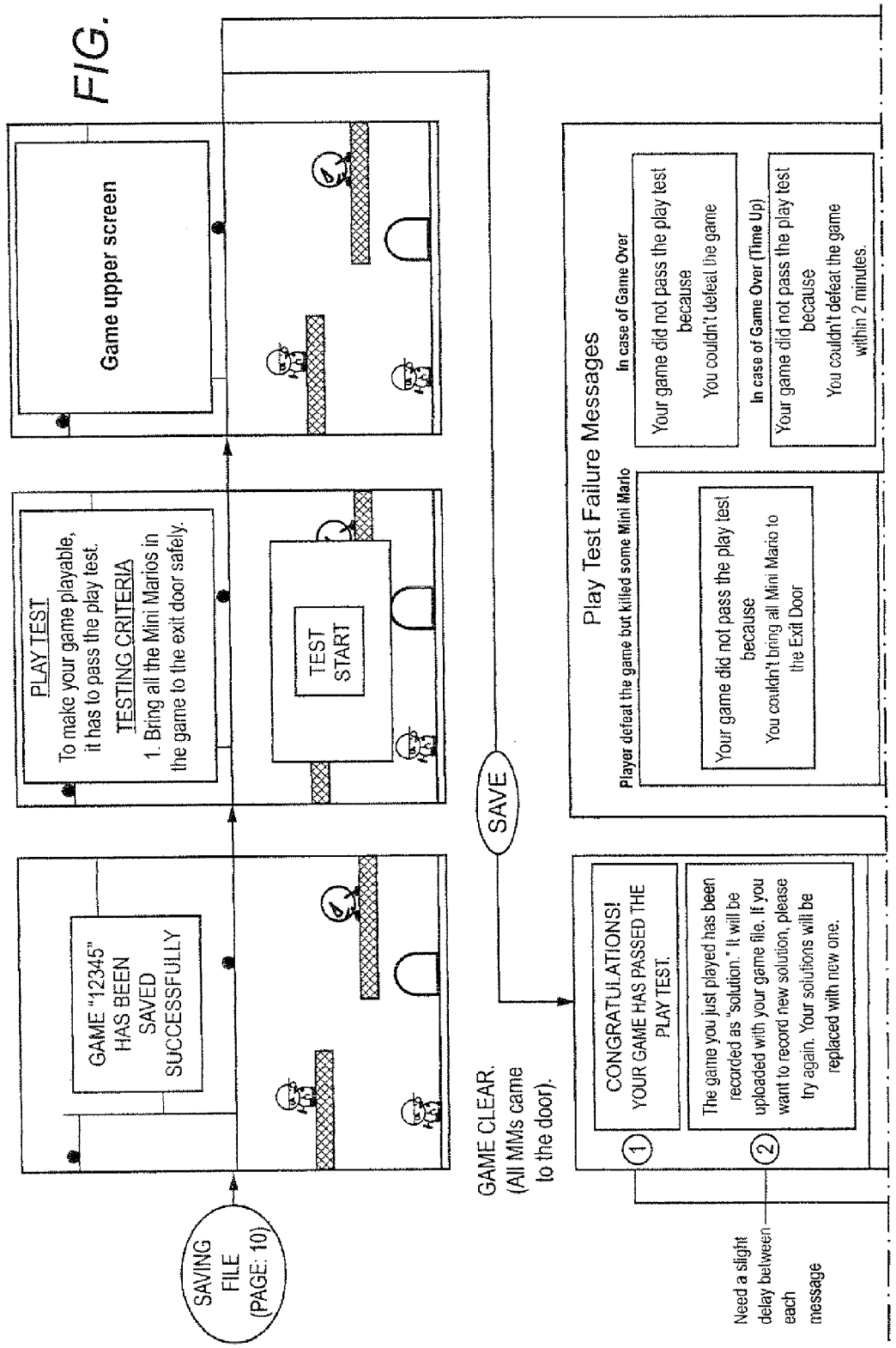
FIGS. 12A and 12B together schematically illustrate an exemplary illustrative non-limiting screen display sequence for a complete-play test functionality.
Figure 12B:
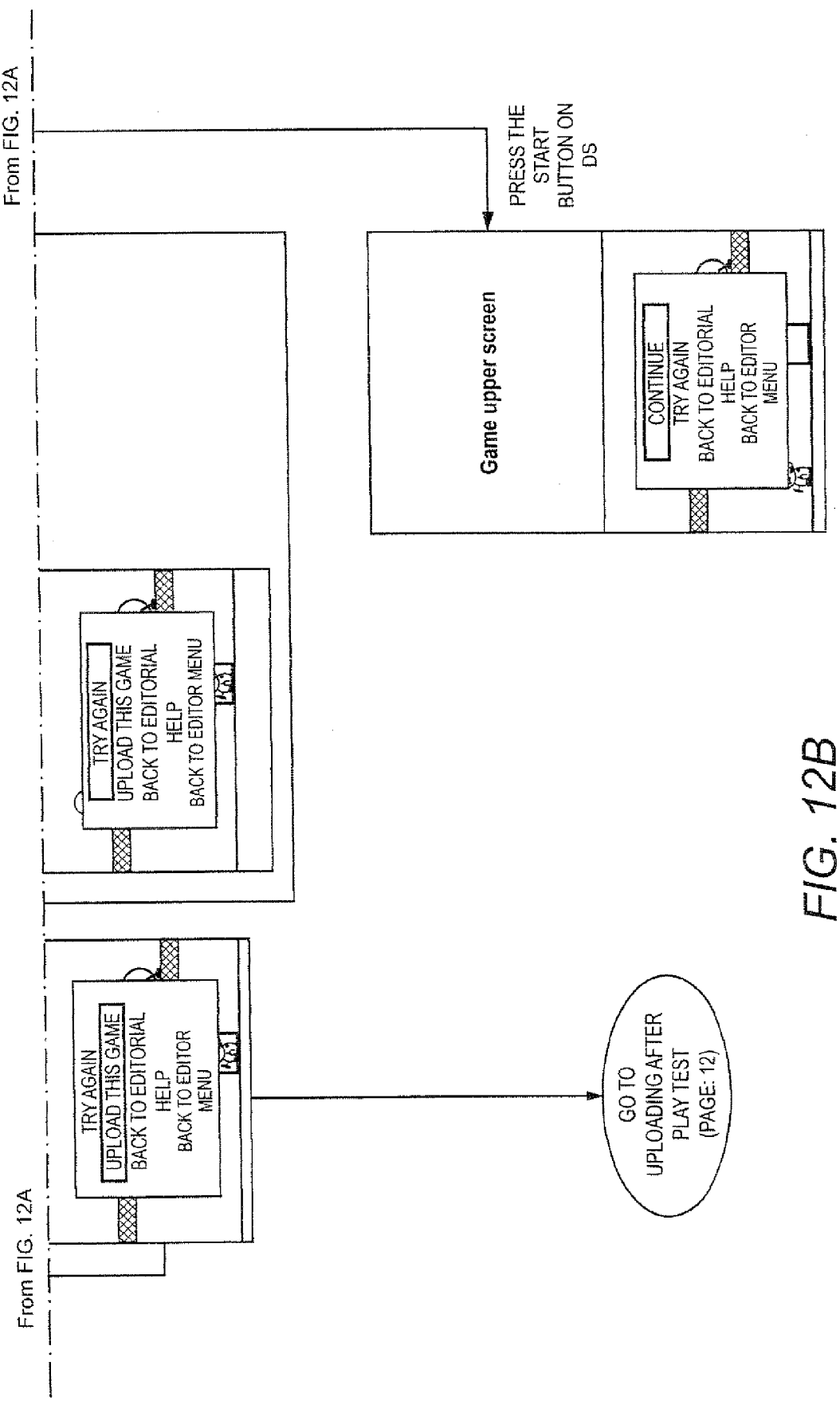

FIGS. 11A and 11B show exemplary screen displays for the save/play test functions shown above. In one exemplary illustrative non-limiting implementation, the game player can enter a customized name for a game file that may be descriptive or arbitrary. FIGS. 12A and 12B show exemplary illustrative non-limiting implementations of example screens for a play test that take the player through an actual testing trial of the game level he or she has created. In one exemplary illustrative non-limiting implementation, the editor may automatically control the game character to fully maneuver throughout the newly created game world to ensure functionality. The editor may provide the game player with suggestions for changes to improve functionality if desired. Once the game play test has been past, the status of the game may be changed to "playable" and "uploadable." In addition, and other data may also be recorded.

Figure 13:
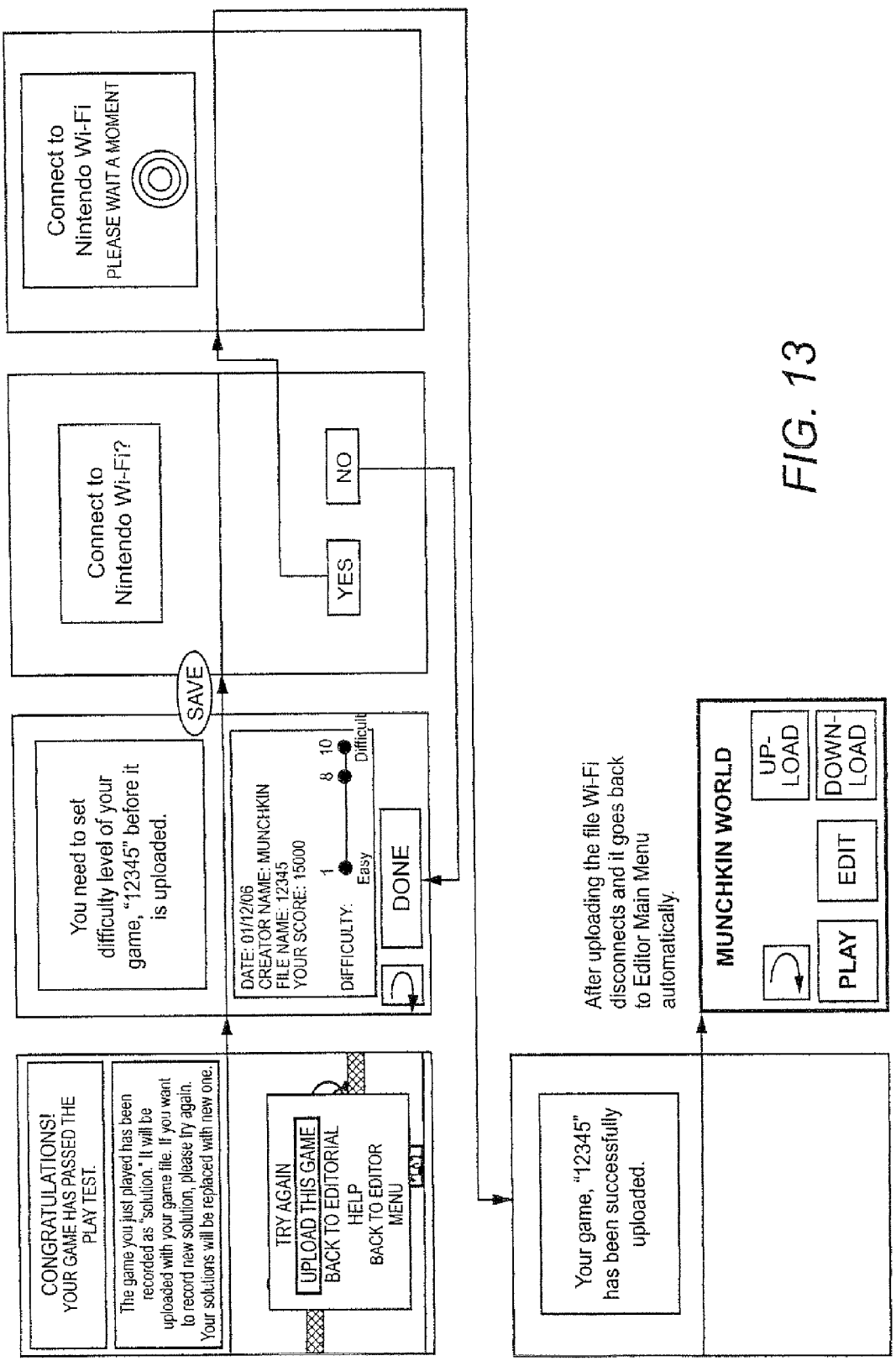
FIG. 13 schematically illustrates an exemplary illustrative non-limiting screen display sequence for an upload after play test functionality.

FIG. 13 shows an exemplary screen flow for uploading after the play test has been completed. In the case of a communications failure or in an instance where a game player does not wish to upload immediately, the player can upload games later by selected "upload" from the editor main menu.

Figure 14:
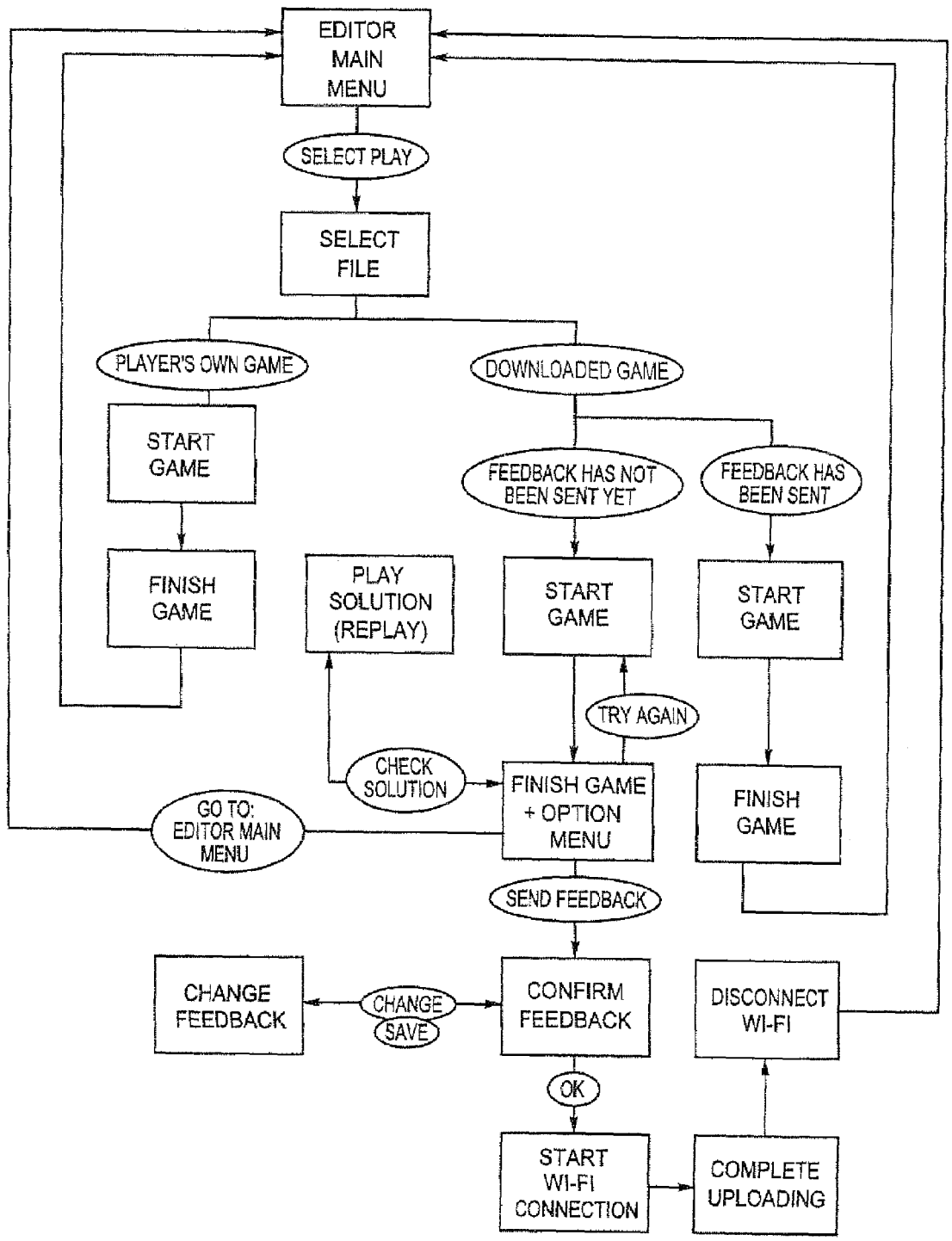
FIG. 14 is a flowchart of an exemplary illustrative non-limiting play game functionality.

FIG. 14 shows an exemplary illustrative non-limiting "play game" function that allows the game player to select a level file, start and finish a game, and provide feedback which can be uploaded to a server. Using this feedback feature, a game player can rate the fun and playability of downloaded game levels previously created by other players and uploaded on to the server.

Figure 15A:
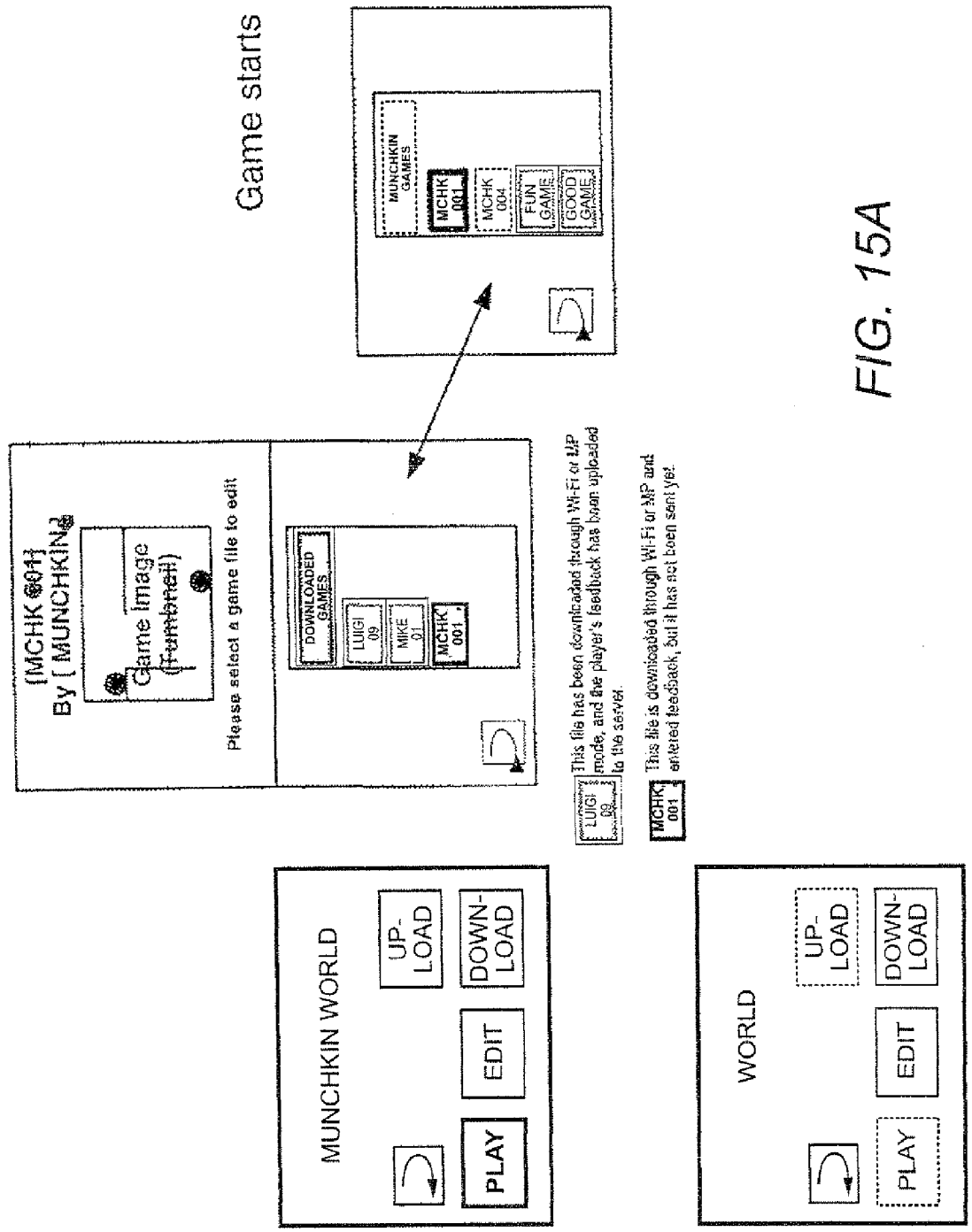
FIGS. 15A and 15B show exemplary illustrative non-limiting display screen sequences for a play game select functionality.

FIG. 15A shows an exemplary illustrative non-limiting implementation of screens displayed when a "play game" option is selected. Different types of game levels (e.g., created by this player, downloaded from another player, initially provided within the game software, inaccessible, etc.) can be color coded or otherwise indicated.

Figure 15B:
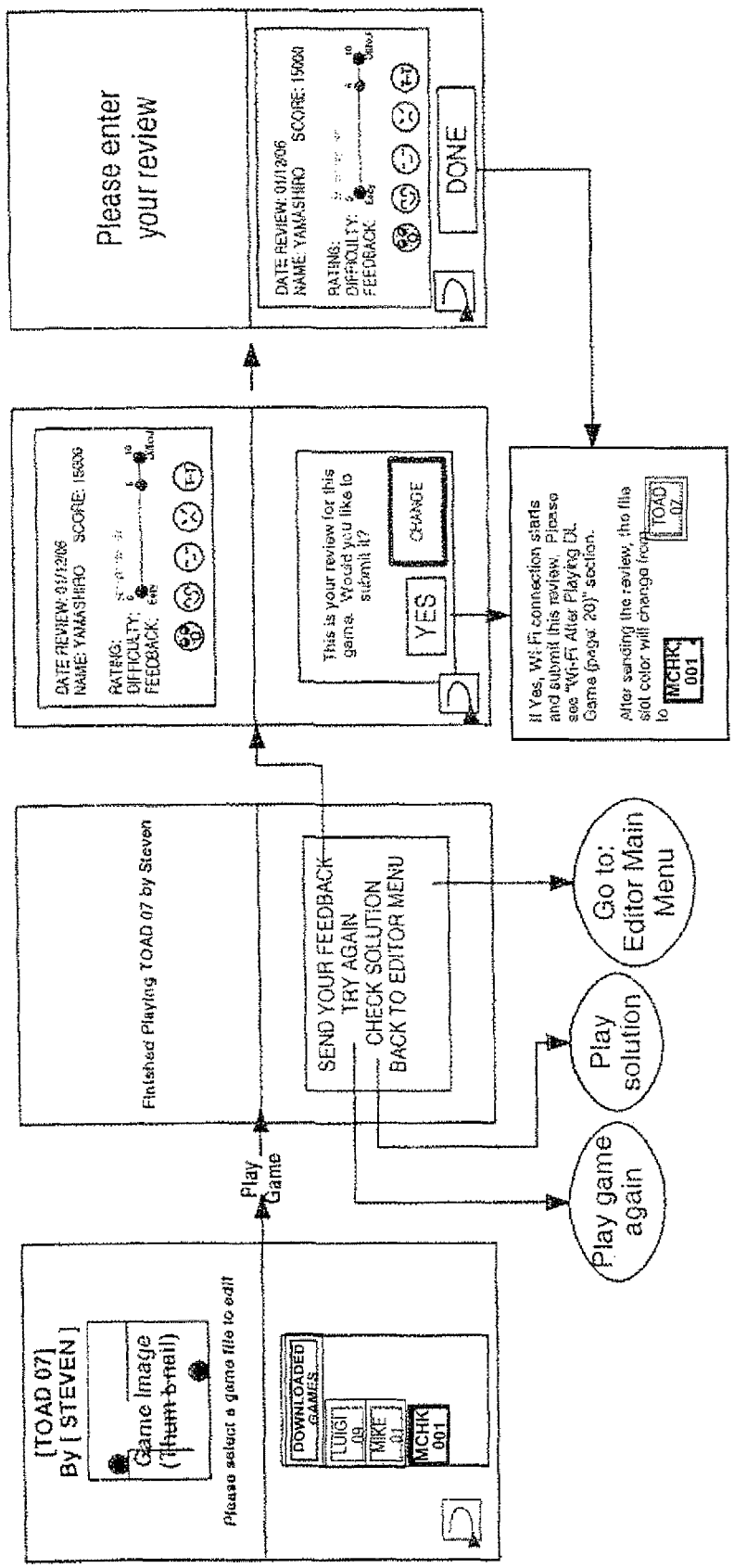

FIG. 15B shows an exemplary illustrative non-limiting implementation of a screen flow when a game has been downloaded and played but the user has not yet sent feedback.

Figure 16:
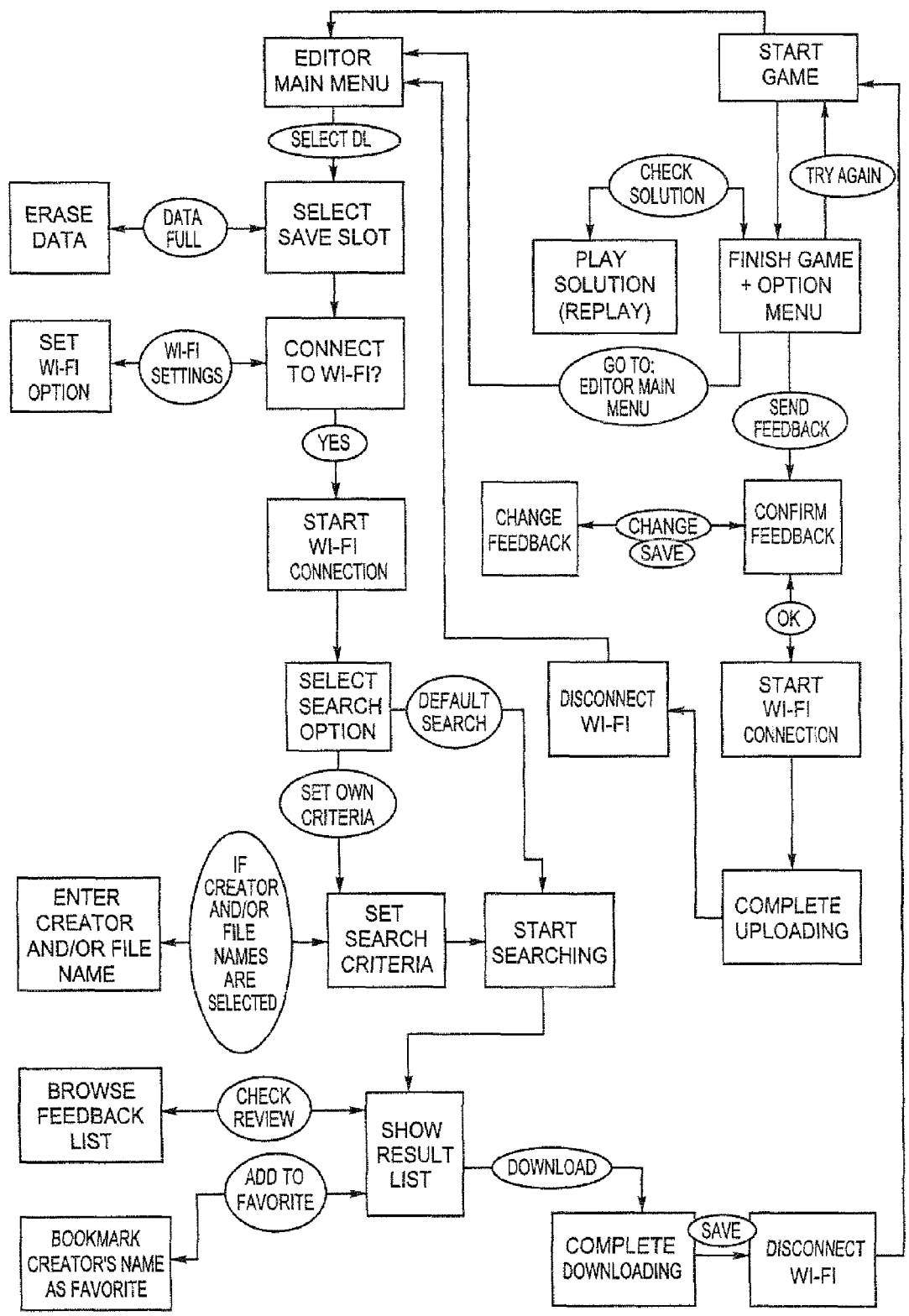
FIG. 16 is a flowchart of an exemplary illustrative non-limiting downloading functionality.

FIG. 16 shows an exemplary illustrative non-limiting implementation of a program flow that may be used to download another person's game level via a server.

Figure 17A:
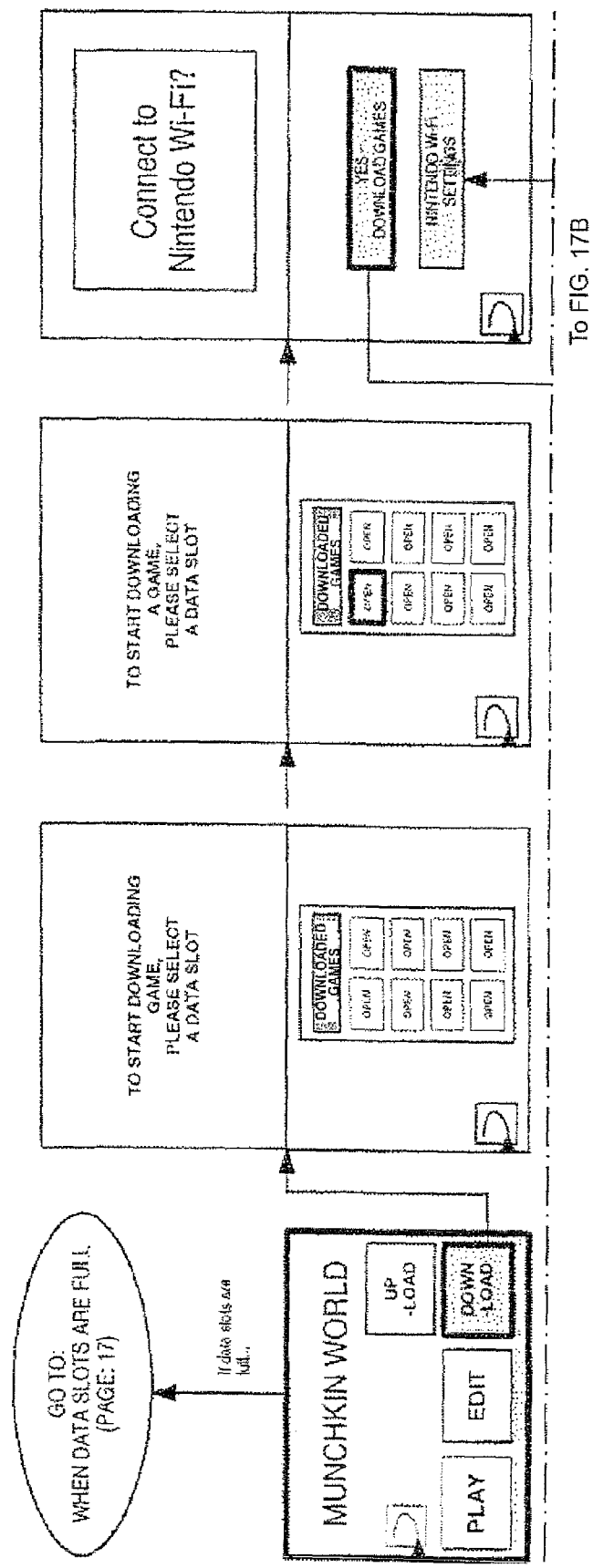
FIGS. 17A, 17B and 17C together schematically illustrate an exemplary illustrative non-limiting game download functionality.
Figure 17B:
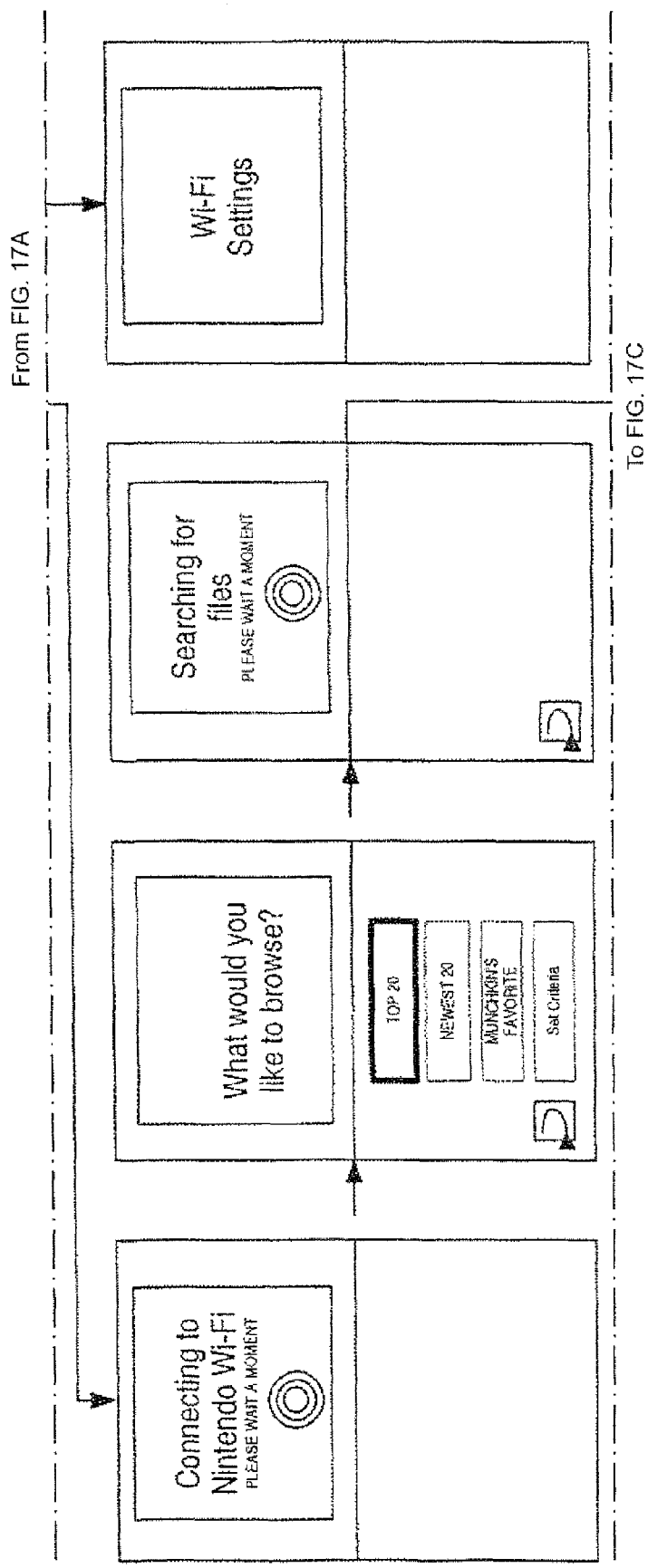
Figure 17C:
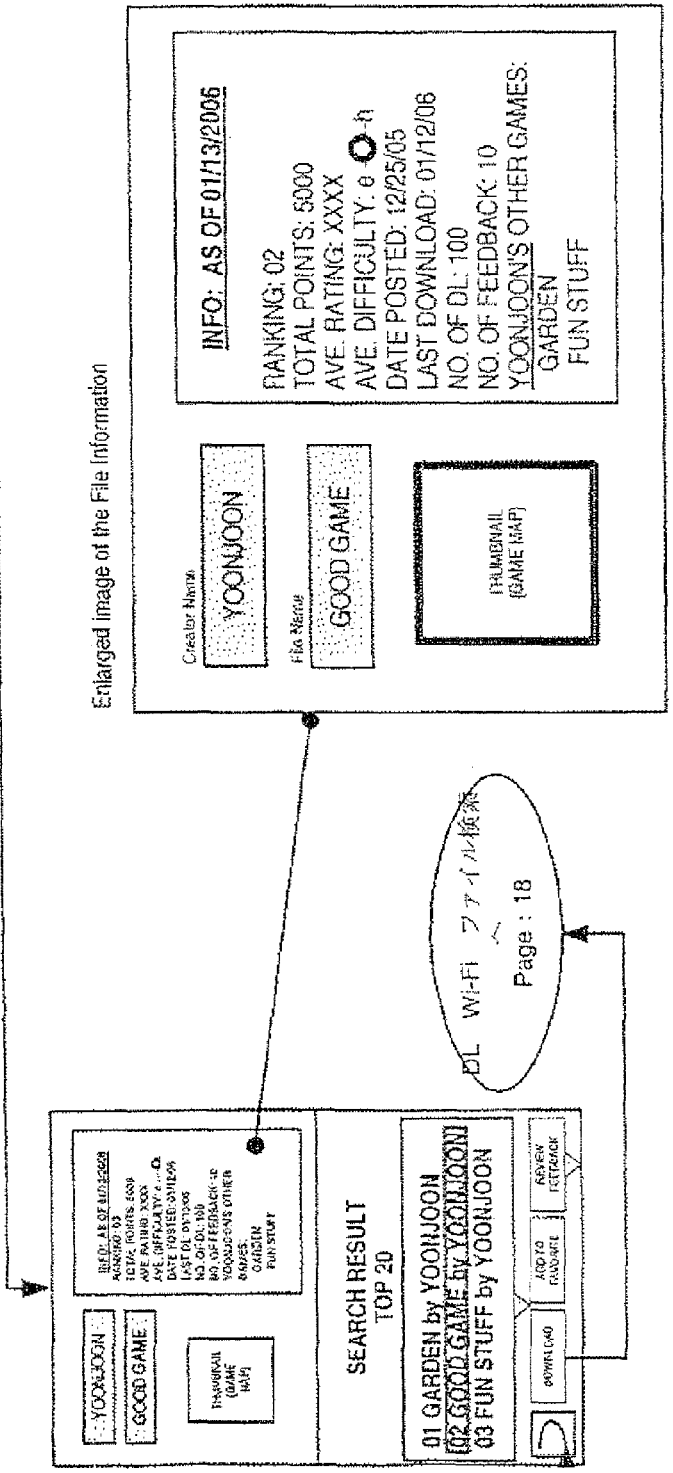

FIGS. 17A, 17B and 17C together show a flow of menu screens that may be used to search levels available on a server for download.

Figure 18A:
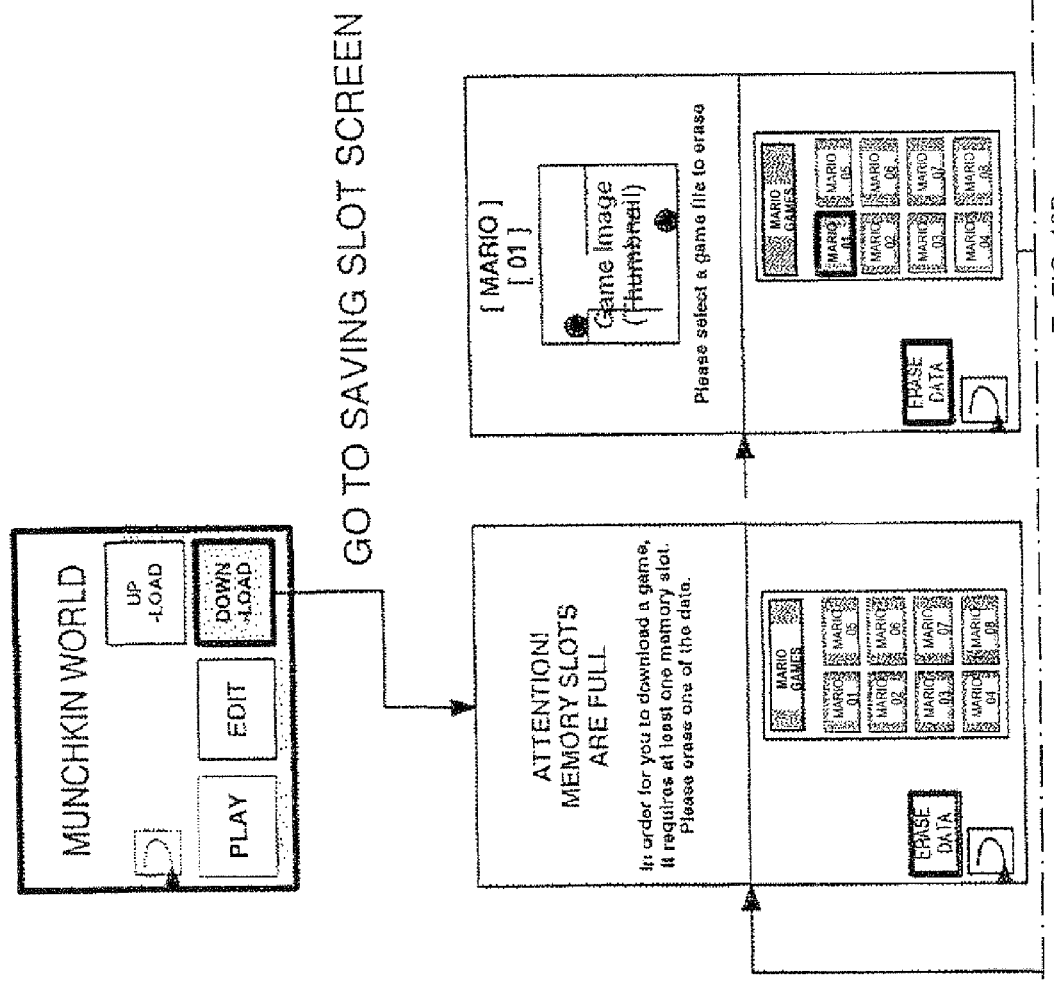
FIGS. 18A and 18B together schematically illustrate an exemplary illustrative non-limiting screen display flow for downloading a game when saving slots are full.
Figure 18B:
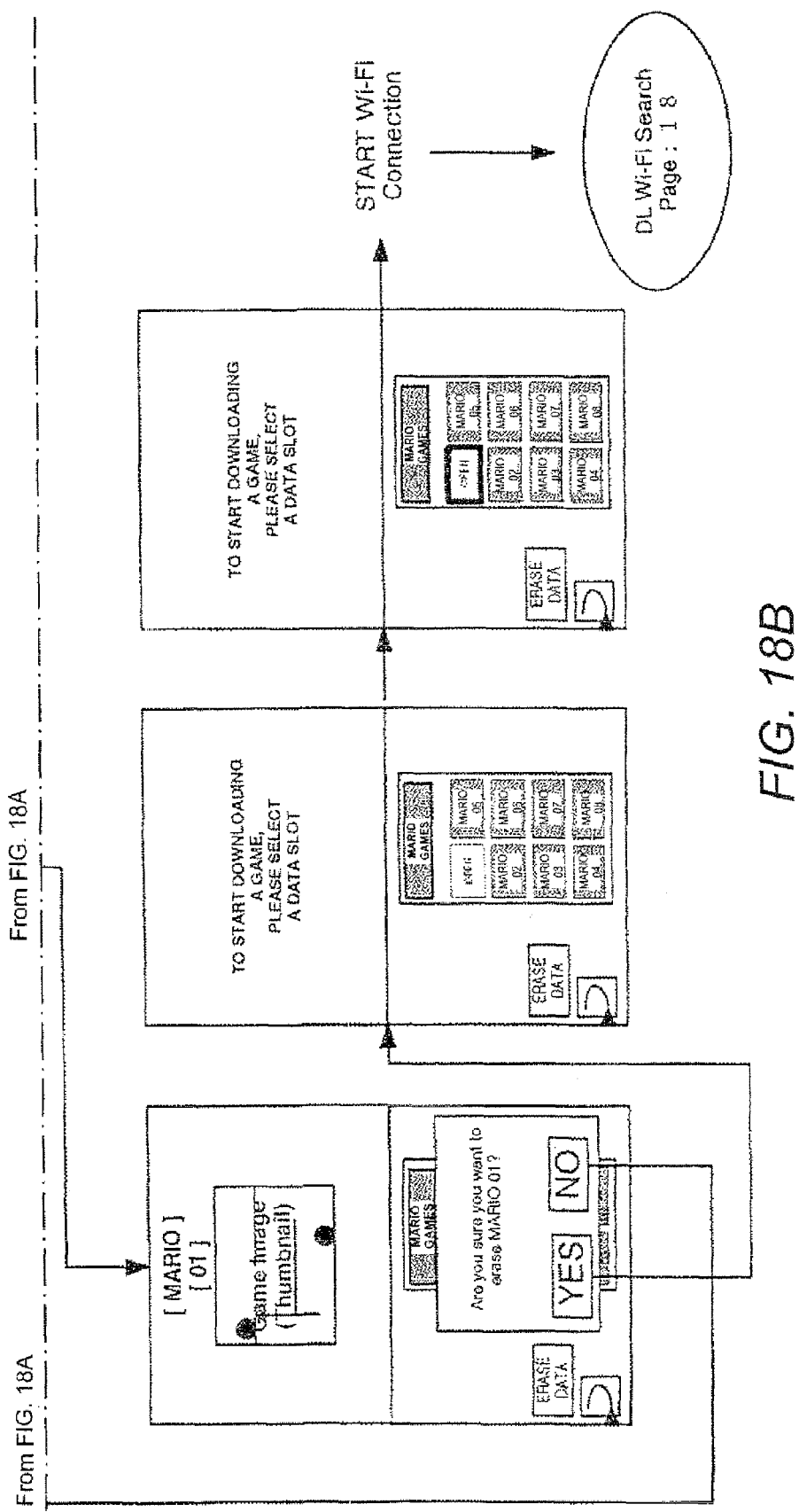

FIGS. 18A and 18B show exemplary screens that may be displayed when a player wishes to download a new game level but all local storage slots are full.

Figure 19A:
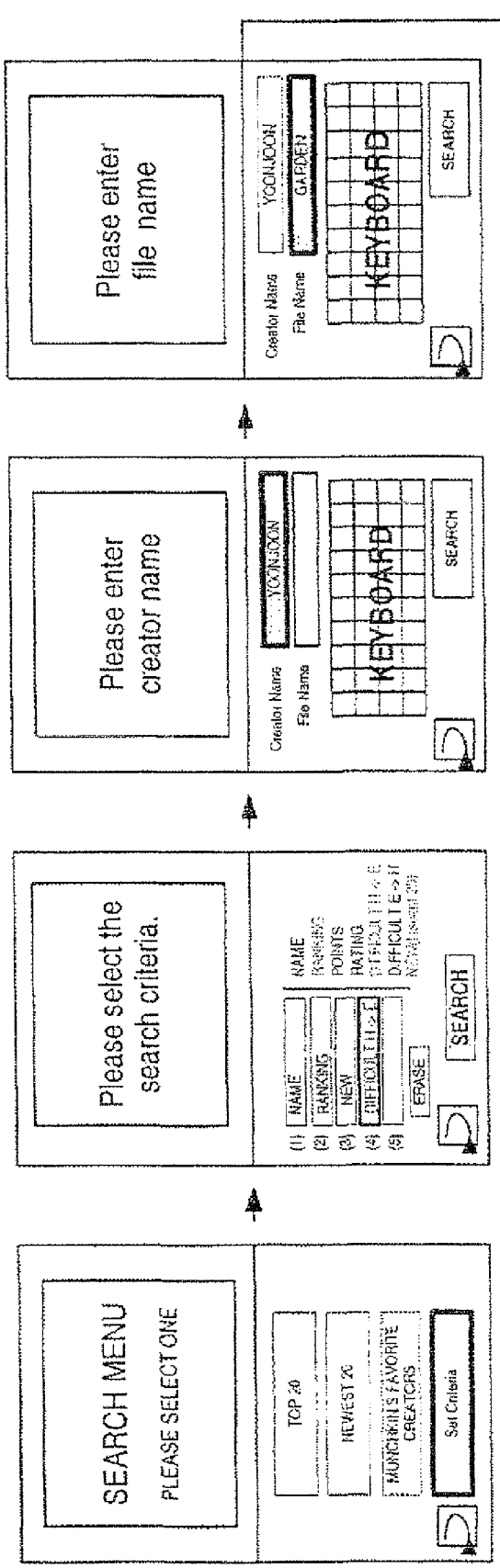
FIGS. 19A-19C schematically illustrate an exemplary illustrative non-limiting game search and download functionality.
Figure 19B:
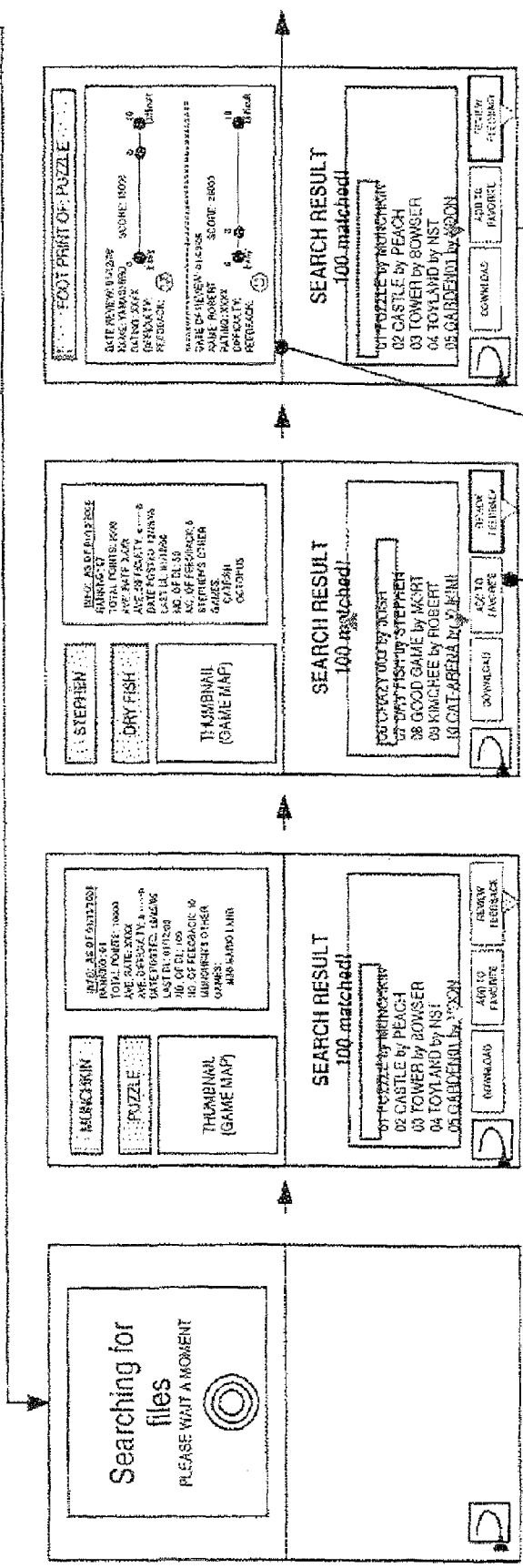
Figure 19C:
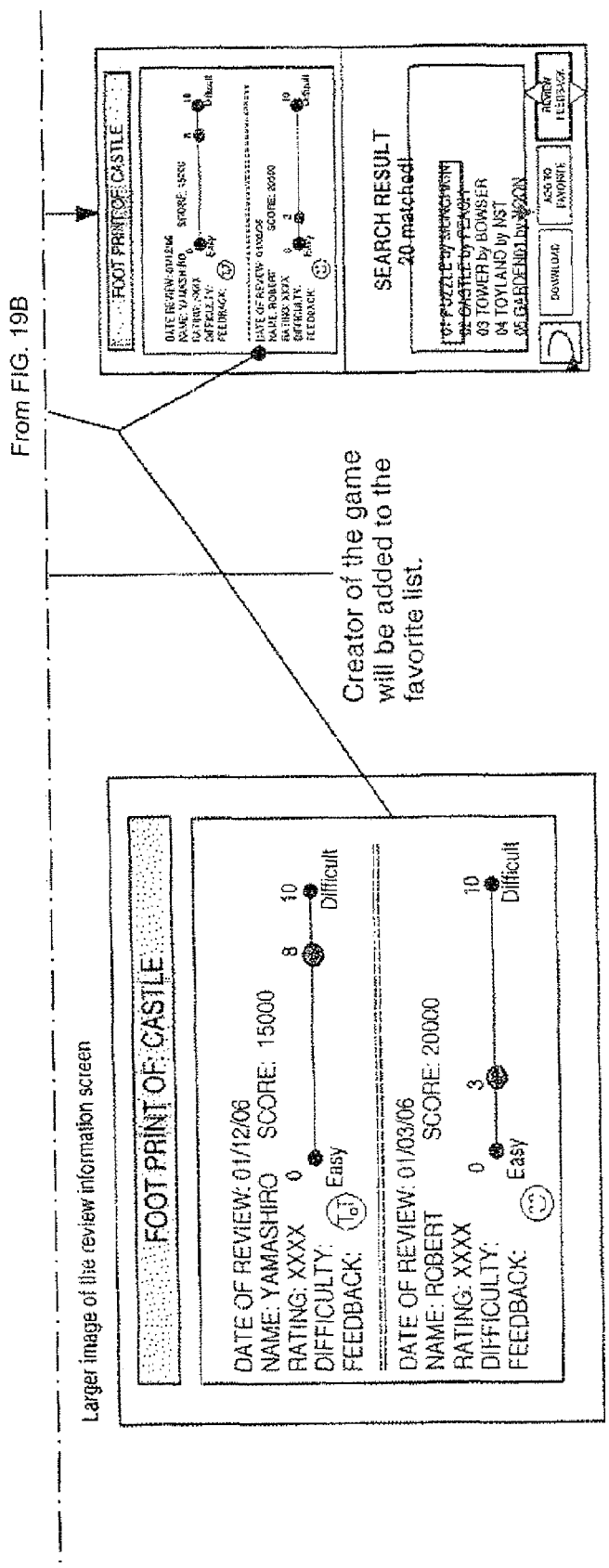

FIGS. 19A, 19B and 19C show exemplary illustrative non-limiting screen displays that may be used for searching for games on a server for download.

Figure 20A:
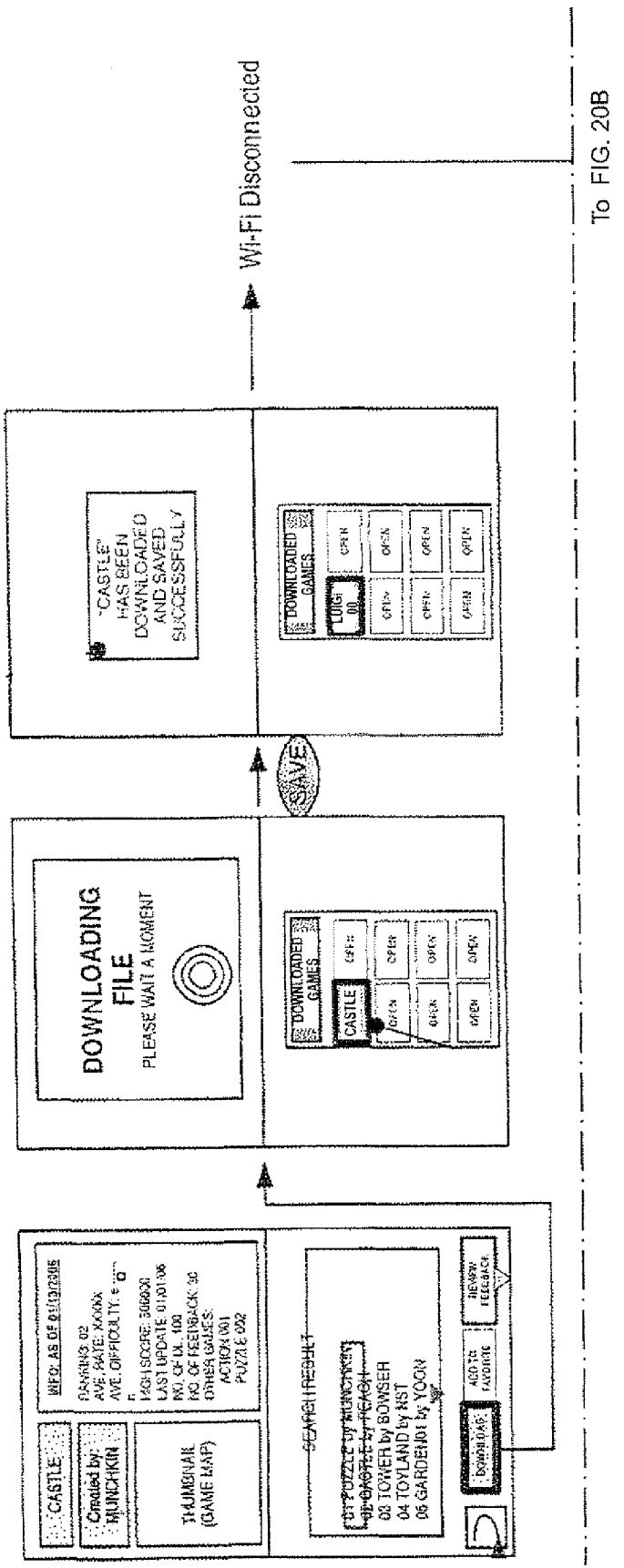
FIGS. 20A and 20B together schematically illustrate an exemplary illustrative non-limiting file downloading functionality.
Figure 20B:
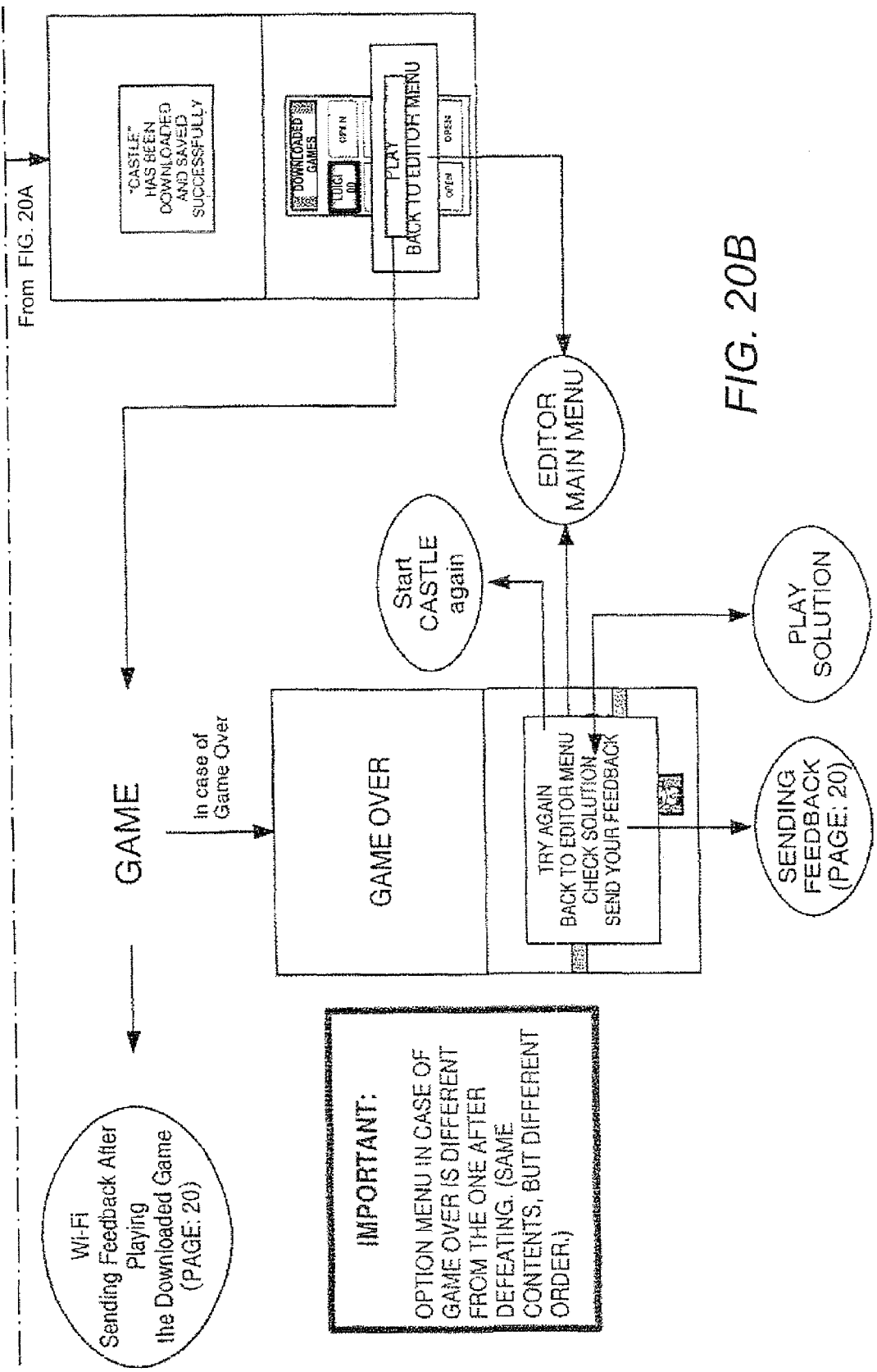

FIGS. 20A and 20B show example screens that may be displayed during game download and play.

Figure 21A:
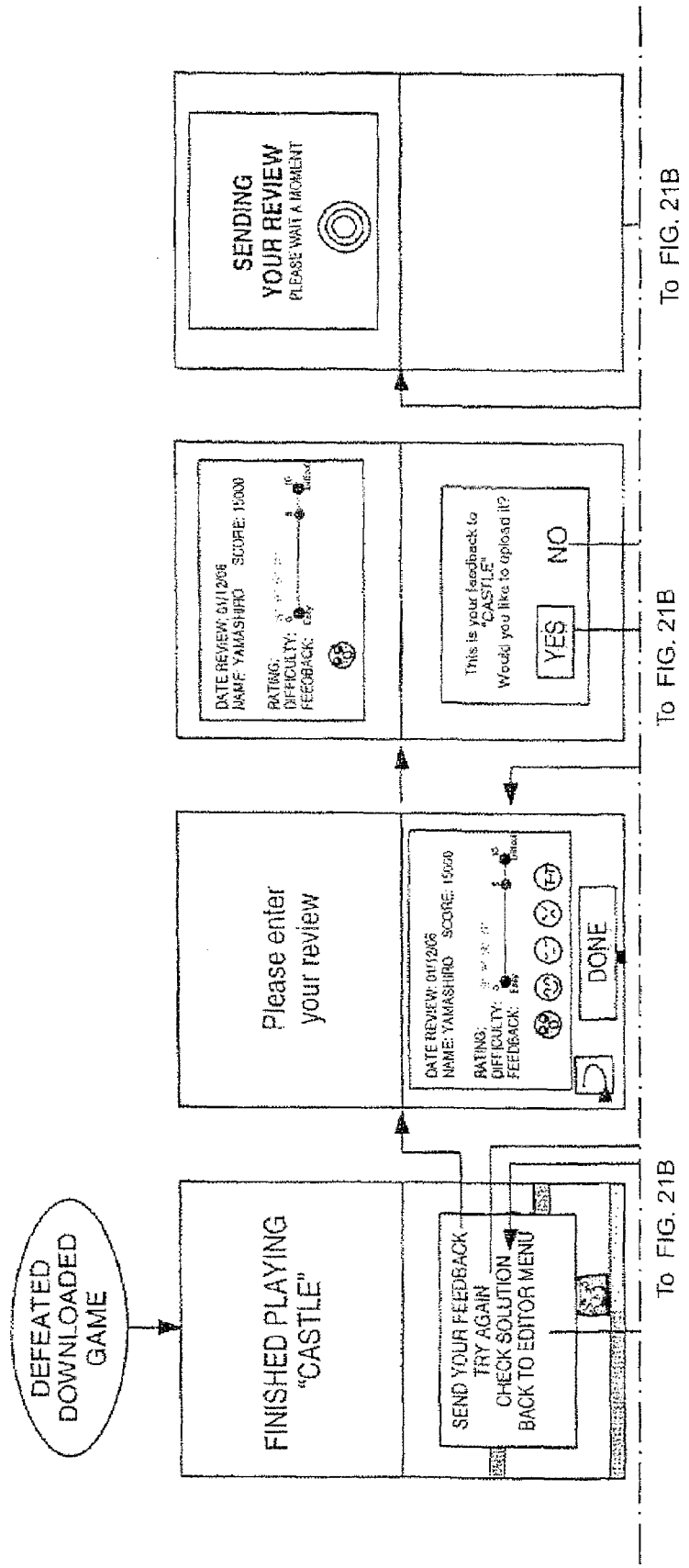
FIGS. 21A, 21B together schematically illustrate an exemplary illustrative non-limiting sending feedback functionality.
Figure 21B:
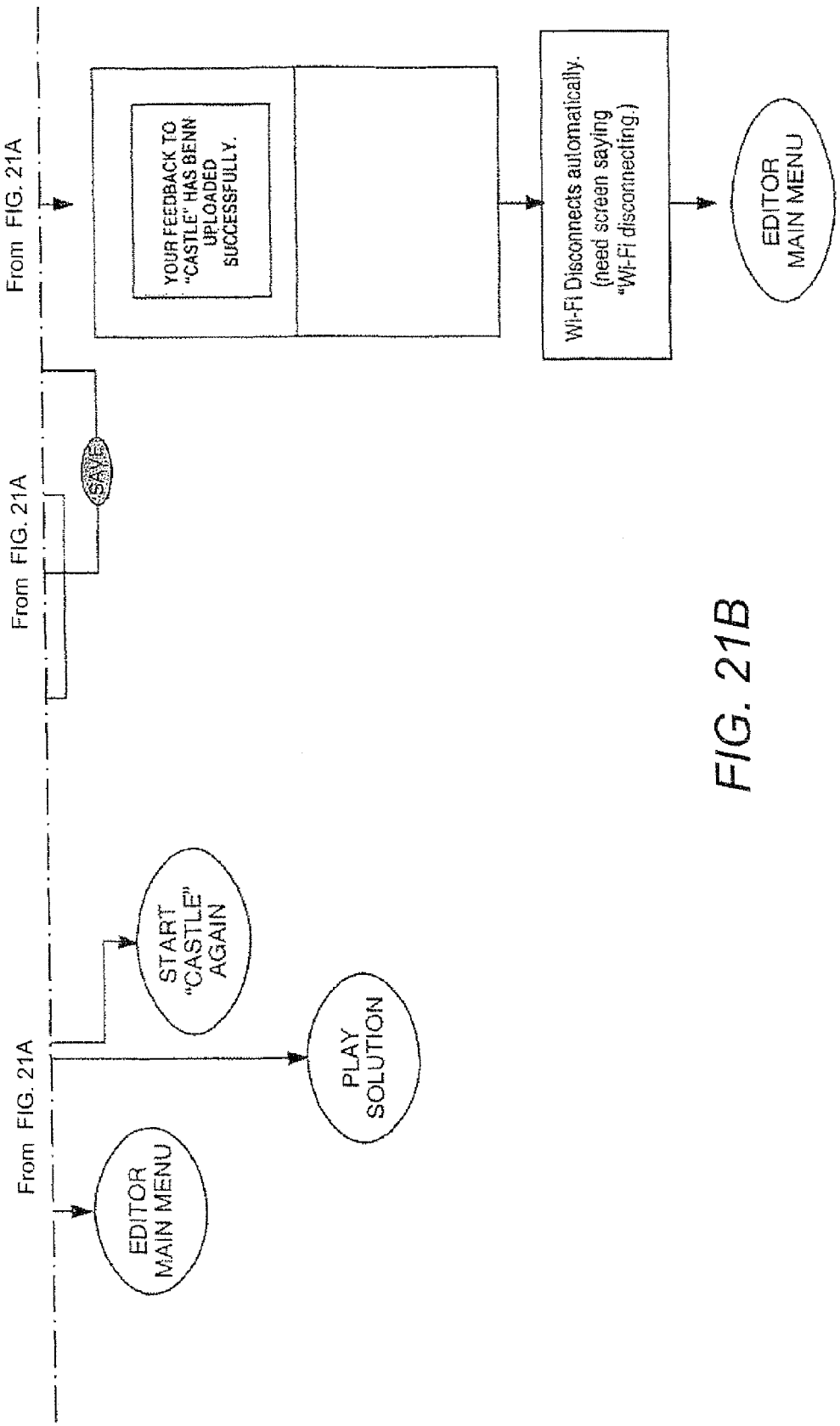

FIGS. 21A and 21B show example screen displays that may be used to allow a game player to provide a feedback for a downloaded game.

Figure 22:
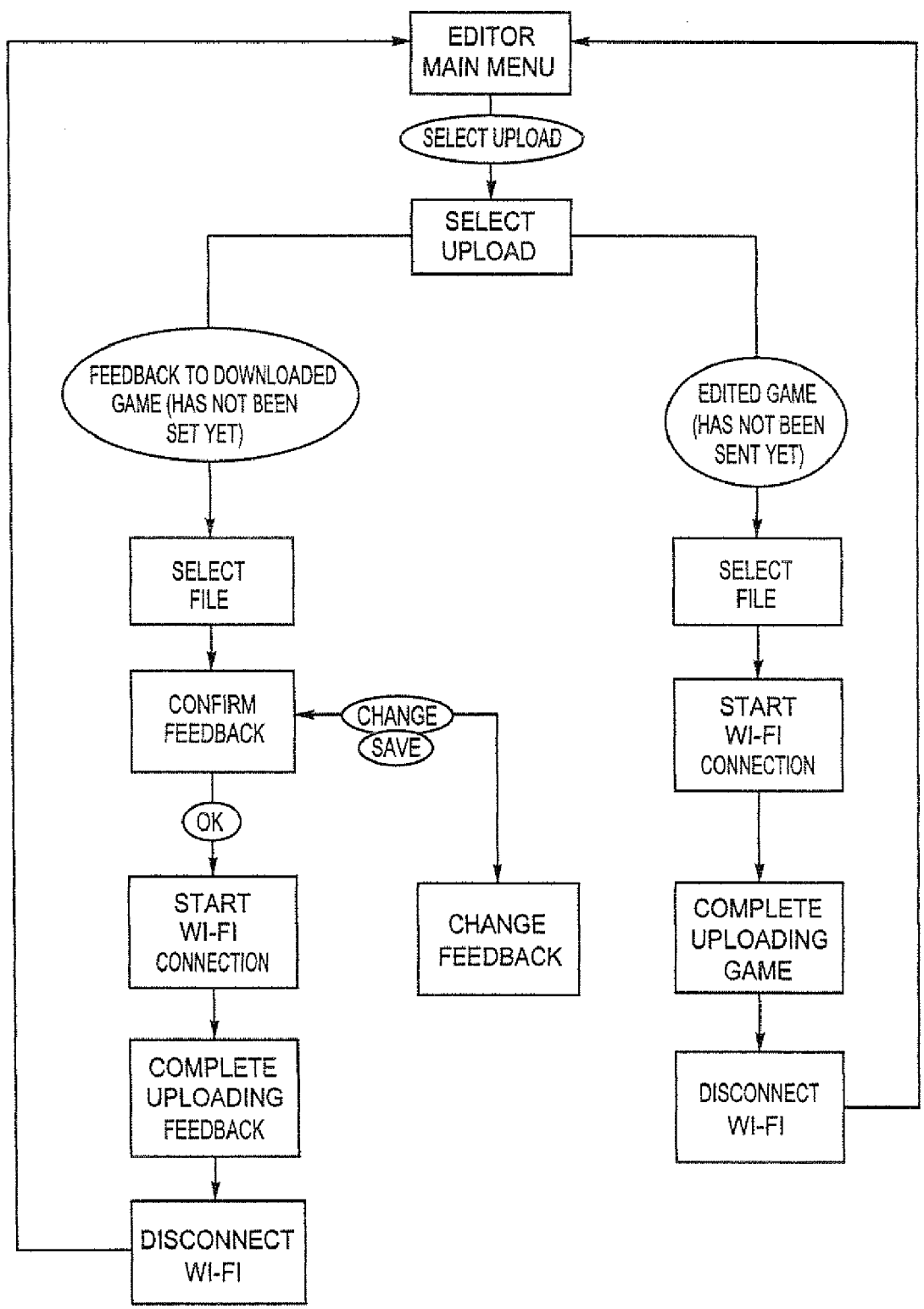
FIG. 22 is a flowchart of an exemplary illustrative non-limiting game uploading feature.

FIG. 22 is a flowchart of exemplary illustrative non-limiting steps that may be performed under program control to upload a game level created using the game editor.

Figure 23A:
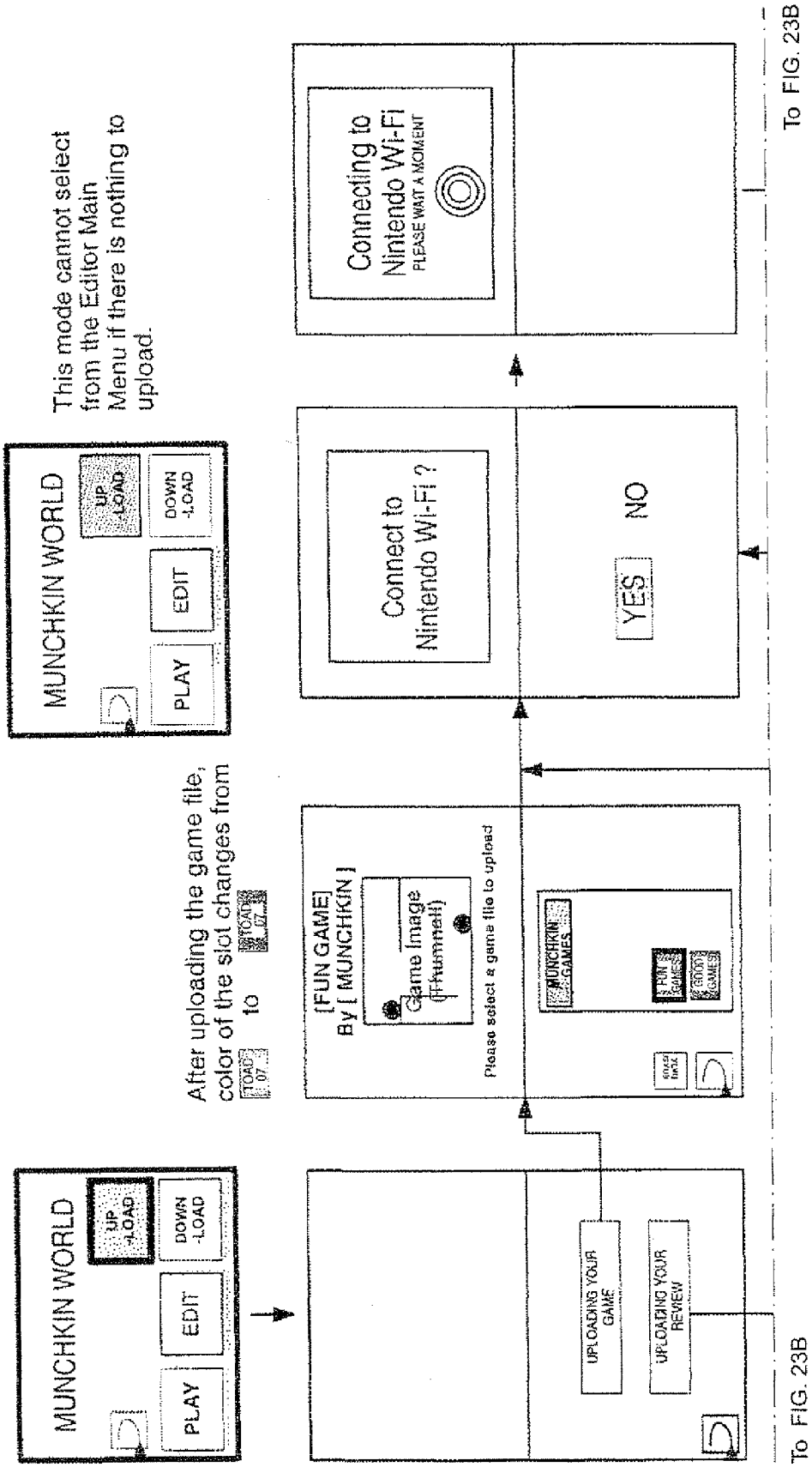
FIGS. 23A and 23B together schematically illustrate an exemplary illustrative non-limiting manual uploading process.
Figure 23B:
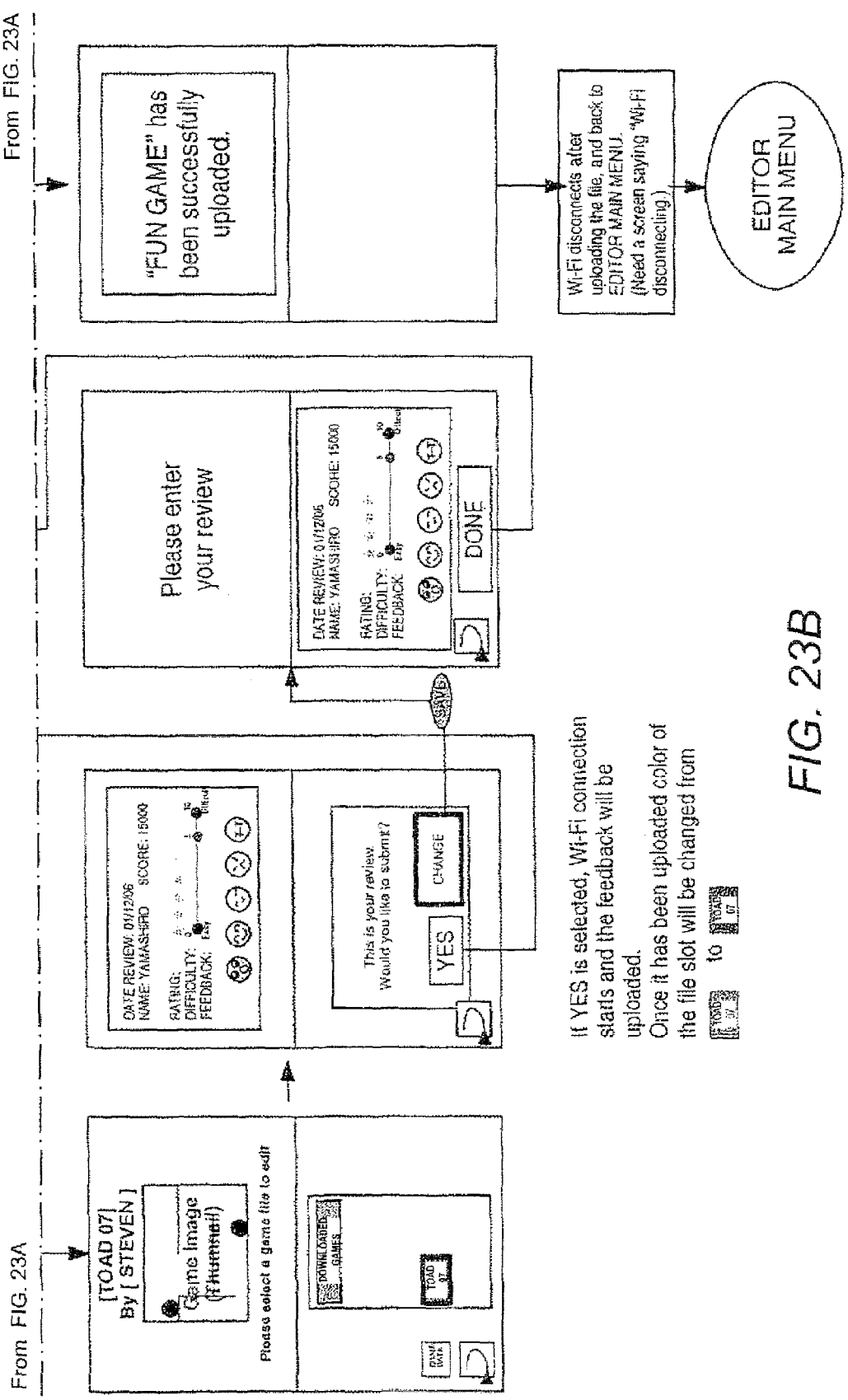

FIGS. 23A and 23B show exemplary illustrative non-limiting screens that may be displayed for manually uploading a previously completed and tested game level using the game editor. The mode shown in FIGS. 23A and 23B may be available at any time (e.g., there are some cases when a player does not want to send a file or feedback right away, WiFi errors occur, or the like).

FIGS. 24A-24Z, 25A-25Z and 26A-26H show an example non-limiting sequence of screens illustrating game environment creation and game play by an end user.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A system for permitting an end user to author and share playable video games, comprising:
    a storage device that stores a video game virtual environment authored by an end user;
    a processor that helps the end user to author said video game virtual environment by automatically placing end user-selected dynamic objects into the virtual environment for game characters to interact with, the dynamic objects having dynamic features defining movement or dynamic behavior within the virtual environment, said processor executing code providing an intelligent auto-complete function that, in response to end user input, is configured to automatically place obstacles and the dynamic objects into the virtual environment, the auto-complete function utilizing attributes that define dynamic behavior for the dynamic objects to automatically place and define movement or dynamic behavior for said dynamic objects and obstacles, automatically complete partially formed obstacles and dynamic object arrangements utilizing the dynamic features of the user-selected dynamic objects, and automatically prevent interfering dispositions of obstacles and dynamic objects into the authored video game virtual environment during end user object selection and input, in a disposition that ensures the video game virtual environment is playable, thereby preventing the resulting authored environment from being unplayable for a game character to navigate or interact with during game play, and which play tests said authored video game virtual environment and automatically prevents said end user from creating non-functional structures for interaction with the game character within said authored video game virtual environment; and
    a wireless connection that shares said play tested video game virtual environment with other users.

2. The system of claim 1, wherein the processor is further configured to display a gallery of obstacles and other objects selectable by the end-user where each dynamic object has its own dynamic attribute that helps define its auto-complete placement in the video game virtual environment.

3. The system of claim 1, wherein the end user is a game player that authors the video game virtual environment for playing the video games.

4. A method of enabling end user authors to author playable puzzle games using a computer having one or more processors, the method comprising:
    providing an intelligent editor that assists an end user author in authoring game play and helps the end user to author a video game virtual environment, said intelligent editor providing an intelligent auto-complete function that, in response to the end user input and selection, automatically places and orients obstacles and virtual dynamic objects by utilizing the dynamic features of the end user-selected dynamic objects to automatically place and define movement or dynamic behavior for said dynamic objects and obstacles, automatically completes partially formed obstacles and other virtual objects by utilizing the dynamic features of the end user-selected objects, and automatically prevents non-functional dispositions of obstacles and virtual objects into the authored video game virtual environment during end user input and selection thereby ensuring the video game virtual environment is playable, preventing the resulting authored environment from being unplayable for a game character to navigate or interact with during game play;

sharing the authored video game virtual environment with other users via a communications network;

receiving feedback from said other users;

awarding, via the one or more processors, bonus points to said end user author based on other users' feedback concerning the fun and functionality of the shared authored video game virtual environment;

allowing said end user author to shop a catalog of game play elements with said bonus points; and enabling said end user author to include said shopped game play elements in additional authored game play.

5. The method of claim 4, further comprising displaying a gallery of obstacles and dynamic virtual objects selectable by the end-user where each obstacle and virtual object has its own attribute that helps define its disposition in the authored video game virtual environment.

6. The method of claim 4, wherein the end user is a game player that authors the video game virtual environment for playing the puzzle games.

7. A non-transitory computer-readable storage medium having a program executable on a processor, the program comprising instructions enabling the manipulation of a virtual video game environment and causing the processor to:

providing selectable virtual video game environment templates capable of editing for customized game play;

providing an environment editor being structured to customize selected virtual video game environments by enabling user-selection of dynamic objects that can be used in the virtual video game environments, the dynamic objects having dynamic features capable of influencing game characters when the game characters interact with the dynamic objects, using auto-complete functionality utilizing attributes that define dynamic behavior for dynamic objects and obstacles to automatically place into the virtual video game environment and define movement or dynamic behavior for the objects and obstacles; and storing a customized virtual video game environment including the automatically-placed dynamic objects and obstacles.

* * * * *